(12) United States Patent
Liang et al.

(10) Patent No.: US 12,458,702 B2
(45) Date of Patent: Nov. 4, 2025

(54) CONJUGATE FOR TARGETING THERAPY

(71) Applicant: NATIONAL TAIWAN UNIVERSITY, Taipei (TW)

(72) Inventors: Pi-Hui Liang, Taipei (TW); Chun-Kai Chang, Tuku Township (TW); Pei-Fang Chiu, Tainan (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 0 days.

(21) Appl. No.: 17/658,082

(22) Filed: Apr. 5, 2022

(65) Prior Publication Data
US 2023/0310618 A1   Oct. 5, 2023

(51) Int. Cl.
*A61K 47/54* (2017.01)
*A61P 35/00* (2006.01)

(52) U.S. Cl.
CPC .......... *A61K 47/549* (2017.08); *A61K 47/545* (2017.08); *A61P 35/00* (2018.01)

(58) Field of Classification Search
CPC .... A61K 47/549; A61K 47/545; A61K 47/54; A61P 35/00
See application file for complete search history.

(56) References Cited

PUBLICATIONS

Chang, Chun-Kai et al., "Targeting Colorectal Cancer with Conjugates of a Glucose Transporter Inhibitor and 5-Fluorouracil," J. Med. Chem., 2021, vol. 64, pp. 4450-4461.
Cunningham, D. et al., "Two different first-line 5-fluorouracil regimens with or without exaliplatin in patients with metastatic colorectal cancer," Ann Oncol, 2009, 20, pp. 244-250.
Falcone, Alfredo et al., "Sequence Effect of Irinotecan and Fluorouracil Trastment on Pharmacokinetics and Toxicity in Chemotherapy-Naive Metastatic Colorectal Cancer Patients," J Clin Oncol, Aug. 2001, vol. 19, No. 15, pp. 3456-3462.
Shimada, Yasuhiro et al., "Phase II Study of CPT-11, a New Camptothecin Derivative, in Metastatic Colorectal Cancer," J Clin Oncol, May 1993, vol. 11, No. 5, pp. 909-913.
Sotos, George A. et al., "Preclinical and clinical aspects of biomodulation of 5-fluorouracil," Cancer Treat Rev, 1994, 20, pp. 11-49.
Yang, "Study on the Covalent Conjugation of Genotoxic Agents and Inhibitors of Glucose Transporter for Anti- Colorectal Cancer", National Digital Library of Theses and Dissertations in Taiwan, 2014.
Cooper, Itzik et al., "Converting bleomycin into a prodrug that undergoes spontaneous reactivation under physiological conditions," Toxicology and Applied Pharmacology, 2019, vol. 384, 7 pages.
Gabizon, Alberto et al., "Development of Promitil (R), a lipidic prodrug of mitomycin c in PEGylated liposomes: From bench to bedside," Advanced Drug Delivery Review, 2020, vols. 154-155, pp. 13-26 (14 pages).
Gund, Machhindra et al., "Water-soluble prodrugs of paclitaxel containing self-immolative disulfide linkers," Bioorganic & Medicinal Chemistry Letters, 2015, vol. 25, pp. 122-127.
Ipek, Ozgecan Savlug et al., "Synthesis of Novel Hybrid Lonidamine-Coumarin Derivatives and Their Anticancer Activities," Journal of Molecular Structure, 2023, vol. 1281, 11 pages.
Tvilum, Anne et al., "Antibody-Drug Conjugates to Treat Bacterial Biofilms via Targeting and Extracellular Drug Release," Advanced Science, 2023, vol. 10, 15 pages.
Wei, Xiaohui et al., "Characterization of Pegylated Liposomal Mitomycin C Lipid-Based Prodrug (Promitil) by High Sensitivity Differential Scanning Calorimetry and Cryogenic Transmission Electron Microscopy," Molecular Pharmaceutics, 2017, vol. 14, pp. 4339-4345 (7 pages).
Whalen, Kerry A. et al., "Targeting the Somatostatin Receptor 2 with the Miniaturized Drug Conjugate, PEN-221: A Potent and Novel Therapeutic for the Treatment of Small Cell Lung Cancer," Small Molecule Therapeutics, 2019, vol. 18(11), pp. 1926-1936 (11 pages).
Yao, Hang-Ping et al., "Duocarmycin-based antibody-drug conjugates as an emerging biotherapeutic entity for targeted cancer therapy: Pharmaceutical strategy and clinical progress," Drug Discovery Today, 2021, vol. 26, pp. 1857-1874 (18 pages).
Ye, Zixuan et al., "EGFR Targeted Cetuximab-Valine-Citrulline (vc)-Doxorubicin Immunoconjugates-Loaded Bovine Serum Albumin (BSA) Nanoparticles for Colorectal Tumor Therapy," International Journal of Nanomedicine, 2021, vol. 16, pp. 2443-2459 (17 pages).
Zhang, Cheng et al., "Stimuli-responsive platinum and ruthenium complexes for lung cancer therapy," Frontiers in Pharmacology, 2022, 21 pages.

*Primary Examiner* — Sudhakar Katakam
(74) *Attorney, Agent, or Firm* — Amin, Turocy & Watson, LLP

(57) ABSTRACT

The present disclosure provides a novel conjugate or a pharmaceutically acceptable salt thereof, wherein the conjugate has an active pharmaceutical moiety or a prodrug thereof, a targeting module and a linker therebetween. The conjugate or a pharmaceutically acceptable salt thereof is useful for treating a disease, recurrence or progression in a subject or increasing the likelihood of survival over a relevant period in a subject diagnosed with a disease.

10 Claims, 17 Drawing Sheets

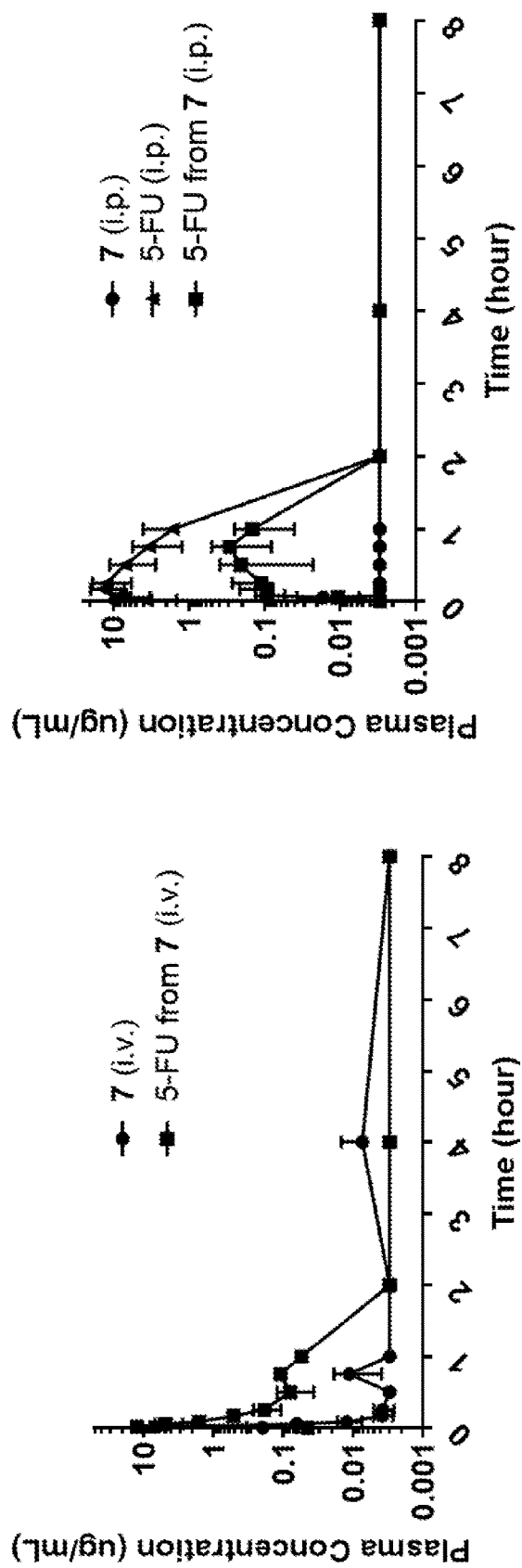
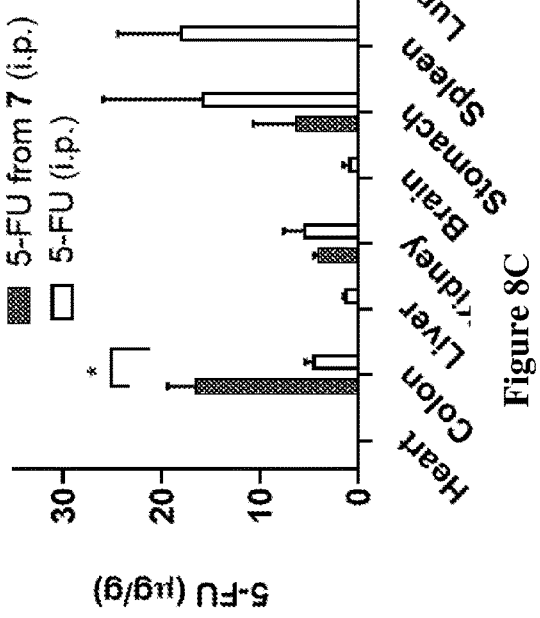
Figure 8A
Figure 8B
Figure 8C

CONJUGATE FOR TARGETING THERAPY

FIELD OF THE INVENTION

The present disclosure relates to a novel conjugate, more particularly to a conjugate for targeting therapy.

BACKGROUND OF THE INVENTION

Selective delivery of drugs to defined sites of disease is one of the most critical goals of clinical therapy. In the case of treatment of certain tumors, for example, there remains a need for delivery systems that are able to target anti-cancer drugs to the tumor site, while minimizing off-target effects. Although tremendous advances have been made in chemotherapy, current therapies remain unsatisfactory and the prognosis for the majority of patients remains poor. A major challenge lies in the occurrence of undesired side effects.

Typically, drugs are formulated into medicaments for topical, oral, intravenous, or intramuscular administration. Drugs administered along these routes are often required to be in much higher doses than the actual amount of the drug used in situ. Furthermore, toxic drugs are administered in quantities which may limit their use over time or cumulative application.

For example, in the treatment of colorectal cancer (CRC), the fourth most common and second most lethal cancer in the world, for more than four decades, 5-fluorouracil (5-FU) has remained the essential treatment for metastatic colorectal cancer (mCRC), often used in combination of leucovorin with or without oxaliplatin as standard first-line therapy (Cunningham et al., Ann Oncol 2009, 20, 244-50). However, it has been reported that the mean response rate of patients who received 5-FU-based chemotherapy was only approximately 23% (Sotos et al., Cancer Treat Rev 1994, 20, 11-49). Irinotecan, a prodrug of SN-38, is an important chemoreagent for patients who have fluorouracil-refractory stage IV CRC in second-line therapy, but a phase II study showed that the response rate of single-agent irinotecan for those resistant to fluorouracil was only about 27% (Shimada et al., J Clin Oncol 1993, 11, 909-13). In addition, the poor selectivity of 5-FU-based regiments and irinotecan can cause adverse effects such as neutropenia, diarrhea, nausea, vomiting, and stomatitis in mCRC therapy (Falcone et al., J Clin Oncol 2001, 19, 3456-62).

There is therefore a need for improved methods of targeting the transport of the drug to a specific organ, tissue, cell, and/or subcellular organelle.

SUMMARY OF THE INVENTION

The present disclosure provides a novel conjugate or a pharmaceutically acceptable salt thereof, wherein the conjugate has an active pharmaceutical moiety or a prodrug thereof, a targeting module, and a linker therebetween. The conjugate or a pharmaceutically acceptable salt thereof is useful in treating a disease, recurrence, or progression in a subject or increasing the likelihood of survival over a relevant period in a subject diagnosed with a disease.

In one embodiment of a first aspect of the present disclosure, the conjugate is represented by Formula I,

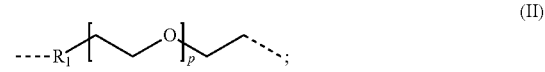

or a pharmaceutically acceptable salt thereof, wherein
A is an active pharmaceutical moiety or a prodrug thereof;
B is a targeting module;
L is a linker represented by Formula II

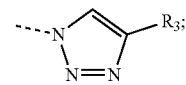

wherein
$R_1$ is —$SR_2$, or

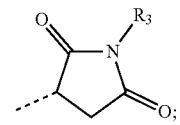

$R_2$ is $R_3$, —$SR_3$, or $R_3$ is —$(CH_2)_n$—$R_4$;
$R_4$ is $R_5$, —OC(O)—$R_5$, —C(O)—$R_5$, —C(O)NH—$R_5$, —C(O)—, —NHC(O)—$R_5$, —OC(O)O—$R_5$, or —C(O)—Z—NH-phenylene-$R_5$;
$R_5$ is —$(CH_2)_m$;
Z is -Val-Cit-, -Phe-Lys-, -Val-Ala- or -Gly-Phe-Leu-Gly-;
p is an integer of 2 to 9;
n is an integer of 2 to 9;
m is 0 or 1; and
the dashed line is a covalent bond;
provided that the conjugate is not a compound selected from the group consisting of:

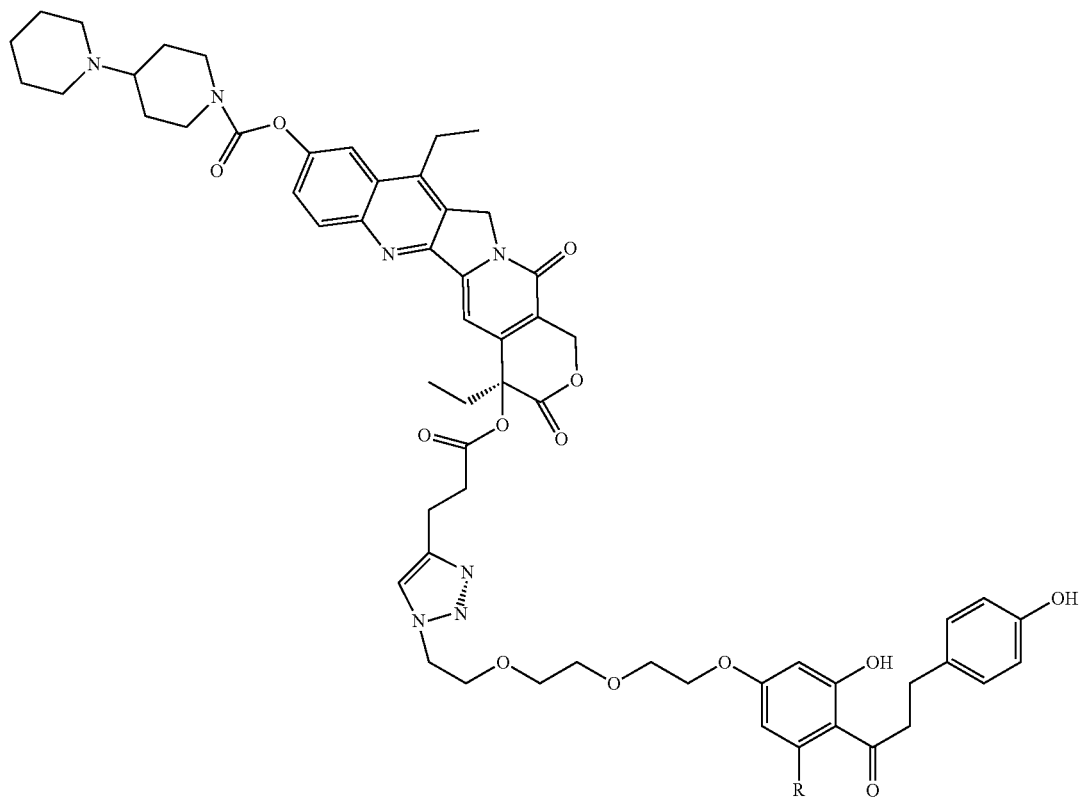
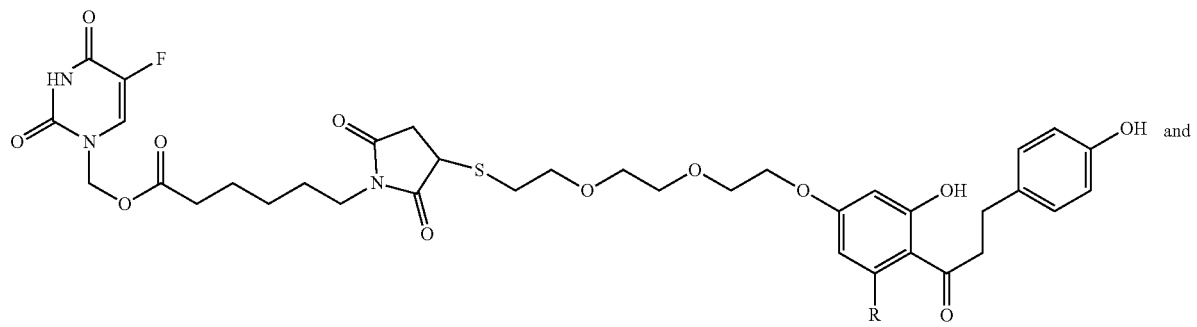

-continued

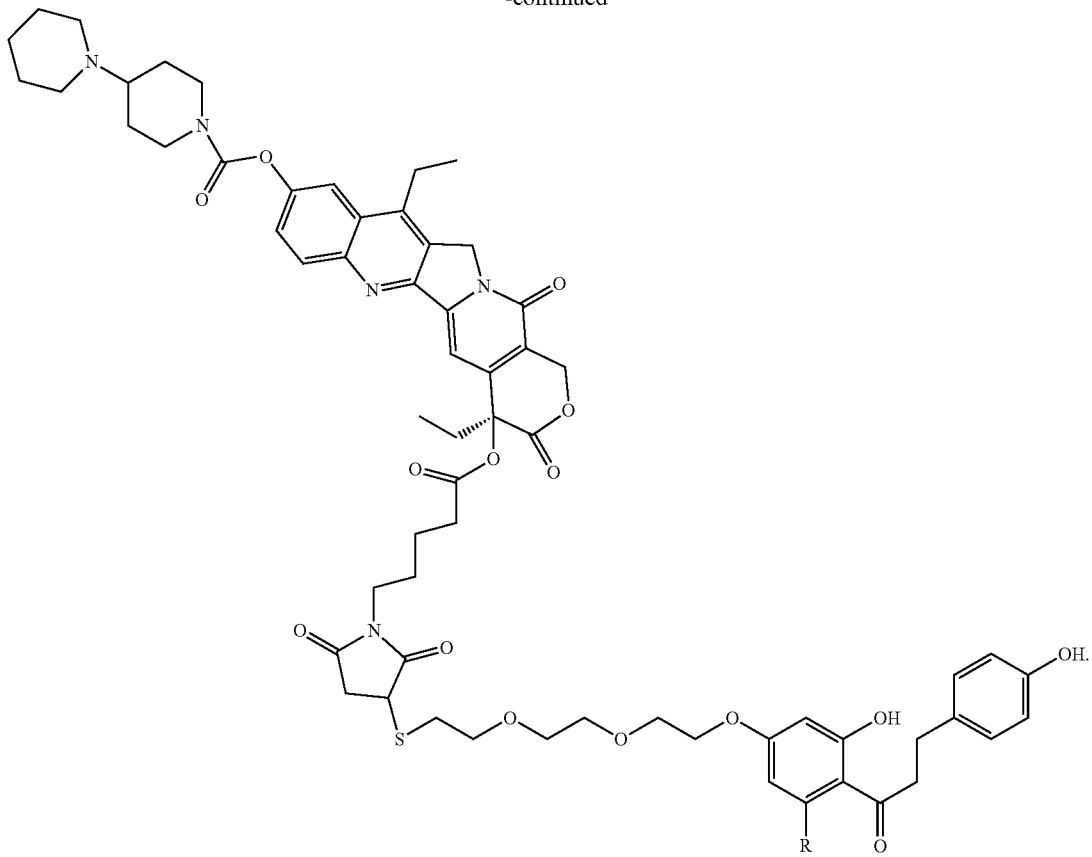

In one embodiment of the conjugate or a pharmaceutically acceptable salt thereof, A is an anticancer therapeutic moiety. In some embodiments, A may be selected from 5-fluorouracil (5-FU), SN-38, irinotecan, lonidamine, bleomycin, mitomycin, cisplatinum, doxorubicin, DM-1, taxol, cabazitaxel, floxuridine or FdUMP.

In one embodiment of the conjugate or a pharmaceutically acceptable salt thereof, B is a glucose transporter-specific binder. In some embodiments, B may be selected from phloretin optionally substituted with glucose, mannose, or 2-fluoro-glucose.

In one embodiment of the conjugate or a pharmaceutically acceptable salt thereof, $R_1$ is —$SR_2$; $R_2$ is

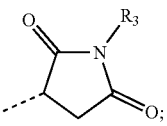

$R_3$ is —$(CH_2)_n$—$R_4$; $R_4$ is —C(O)—$R_5$; $R_5$ is —$(CH_2)_m$—; p is 2; n is 5; and m is 0.

In one embodiment of the conjugate or a pharmaceutically acceptable salt thereof, $R_1$ is —$SR_2$; $R_2$ is —$SR_3$; $R_3$ is —$(CH_2)_n$—$R_4$; $R_4$ is —OC(O)—$R_5$, or —OC(O)O—$R_5$; $R_5$ is —$(CH_2)_m$—; p is 2; n is 2; and m is 0.

In one embodiment of the conjugate or a pharmaceutically acceptable salt thereof, $R_1$ is $SR_2$; $R_2$ is

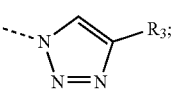

$R_3$ is —$(CH_2)_n$—$R_4$; $R_4$ is —C(O)—Z—NH-phenylene-$R_5$; $R_5$ is —$(CH_2)_m$; Z is -Val-Cit-; p is 2; n is 4; and m is 1.

In one embodiment of the conjugate or a pharmaceutically acceptable salt thereof, $R_1$ is

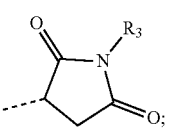

$R_3$ is —$(CH_2)_n$—$R_4$; $R_4$ is —C(O)O—$R_5$; $R_5$ is —$(CH_2)_m$—; p is 2; n is 3; and m is 1.

In one embodiment of the conjugate or a pharmaceutically acceptable salt thereof, $R_1$ is —$SR_2$; $R_2$ is $R_3$ is —$(CH_2)_n$—$R_4$; $R_4$ is —C(O)O—$R_5$; $R_5$ is —$(CH_2)_m$—; p is 2; n is 4; and m is 1.

In one embodiment of the conjugate or a pharmaceutically acceptable salt thereof, $R_1$ is —$SR_2$; $R_2$ is —$SR_3$; $R_3$ is —$(CH_2)_n$—$R_4$; $R_4$ is —C(O)O—$R_5$; $R_5$ is —$(CH_2)_m$—; p is 2; n is 3; and m is 1.

In one embodiment of the conjugate or a pharmaceutically acceptable salt thereof, the conjugate is represented by Formula III,

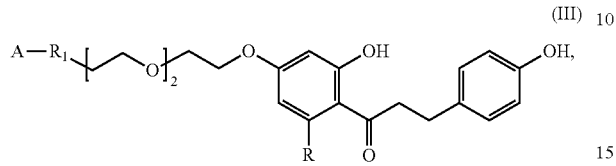

wherein
R is OH or

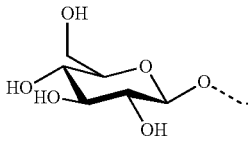

In one embodiment of the conjugate or a pharmaceutically acceptable salt thereof, the conjugate is selected from the group consisting of:

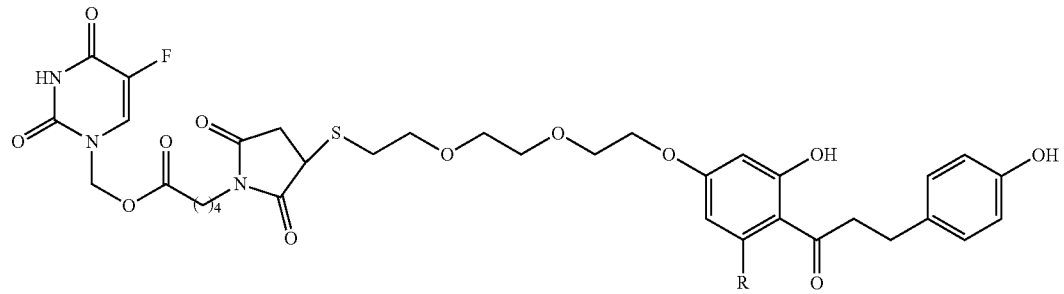

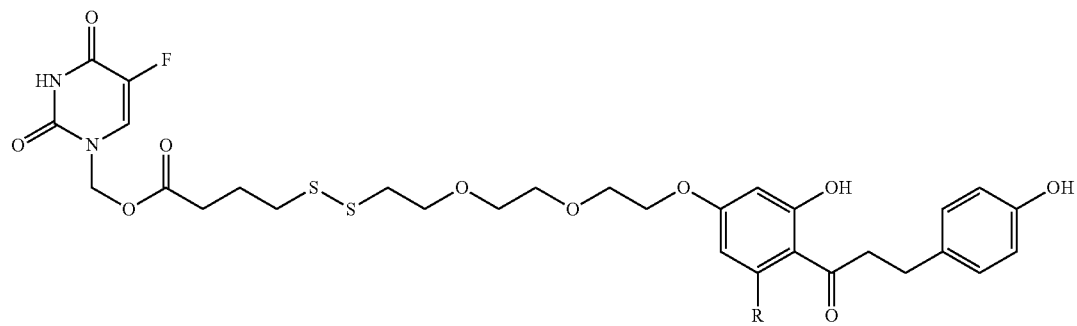

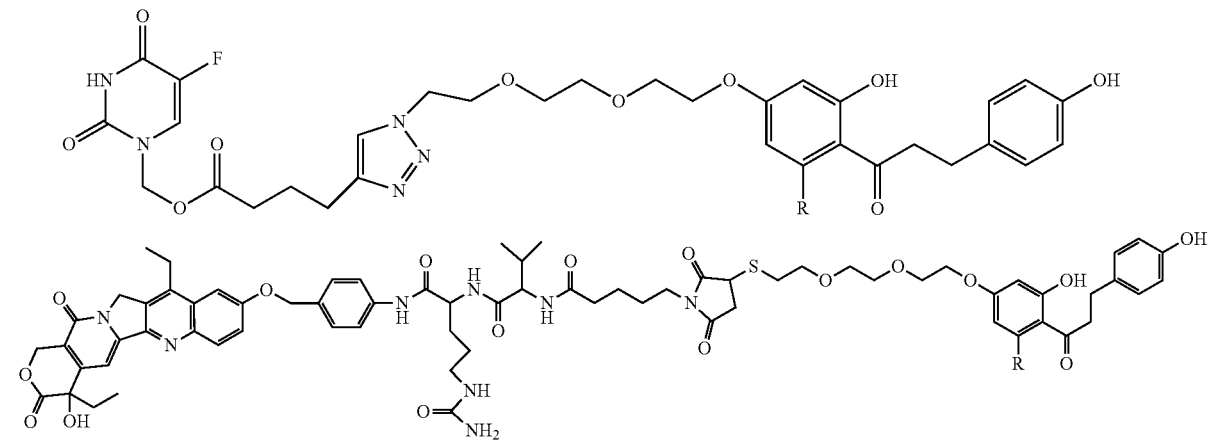

-continued

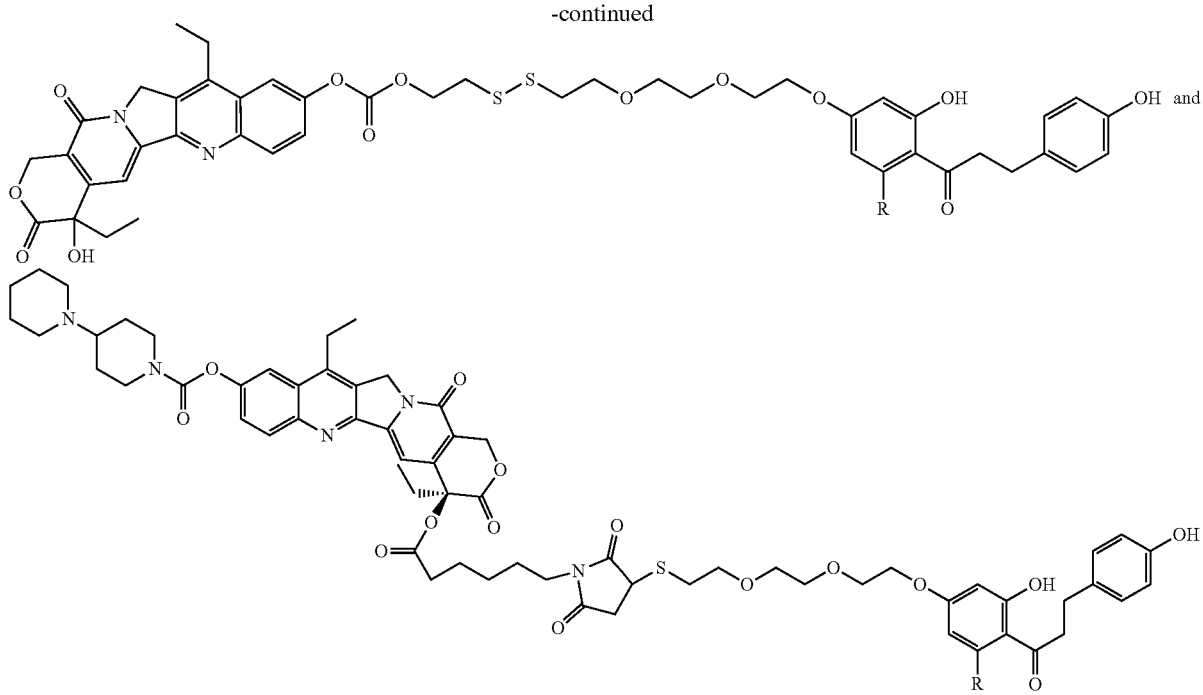

wherein R is OH or

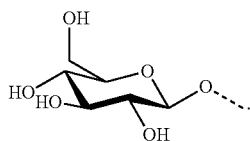

One embodiment of a second aspect of the present disclosure is a method for treating a disease, recurrence, or progression in a subject or increasing the likelihood of survival over a relevant period in a subject diagnosed with a disease, comprising administering to the subject the conjugate as described herein or a pharmaceutically acceptable salt thereof.

In one embodiment of the method, the disease is a cancer selected from a solid cancer or a liquid cancer or metastasis thereof. Examples of the cancer include, but are not limited to squamous cell cancer, lung cancer including small-cell lung cancer, non-small cell lung cancer, adenocarcinoma of the lung and squamous carcinoma of the lung, cancer of the peritoneum, hepatocellular cancer, gastric or stomach cancer including gastrointestinal cancer, pancreatic cancer, glioblastoma, cervical cancer, ovarian cancer, liver cancer, bladder cancer, hepatoma, breast cancer, colon cancer, rectal cancer, colorectal cancer, endometrial or uterine carcinoma, salivary gland carcinoma, kidney or renal cancer, prostate cancer, vulval cancer, thyroid cancer, hepatic carcinoma, anal carcinoma, penile carcinoma, head and neck cancer, lymphomas, leukemias, myelomas, and myeloproliferative neoplasms.

In one embodiment of the method, the subject is refractory or resistant to a drug.

In one embodiment of the method, A is an active pharmaceutical moiety or a prodrug thereof, wherein the active pharmaceutical moiety is an anticancer therapeutic moiety.

In some embodiments, A is selected from 5-fluorouracil (5-FU), SN-38, irinotecan, lonidamine, bleomycin, mitomycin, cisplatinum, doxorubicin, DM-1, taxol, cabazitaxel, floxuridine or FdUMP.

In one embodiment of the method, B is a glucose transporter-specific binder. In some embodiments, B is phloretin optionally substituted with glucose, mannose, or 2-fluoroglucose.

In one embodiment of the method, the conjugate is represented by Formula III

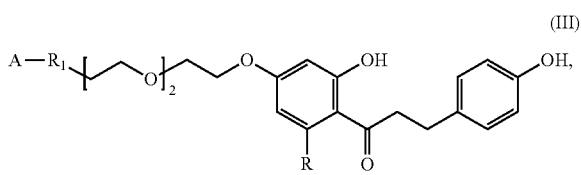

wherein
R is OH or

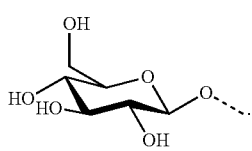

In one embodiment of the method, the conjugate is selected from the group consisting of:

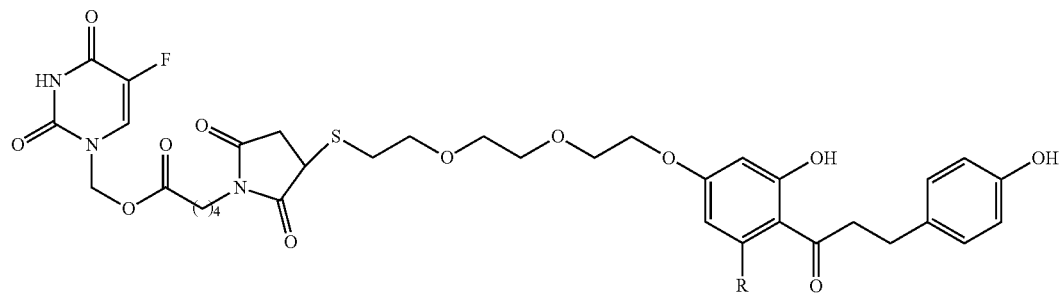
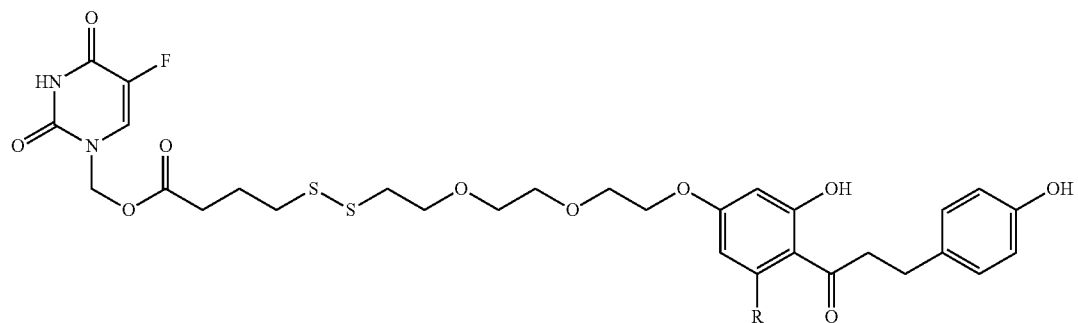
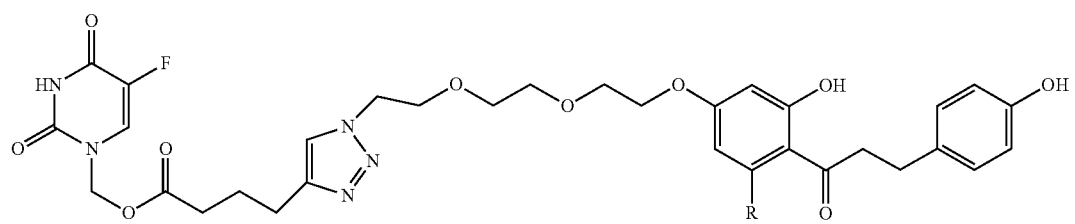
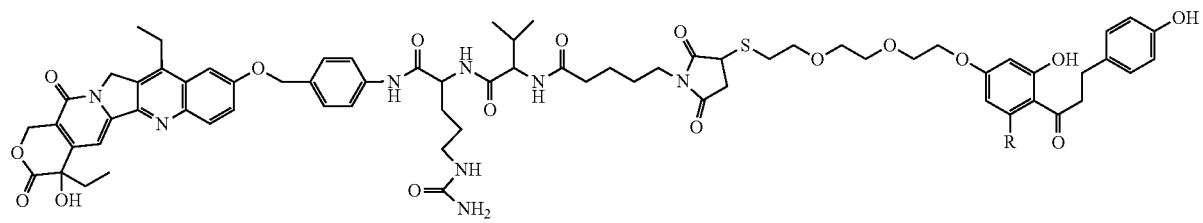
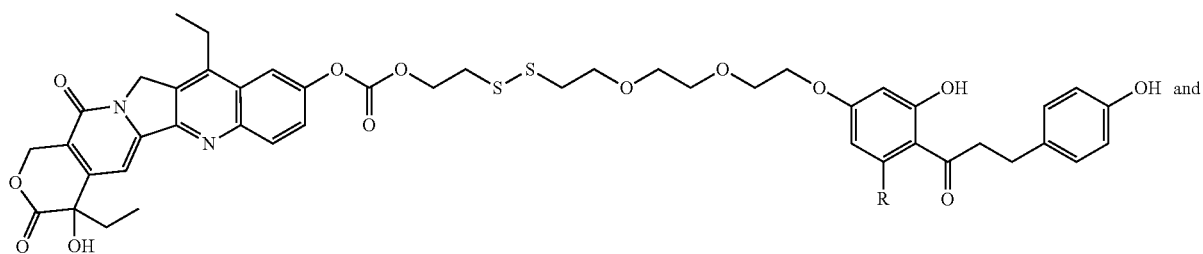

-continued

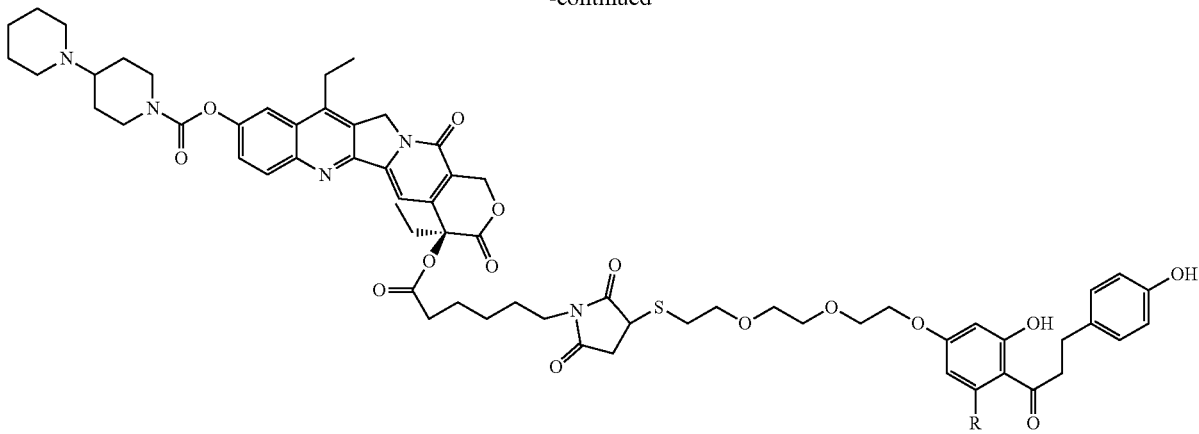

wherein R is OH or

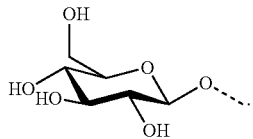

One embodiment of a third aspect of the present disclosure is a composition comprising a therapeutically effective amount of the conjugate as aforementioned or a pharmaceutically acceptable salt thereof and a pharmaceutically acceptable carrier, excipient, or vehicle.

These and other aspects will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

FIG. 2A analysis of compound 7 with human plasma by using RP-HPLC; FIG. 2B stability of compounds 5, 7, and 9 in human plasma at 37° C.; FIG. 2C analysis of compound 7 with GSH (5 mM) by using RP-HPLC; FIG. 2D in vitro release profile of compound 7 under different GSH concentrations (5 µM, 1 mM and 5 mM) and formations of 5-FU under 1 mM and 5 mM of GSH; data are shown as mean±S.E.M. (n=3).

FIG. 3A stability in human plasma at 37° C.; FIG. 3B stability and their release rate of SN-38 in 5 µM or 5 mM GSH; FIG. 3C analysis of compound 30 with GSH (5 mM) by using RP-HPLC; FIG. 3D analysis of compound 31 with GSH (5 mM) by using RP-HPLC; data are shown as mean±S.E.M. (n=3).

FIG. 5B: healthy mouse, scale bar=50 µm×100 magnification; FIG. 5C: CRC mouse, scale bar=200 µm×400 magnification and FIG. 5D: CRC mouse, scale bar=50 µm×100 magnification. Immunohistochemical labeling of cathepsin B was detected using DAB substrate (brown color). Cell nuclei were counterstained using hematoxylin (blue/purple).

FIG. 6A: schematics of the CRC mouse model for 5-FU series compounds; FIG. 6B: macroscopic pictures of the mice's colonic tumors; FIG. 6C: tumor area and FIG. 6D: body weight changes in the mice treated with control (PBS alone), 5-FU (50 mg/kg), compound 7 (50 mg/kg), and 5-FU+ compound 17 (10 mg/kg of 5-FU and 30 mg/kg of compound 17, dosing is based on compound 7); data represent mean±S.E.M. (n=5). ****P<0.0001, or *P<0.05 (one-way ANOVA).

FIG. 7A: schematics of the CRC mouse model for SN-38 series compounds; FIG. 7B: macroscopic pictures of the mice colonic tumors; FIG. 7C: tumor area of i.p. injection groups and FIG. 7D: tumor area of i.v. injection groups. FIG. 7E: body weight changes in the mice treated with control (5% DMA+2% Tween 80+93% PBS), irinotecan (20 mg/kg), compound 31 (20 mg/kg) and irinotecan+ compound 17 (20 mg/kg of irinotecan and 14 mg/kg of compound 17) via i.p. injection; FIG. 7F: body weight changed of the mice treated with control (10% DMSO+20% Cremophor+10% Na$_2$CO$_3$ (5% in dd H$_2$O)+ 60% D5W), irinotecan (40 mg/kg), compound 38 (40 mg/kg), compound 38 (20 mg/kg), compound 37 (40 mg/kg), compound 37 (20 mg/kg), SN-38+compound 17 (12 mg/kg of SN-38 and 13 mg/kg of compound 17, dosing is based on 40 mg/kg of compound 38), SN-38+compound 16 (10 mg/kg of SN-38 and 15 mg/kg of compound 16, dosing is based on 40 mg/kg of compound 37), compound 17 (13 mg/kg), and compound 16 (15 mg/kg) via i.v. injection. Data represent mean±S.E.M. (n=3-5). **P<0.0001, *P<0.001, **P<0.01 or *P<0.05 (one-way ANOVA).

FIGS. 8A to 8C shows the pharmacokinetic profile of compound 7 and 5-FU in mice following i.v. and i.p. injection. FIG. 8A shows the plots of plasma concentration as the function of time after i.v. injection of compound 7 (50 mg/kg) and i.v. injection of compound 7 and 5-FU (50 mg/kg). FIG. 8B shows the plots of plasma concentration as the function of time after i.p. injection of compound 7 (50 mg/kg), i.p. injection of 5-FU, and i.p. injection of compound 7 and 5-FU (50 mg/kg). The data points exhibiting concentrations lower than the detection limit of the LC-MS/MS method used were arbitrarily placed just below 0.003 µg/mL; FIG. 8C shows distributions of 5-FU at 1 hour after i.p. injection of free 5-FU (9.5 mg/kg) and compound 7 (50 mg/kg, 5-FU equivalent dose) in BALB/c mice. Data represent mean±S.E.M. (n=3). *P<0.05.

DETAILED DESCRIPTION OF THE INVENTION

Definitions

Figure 1:
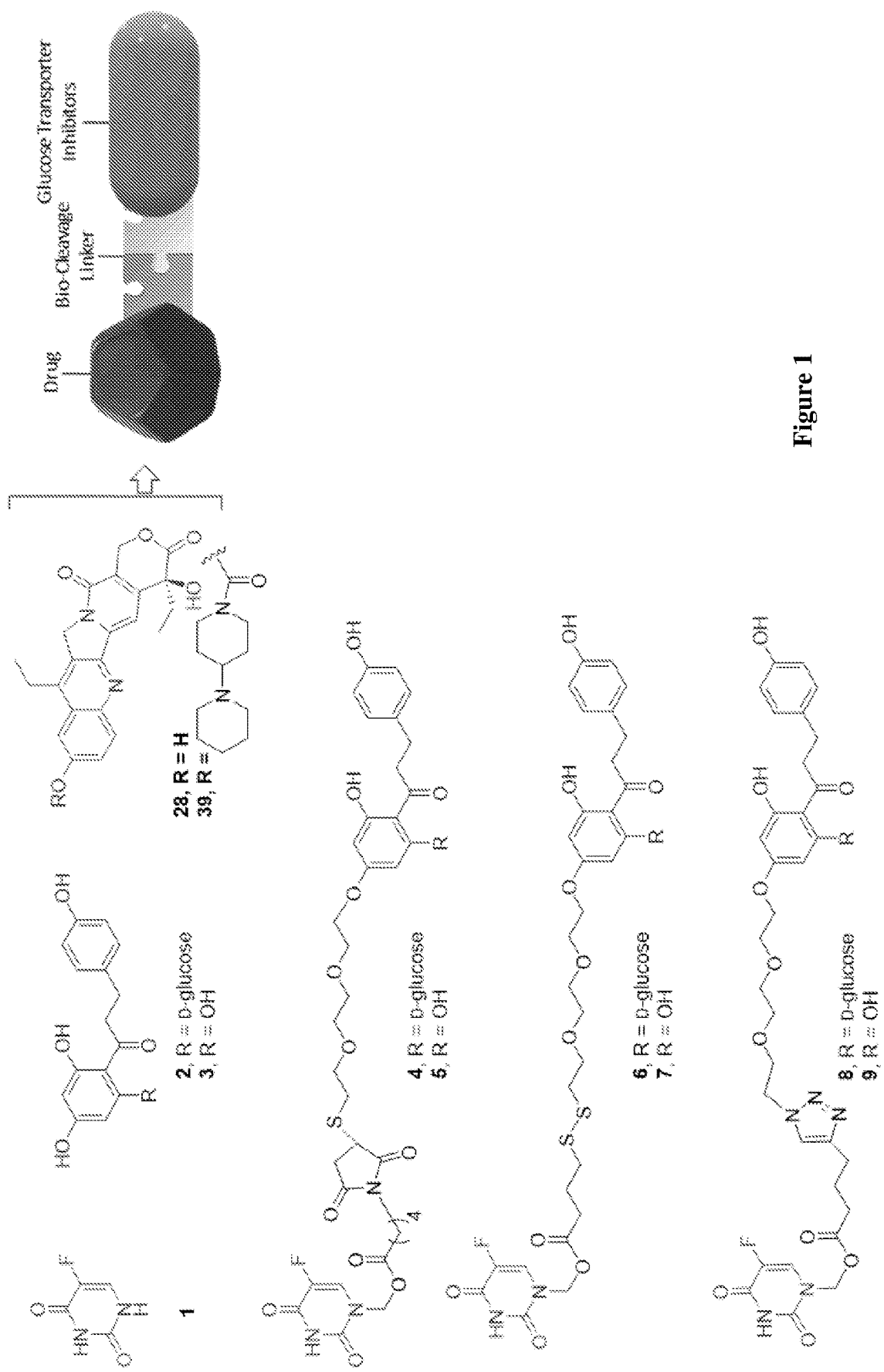
FIG. 1 shows structures of 5-FU (1), phlorizin (2), phloretin (3), SN-38 (28), irinotecan (39), and the design of compounds 4-9, 30-31, 37-38, and 42-45.
Figure 1:
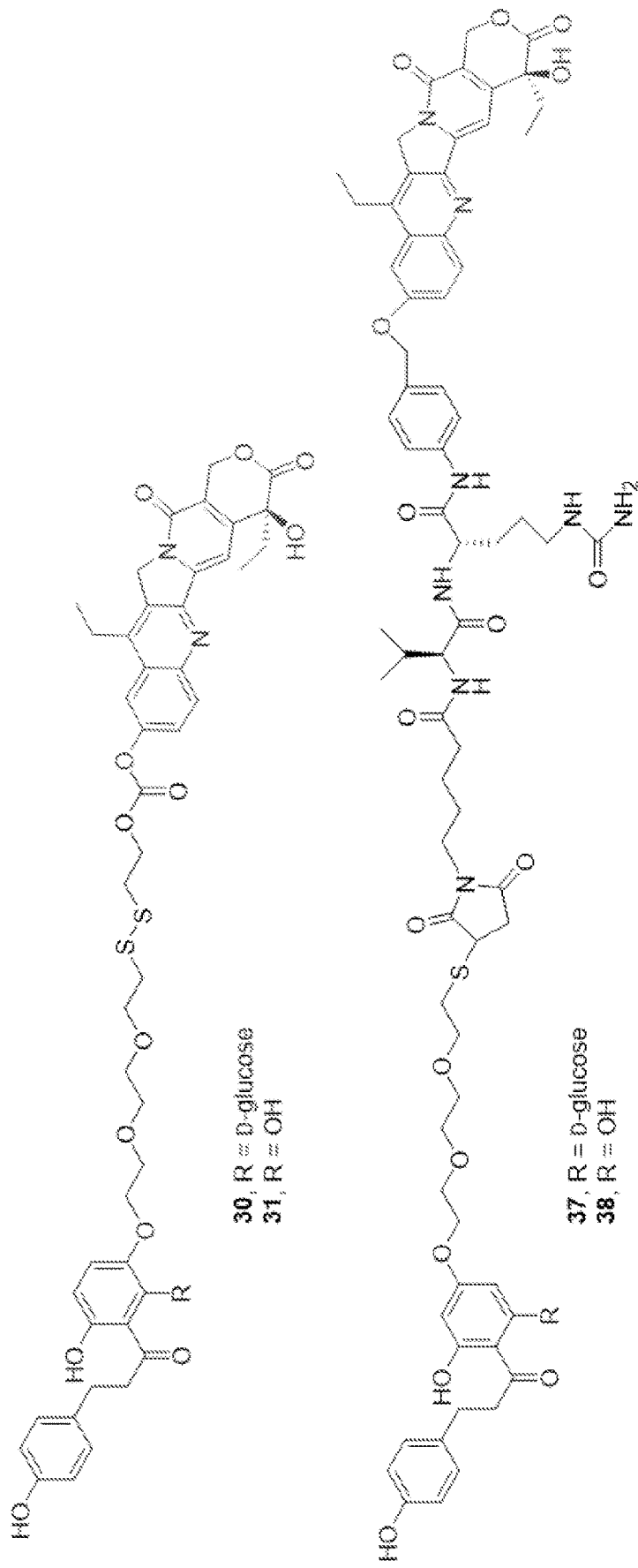
Figure 1:
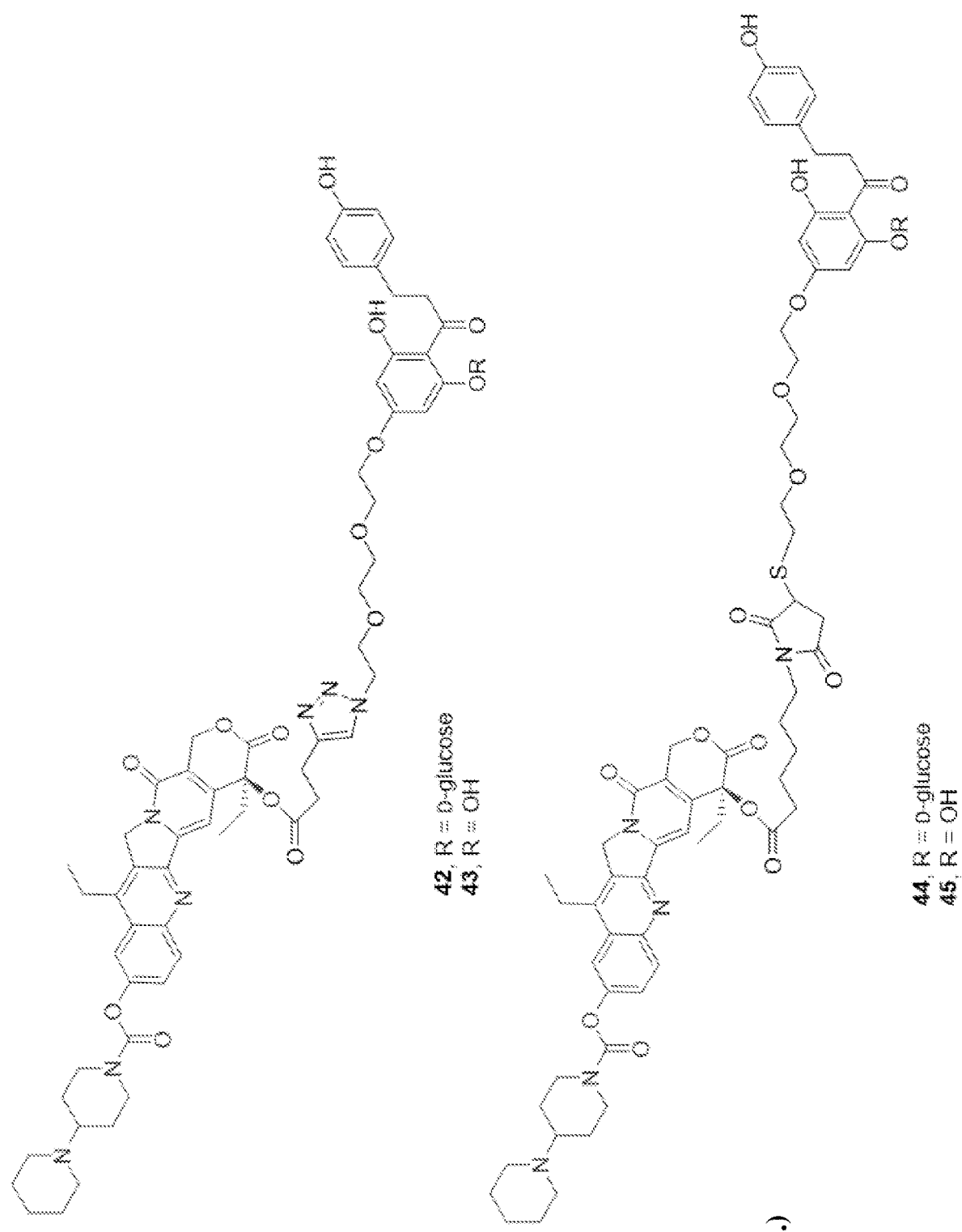
Figure 2A:
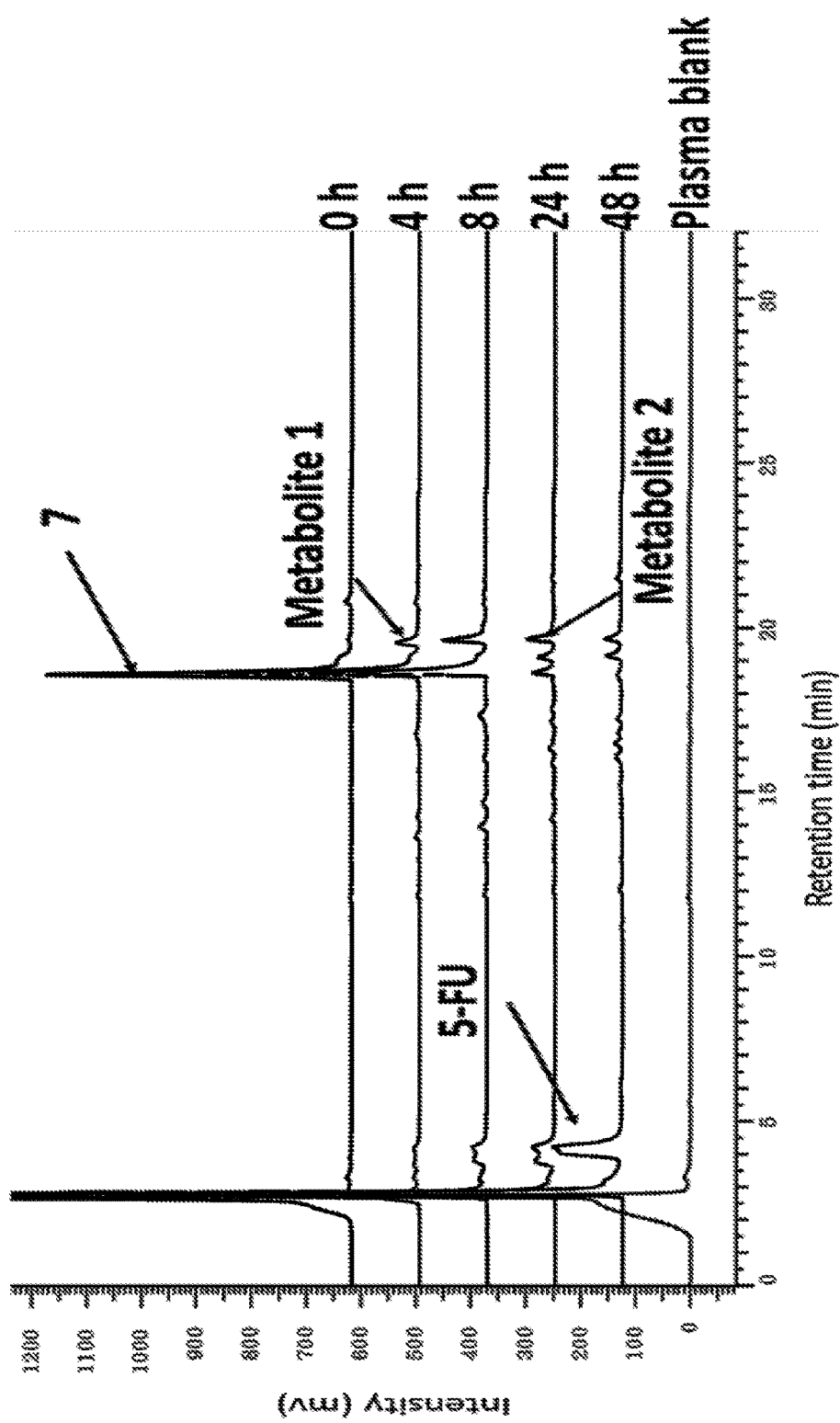
FIGS. 2A to 2D show in vitro plasma stability and release profiles of compounds 5, 7, and 9 under different conditions.
Figure 2B:
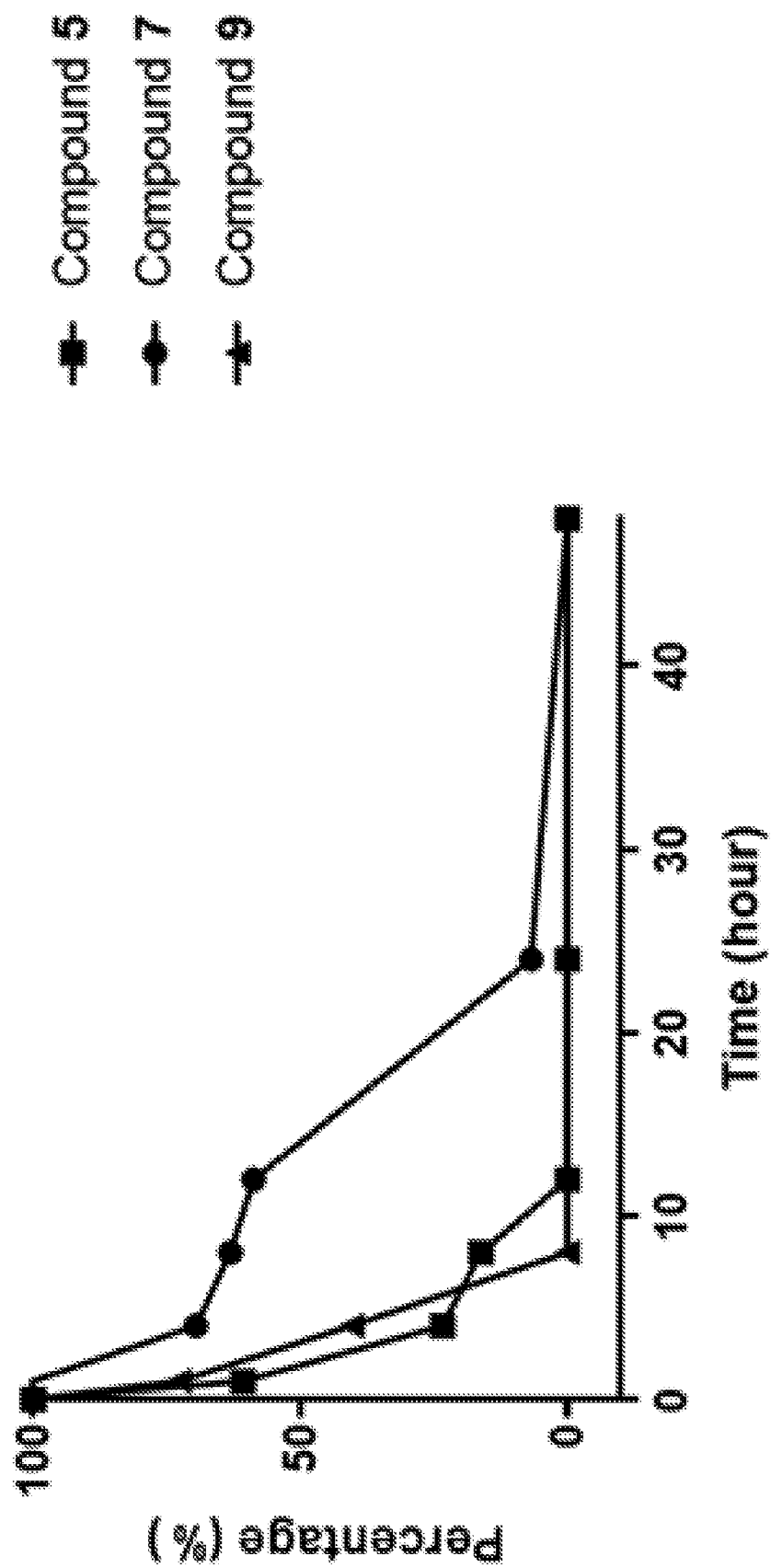
Figure 2C:
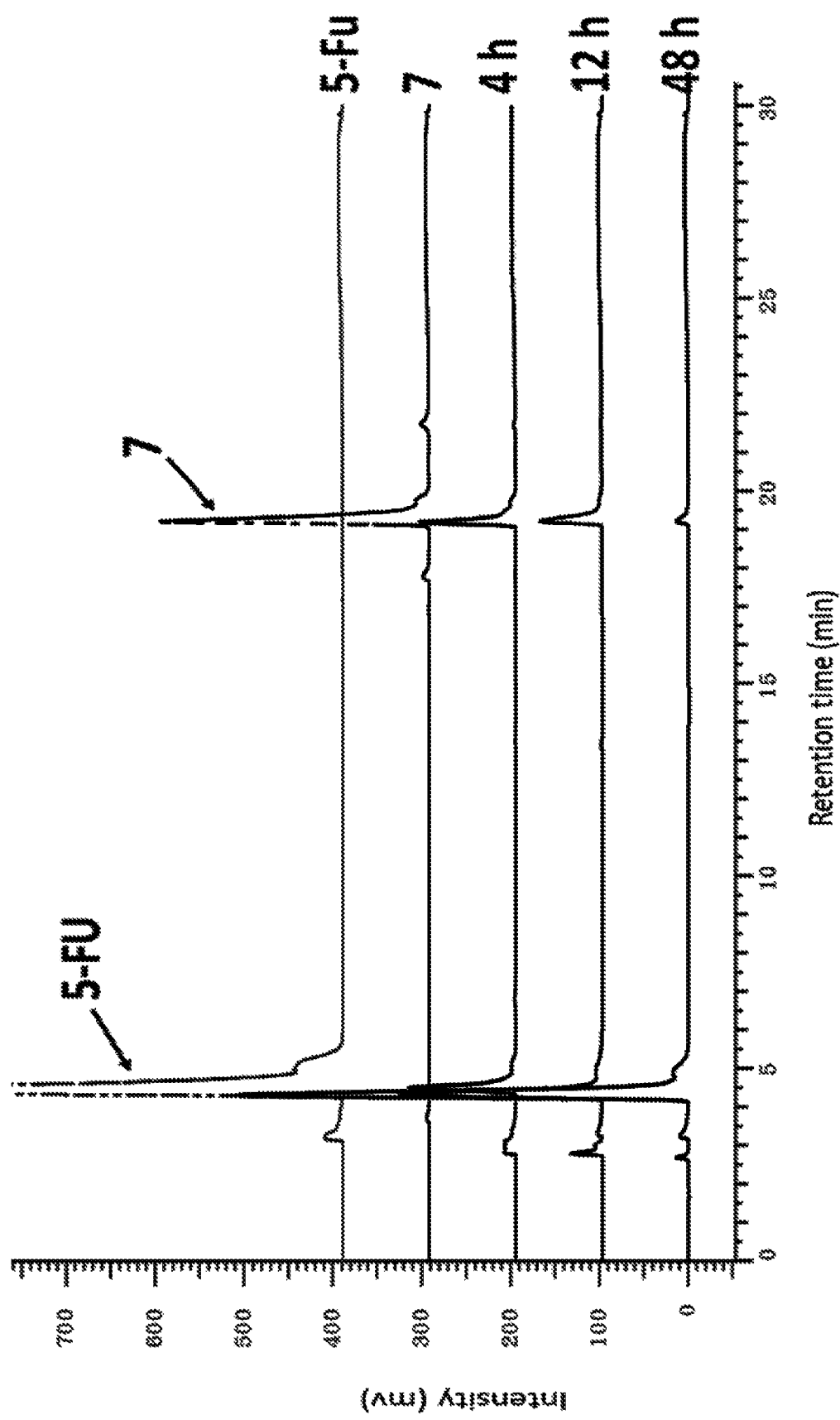
Figure 2D:
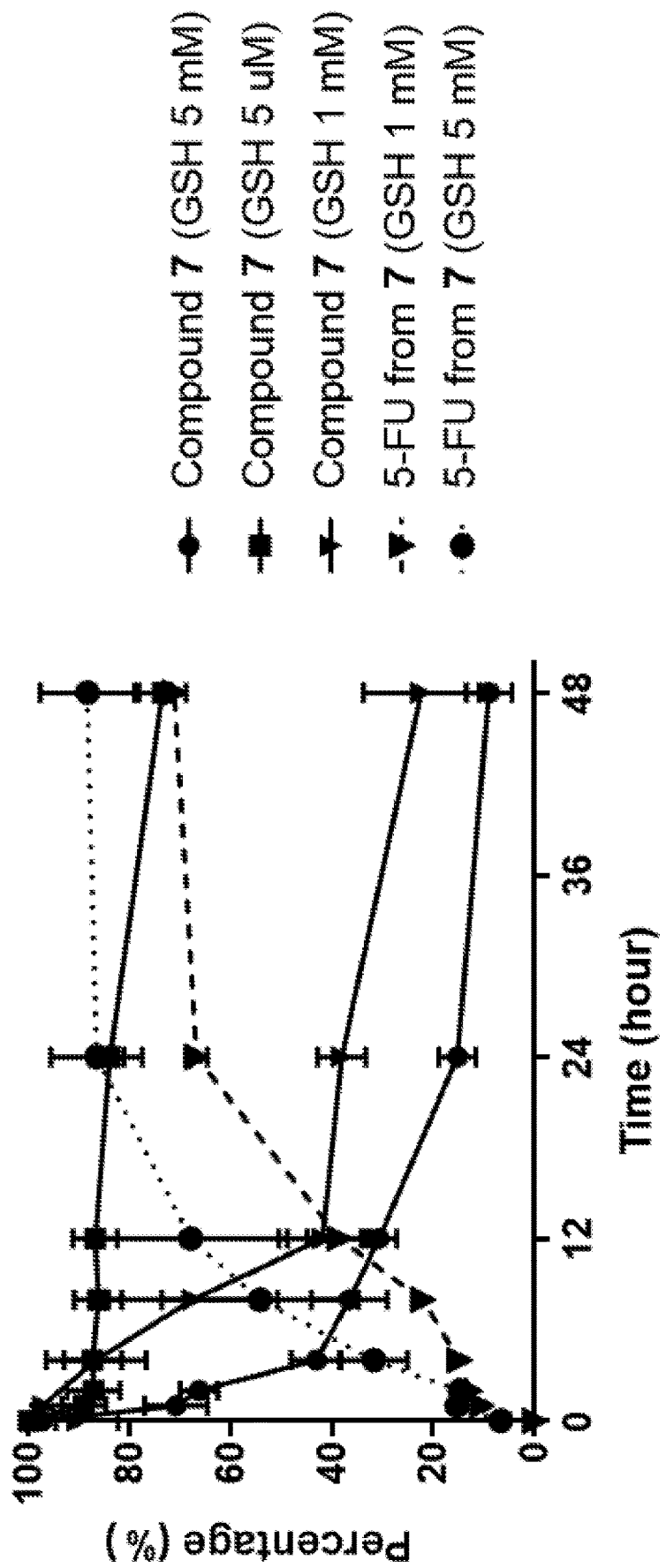
Figure 3A:
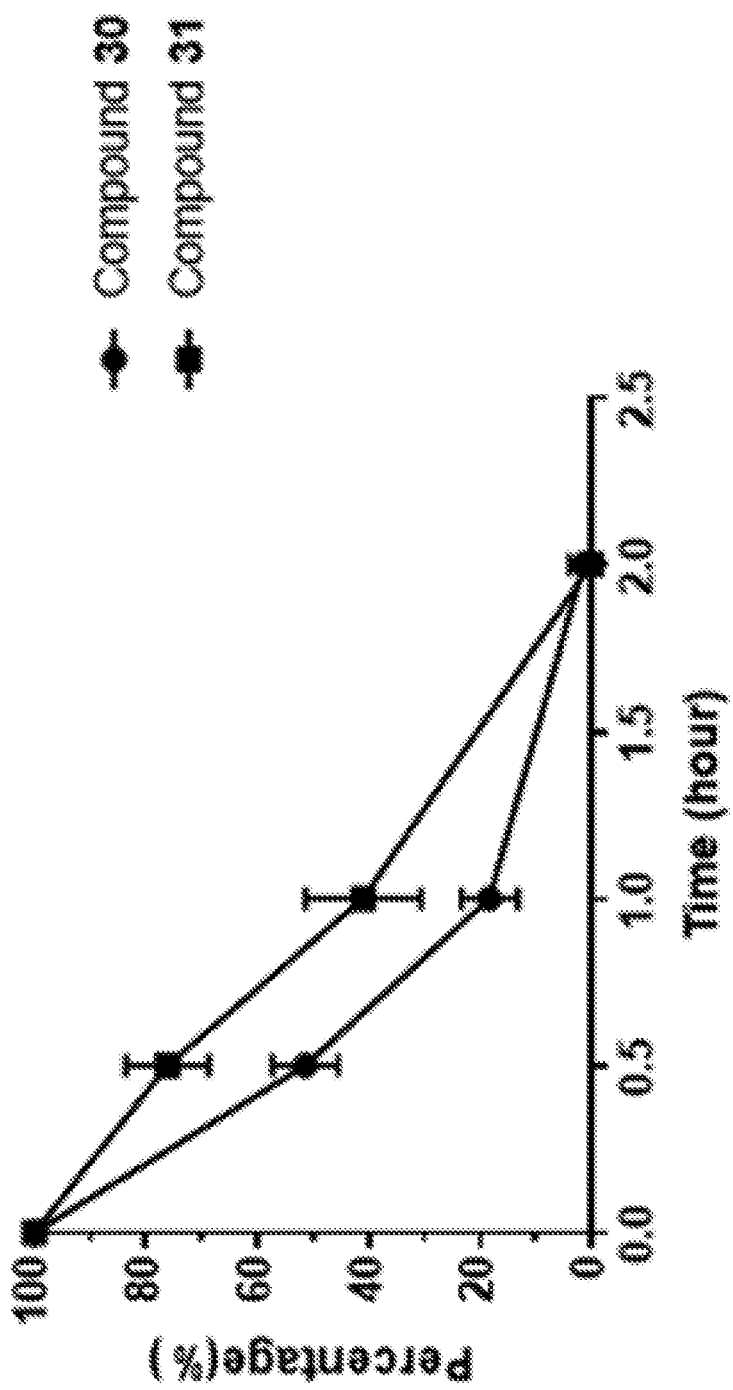
FIGS. 3A to 3D show in vitro plasma stability and release profiles of compounds 30 and 31 under different conditions.
Figure 3B:
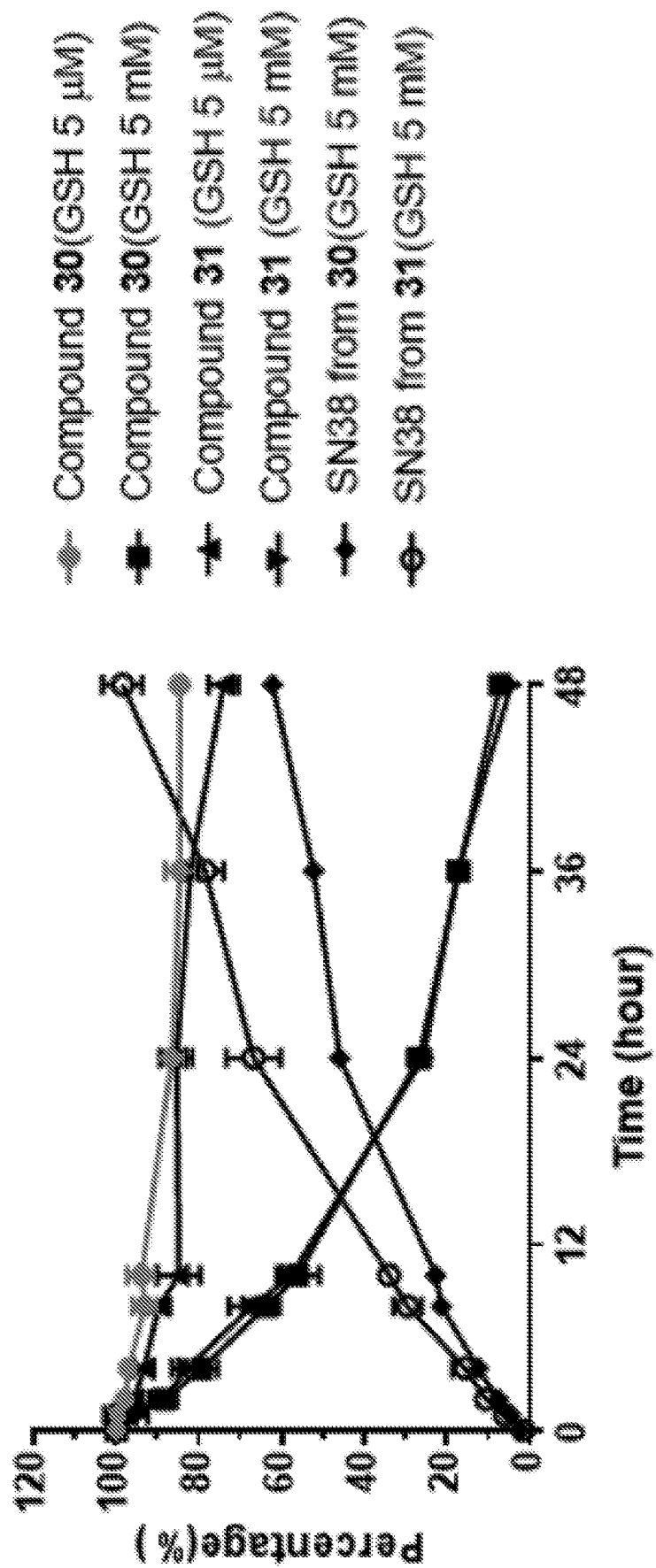
Figure 3C:
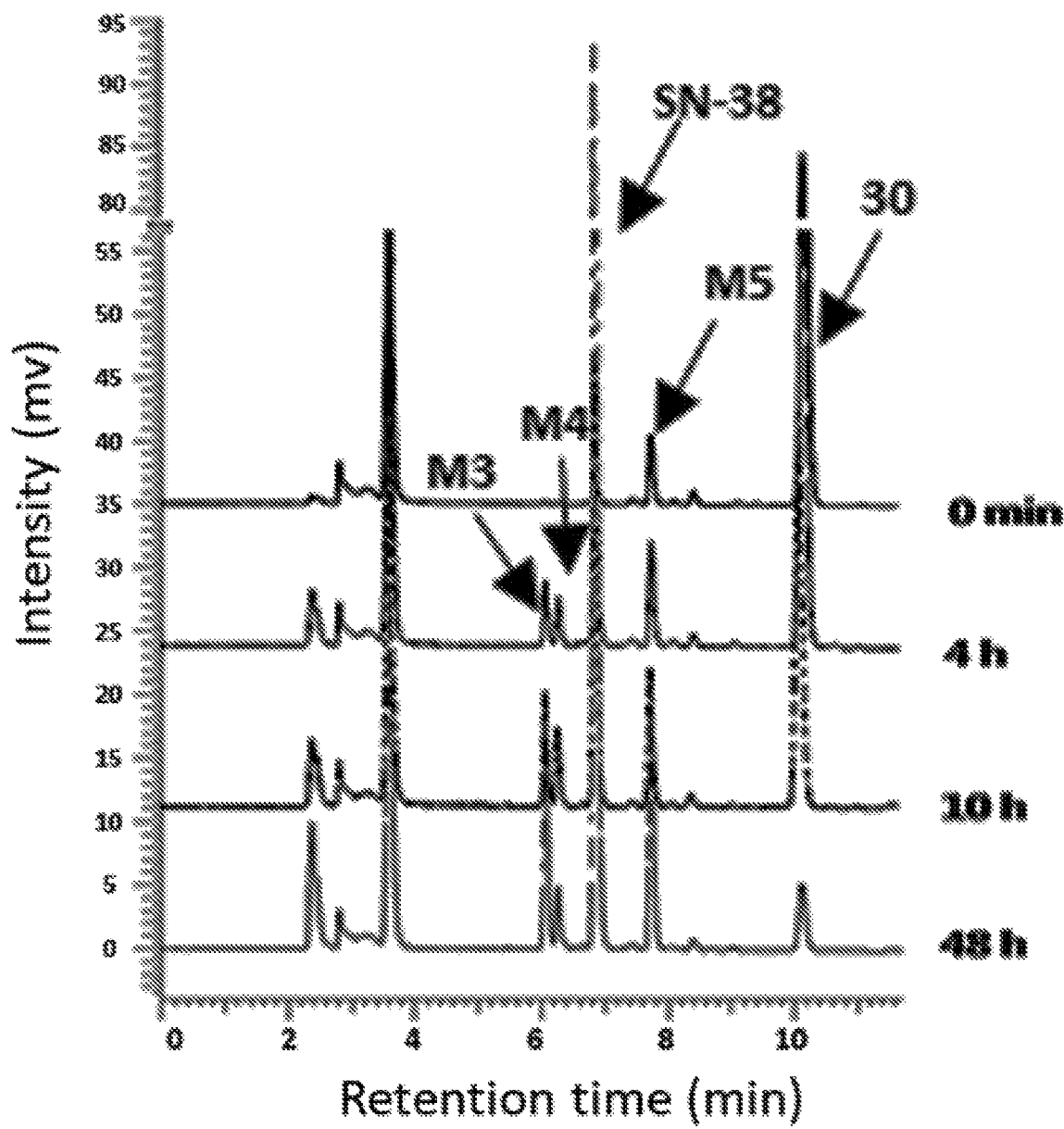
Figure 3D:
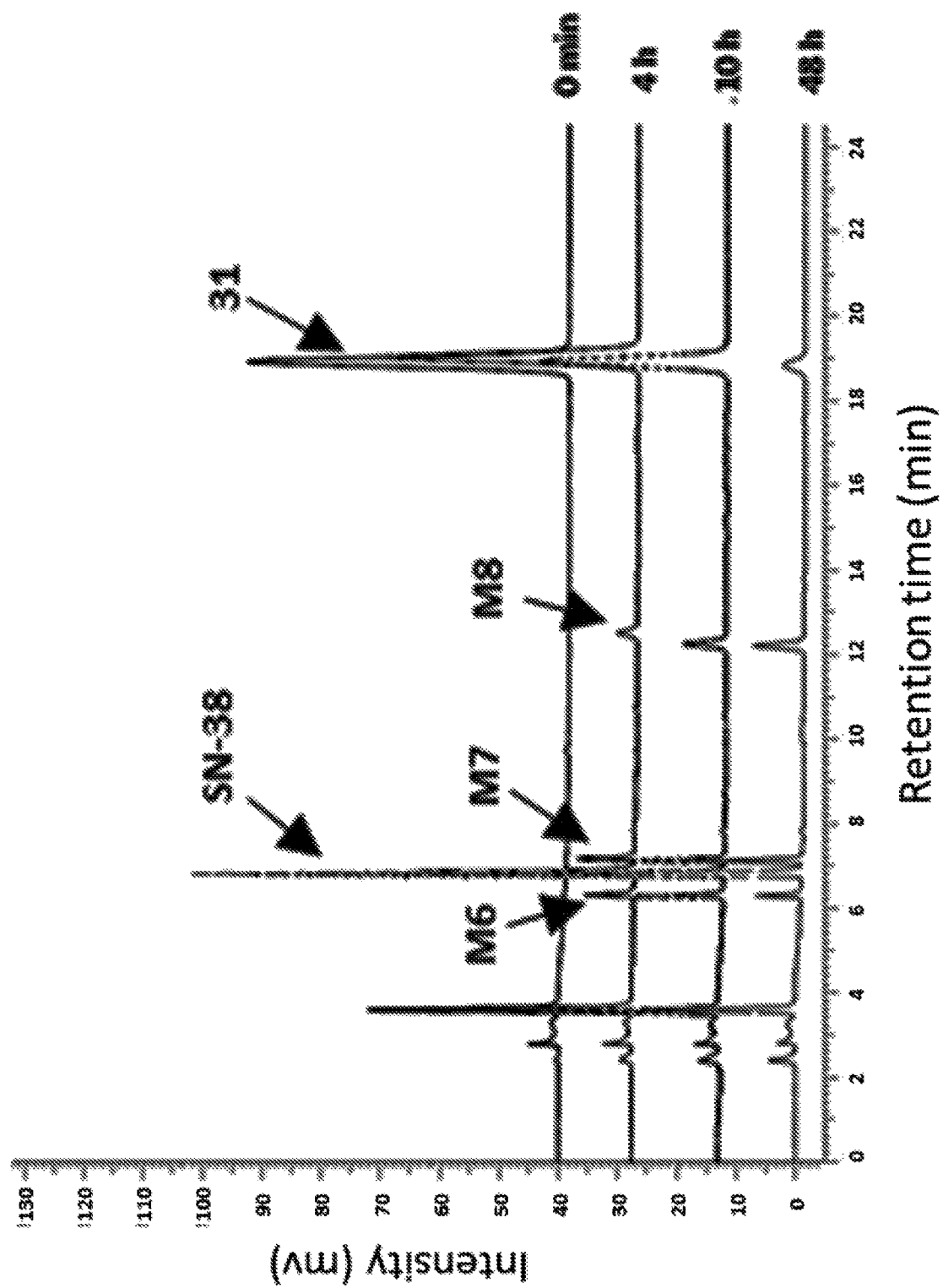

Unless otherwise defined, all technical and scientific terms used herein have the same meaning as commonly understood by one of ordinary skill in the art to which this invention pertains. In the case of conflict, the present document, including definitions will control. As used in this specification and the appended claims, the singular forms "a," "an" and "the" include plural references unless the content clearly dictates otherwise.

Throughout this specification, unless the context requires otherwise, the word "comprise," or variations such as "comprises" or "comprising," will be understood to imply the inclusion of a stated element or integer or group of elements or integers but not the exclusion of any other element or integer or group of elements or integers.

As used herein, the term "conjugate" refers to two or more molecules that are covalently linked into a larger construct. In some embodiments, a conjugate includes one or more specific-binding molecules covalently linked to one or more therapeutic molecules.

As used herein, the terms "Formula I" and "Formula III" may be hereinafter referred to as "conjugate (s) of the invention." Such terms are also defined to include all forms of the conjugate of Formula I or III, including hydrates, solvates, isomers, crystalline and non-crystalline forms, isomorphs, polymorphs, and metabolites thereof. For example, the conjugates of the invention, or pharmaceutically acceptable salts thereof, may exist in unsolvated and solvated forms. When the solvent or water is tightly bound, the complex will have a well-defined stoichiometry independent of humidity. When, however, the solvent or water is weakly bound, as in channel solvates and hygroscopic compounds, the water/solvent content will be dependent on humidity and drying conditions. In such cases, non-stoichiometry will be the norm.

Stereoisomers of Formula I or III include cis and trans isomers, optical isomers such as R and S enantiomers, diastereomers, geometric isomers, rotational isomers, conformational isomers, and tautomers of the compounds of the invention, including compounds exhibiting more than one type of isomerism; and mixtures thereof (such as racemates and diastereomeric pairs). Also included are acid addition or base addition salts wherein the counterion is optically active, for example, D-lactate or L-lysine, or racemic, for example, DL-tartrate or DL-arginine.

When any racemate crystallizes, crystals of two different types are possible. The first type is the racemic compound (true racemate) referred to previously wherein one homogeneous form of crystal is produced containing both enantiomers in equimolar amounts. The second type is the racemic mixture or conglomerate wherein two forms of crystal are produced in equimolar amounts each comprising a single enantiomer.

The conjugates of Formula I or III may exhibit the phenomenon of tautomerism; such tautomers are also regarded as compounds of the invention. All such tautomeric forms, and mixtures thereof, are included within the scope of conjugates of Formula I or III. Tautomers exist as mixtures of a tautomeric set in solution. In solid form, usually, one tautomer predominates. Even though one tautomer may be described, the present invention includes all tautomers of the conjugates of Formula I or III and salts thereof.

The phrase "pharmaceutically acceptable salt," as used herein, unless otherwise indicated, includes salts of acidic or basic groups which may be present in the compounds described herein. The compounds used in the methods of the invention that are basic in nature are capable of forming a wide variety of salts with various inorganic and organic acids. The acids that may be used to prepare pharmaceutically acceptable acid addition salts of such basic compounds are those that form non-toxic acid addition salts, i.e., salts containing pharmacologically acceptable anions, such as the acetate, benzenesulfonate, benzoate, bicarbonate, bisulfate, bitartrate, borate, bromide, calcium edetate, camsylate, carbonate, chloride, clavulanate, citrate, dihydrochloride, edetate, edisylate, estolate, esylate, ethylsuccinate, fumarate, gluceptate, gluconate, glutamate, glycollylarsanilate, hexylresorcinate, hydrabamine, hydrobromide, hydrochloride, iodide, isethionate, lactate, lactobionate, laurate, malate, maleate, mandelate, mesylate, methylsulfate, mucate, napsylate, nitrate, oleate, oxalate, pamoate (embonate), palmitate, pantothenate, phosphate/diphosphate, polygalacturonate, salicylate, stearate, subacetate, succinate, tannate, tartrate, teoclate, tosylate, triethiodode, and valerate salts.

As used herein, the term "active pharmaceutical moiety" refers to a moiety of an active pharmaceutical ingredient (API) that has physiologic, pharmaceutical, pharmacological, or therapeutic effects. The term is intended to include the API in any suitable form such as e.g. a pharmaceutically acceptable salt, complex, solvate or prodrug thereof of or, if relevant, in any stereoisomer form including any enantiomeric or racemic form, or a combination of any of the above. Examples of API include, but are not limited to, a hormone, a peptide, a small molecule, or a prodrug thereof. In another aspect, the active pharmaceutical moiety may be a biomolecule comprising of one or more chemical group(s) typically synthesized in living organisms, including but not limited to, an amino acid, a nucleotide, a polysaccharide, a simple sugar, a lipid, or a combination thereof.

As used herein, the term "prodrug" refers to any substance, molecule, or entity that is in a form based on that substance, molecule, or entity to act as a therapeutic agent after the chemical or physical change. Prodrugs can be covalently linked or sequestered in some way and released or converted to the active pharmaceutical moiety before, during, or after administration to a mammalian subject. Prodrugs can be prepared by modifying functional groups present in the compounds in such a way that the modification is cleaved, either in routine manipulation or in vivo, to the parent compounds. Prodrugs include compounds in which hydroxyl, amino, sulfhydryl, or carboxyl groups are attached to any group that, when administered to a mammalian subject, cleaves to form a hydroxyl, amino, sulfhydryl, or free carboxyl group respectively.

As used herein, the term "targeting module" refers to a moiety of a molecular construct that is capable of binding directly or indirectly to a target of interest (e.g., a receptor on the surface of a cell or a protein in a tissue), and thus is capable of facilitating the delivery of the molecular construct of the invention to the target of interest. In certain examples, the targeting module can direct the molecular construct to a location adjacent to a target cell. In other cases, the targeting module can specifically bind to a molecule on the surface of the target cell; or the targeting module may specifically bind to a second molecule that is capable of specifically binding to a molecule on the surface of the target cell. In certain instances, once the targeting module is engaged with the target of interest, the targeting module may internalize the molecular construct of the invention, allowing it to move into the cytoplasm of the target cell. The targeting module can be an antibody or ligand to a cell surface receptor; or a molecule that binds to the above-described antibody or ligand, thereby indirectly targeting the molecular construct of the invention to a target site (e.g., the surface of a selected cell).

As used herein, the term "glucose transporter" refers to sodium-dependent glucose transporters (SGLTs) or facilitative glucose transporters (GLUTs). The SGLTs carry glucose against concentration gradient into cells by coupling the uphill transport of sugar across the cell membrane with the downhill transport of sodium. The inward sodium gradient at the apical domain of epithelial cells is maintained by the ATP-driven active extrusion of sodium across the basolateral domain on the antiluminal surface of the cell. Phlorizin specifically and competitively inhibits both SGLT-1 and SGLT-2 and does not affect GLUT 1 through 12.

Among GLUT 1 through 12, the insulin-independent glucose transporter GLUT-1 is widely overexpressed in human cancers, and high expression levels of these proteins in tumor biopsy samples correlate with poor cancer prognosis, making it an attractive therapeutic target. Phloretin is a well-known and naturally abundant GLUT-1 inhibitor. In addition, many glucose transporter 1-4 inhibitors have been identified, for example, Cytochalasin B, WZB117, GLUT-1, GLUT-2, BAY-876, Chromopynone-1, Glutor, Glupin, NV-5440, as disclosed in ChemBioChem 2020, 21, 45-52.

As used herein the term "anticancer therapeutic moiety" refers to a moiety of an anticancer drug that encompasses all chemical or physical interventions that are used for the treatment of cancer. The anticancer drug includes chemotherapeutical agents such as cytotoxic agents or immunotoxic agents but also radioactively labeled antibodies, peptides, and chemical substances, which might emit alpha, beta, and gamma rays as well as electrons. The radiotherapy further includes photons of sufficiently high energy, charged particles such as electrons, positrons, muons, protons, alpha particles, and heavy atomic nuclei from accelerators, but also neutrons and gamma rays. In some embodiments, the anticancer drug may be selected from 5-fluorouracil (5-FU), SN-38, irinotecan, lonidamine, bleomycin, mitomycin, cis-platinum, doxorubicin, DM-1, taxol, cabazitaxel, floxuridine or FdUMP.

As used herein, the term "substituted" means that one or more hydrogens on the designated atom are replaced with a selection from the indicated group, provided that the designated atom's normal valency under the existing circumstances is not exceeded and that the substitution results in a stable compound.

As used herein, the term "optionally substituted" refers to a group that is unsubstituted or substituted with one or more substituents.

As used herein, the terms "treatment" and "treating" embrace both preventative, i.e. prophylactic, or therapeutic, i.e. curative and/or palliative, treatment. Thus, the terms "treatment" and "treating" comprise therapeutic treatment of patients having already developed said condition, particularly in manifest form. Therapeutic treatment may be symptomatic treatment in order to relieve the symptoms of the specific indication or causal treatment in order to reverse or partially reverse the conditions of the indication or to stop or slow down the progression of the disease. Thus, the conjugates, compositions, and methods of the present disclosure may be used for instance as therapeutic treatment over a period of time as well as for chronic therapy. In addition, the terms "treatment" and "treating" comprise prophylactic treatment, i.e., a treatment of patients at risk to develop a condition mentioned hereinbefore, thus reducing said risk.

As used herein, the term "therapeutically effective amount" means an amount of a conjugate of the present disclosure that (i) treats or prevents the particular disease or condition, (ii) attenuates, ameliorates, or eliminates one or more symptoms of the particular disease or condition, or (iii) prevents or delays the onset of one or more symptoms of the particular disease or condition described herein.

"Cancer," "tumor," and like terms include precancerous, neoplastic, transformed, and cancerous cells, and can refer to a solid tumor, or non-solid cancer (see, e.g., Edge et al. AJCC Cancer Staging Manual (7th ed. 2009); Cibas and Ducatman Cytology: Diagnostic principles and clinical correlates (3rd ed. 2009)). Cancer includes both benign and malignant neoplasms (abnormal growth). "Transformation" refers to spontaneous or induced phenotypic changes, e.g., immortalization of cells, morphological changes, aberrant cell growth, reduced contact inhibition, anchorage, and/or malignancy (see, Freshney, Culture of Animal Cells a Manual of Basic Technique (3rd ed. 1994)). Although transformation can arise from infection with a transforming virus and incorporation of new genomic DNA or uptake of exogenous DNA, it can also arise spontaneously or following exposure to a carcinogen.

Conjugates and their General Preparation Procedures

In one embodiment of a first aspect of the present disclosure, the conjugate is represented by Formula I, $$A\text{-}L\text{-}B \qquad (I)$$

or a pharmaceutically acceptable salt thereof.

A is an active pharmaceutical moiety or a prodrug thereof; particularly, an anticancer therapeutic moiety, and in some embodiments of the disclosure, 5-fluorouracil (5-FU), SN-38, irinotecan, lonidamine, bleomycin, mitomycin, cis-platinum, doxorubicin, DM-1, taxol, cabazitaxel, floxuridine or FdUMP.

B is a targeting module. In some embodiments of the disclosure, B is a targeting module targeting a tumor cell such as a glucose transporter-specific binder. In some embodiments, the glucose transporter is sodium-dependent glucose transporters (SGLTs) or facilitative glucose transporters (GLUTs). In some further embodiments, B may be selected from phloretin optionally substituted with glucose, mannose, or 2-fluoro-glucose.

Cancer cells rely on anaerobic glycolysis pathways to a greater extent than mitochondrial oxidative phosphorylation compared to non-cancer cells, the so-called Warburg effect. There are two categories of glucose transporters that enable cancer cells to uptake glucose: (i) facilitative GLUT (1 to 4), and (ii) secondary active sodium-glucose cotransporters (SGLT-1 to 2). While not wishing to be limited by theory, it is believed that tumor cells overexpress glycolysis enzymes and glucose transporters, both of which were correlated with the invasiveness and metastatic potentials of cancers. Specimens from CRC patients treated with 5-FU were found to have higher transcripts levels of glucose transporters in those being refractory to the therapy, and overexpression of glucose transporters is known to be associated with 5-FU resistance in colon cancer cells through pyruvate scavenging of free radicals.

Phloretin, a well-known and naturally abundant GLUT-1 inhibitor, has been investigated for its anticancer activities, and demonstrated the ability to overcome therapeutic resistance of anticancer agents when administered in combination therewith in preclinical studies. Phlorizin is a SGLT-1 inhibitor which differs from phloretin in that it bears an additional glucose conjugate at ortho-hydroxyl of phenyl moiety. Since these glucose transporters are physiologically expressed in a wide array of cells and tissues, phloretin or phlorizin has the ability to selectively target the SGLT-1 or GLUT-1 on cancer cells.

L is a linker represented by Formula II

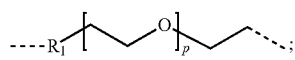

(II)

wherein
$R_1$ is —$SR_2$, or

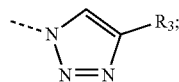

$R_2$ is $R_3$, —$SR_3$, or

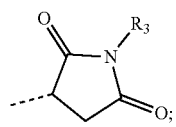

$R_3$ is —$(CH_2)_n$—$R_4$;
$R_4$ is $R_5$, —OC(O)—$R_5$, —C(O)—$R_5$, —C(O)NH—$R_5$, —C(O)—, —NHC(O)—$R_5$, —OC(O)O—$R_5$, or —C(O)—Z—NH-phenylene-$R_5$;
$R_5$ is —$(CH_2)_m$—;
Z is -Val-Cit-, -Phe-Lys-, -Val-Ala- or -Gly-Phe-Leu-Gly-;
p is an integer of 2 to 9;
n is an integer of 2 to 9;
m is 0 or 1; and
the dashed line is a covalent bond.

L is redox-sensitive and/or bio-cleavable in a tumor environment. When the conjugate is present in a normal environment, L is intact and connects A and B. When the conjugate is present in a GSH-enriched or cathepsin B-enriched environment, L is cleaved, and A is released for exhibiting the pharmaceutical activity.

Examples of L include, but are not limited to, a redox-sensitive and/or bio-cleavable linker, a succinimidyl thioether, a disulfide linker, triazole, a valine-citrulline dipeptide, a para-amino benzyl spacer, and an ether linkage.

In one embodiment,
$R_1$ is —$SR_2$; $R_2$ is

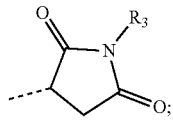

$R_3$ is —$(CH_2)_n$—$R_4$; $R_4$ is —C(O)—$R_5$; $R_5$ is —$(CH_2)_m$—; p is 2; n is 5; and m is 0.

In one embodiment, $R_1$ is —$SR_2$; $R_2$ is —$SR_3$; $R_3$ is —$(CH_2)_n$—$R_4$; $R_4$ is —OC(O)—$R_5$, or —OC(O)O—$R_5$; $R_5$ is —$(CH_2)_m$—; p is 2; n is 2; and m is 0.

In one embodiment, $R_1$ is $SR_2$; $R_2$ is

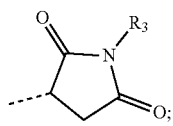

$R_3$ is —$(CH_2)_n$—$R_4$; $R_4$ is —C(O)—Z—NH-phenylene-$R_5$; $R_5$ is —$(CH_2)_m$—; Z is -Val-Cit-; p is 2; n is 4; and m is 1.

In one embodiment, $R_1$ is

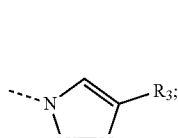

$R_3$ is —$(CH_2)_n$—$R_4$; $R_4$ is —C(O)O—$R_5$; $R_5$ is —$(CH_2)_m$—; p is 2; n is 3; and m is 1.

In one embodiment, $R_1$ is —$SR_2$; $R_2$ is

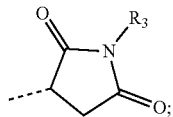

$R_3$ is —$(CH_2)_n$—$R_4$; $R_4$ is —C(O)O—$R_5$; $R_5$ is —$(CH_2)_m$—; p is 2; n is 4; and m is 1.

In one embodiment, $R_1$ is —$SR_2$; $R_2$ is —$SR_3$; $R_3$ is —$(CH_2)_n$—$R_4$; $R_4$ is —C(O)O—$R_5$; $R_5$ is —$(CH_2)_m$—; p is 2; n is 3; and m is 1.

In some embodiments of the disclosure, the conjugate is not a compound selected from the group consisting of:
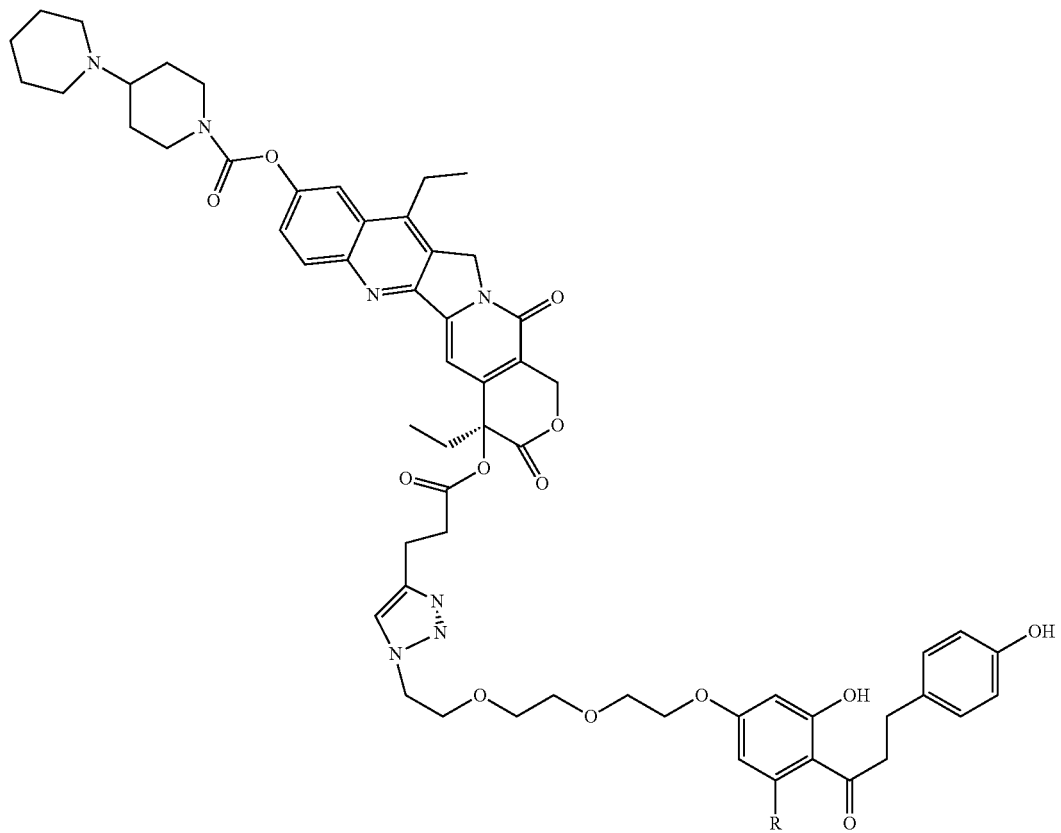
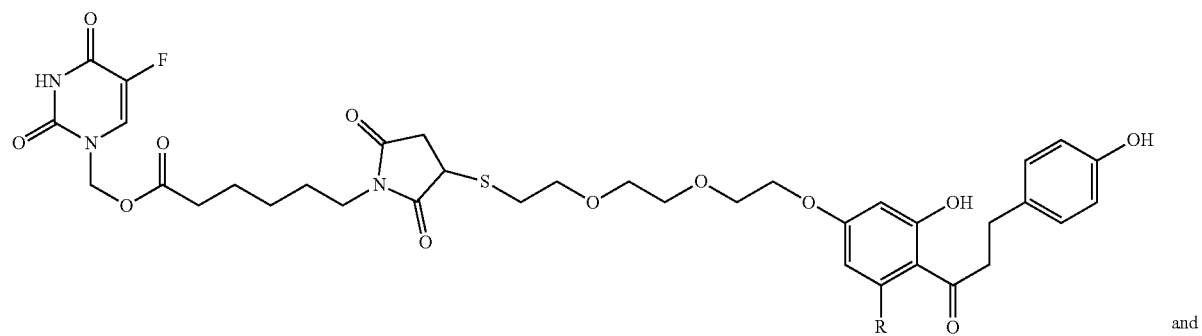
and

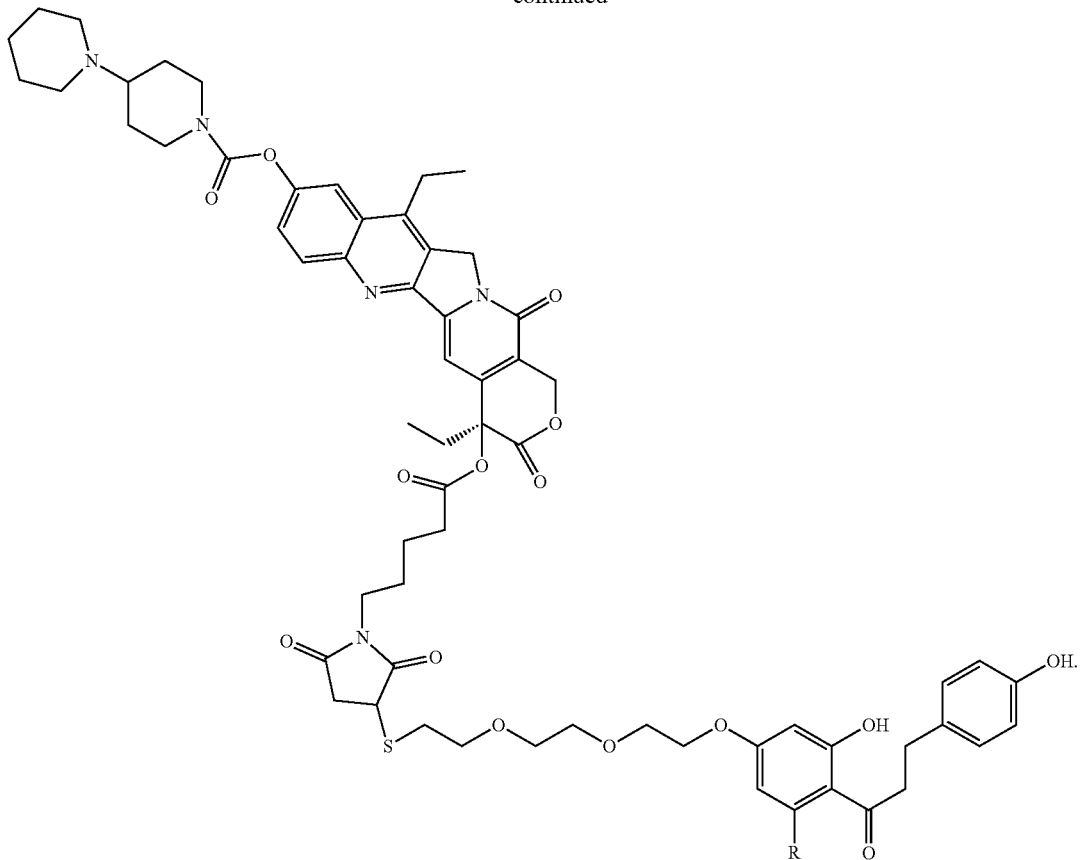
In one embodiment of the conjugate or a pharmaceutically acceptable salt thereof, the conjugate is represented by Formula III
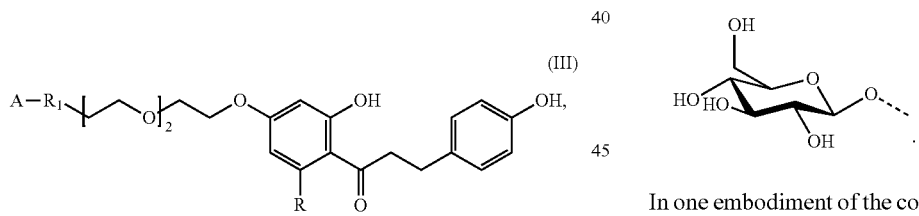
wherein
R is OH or
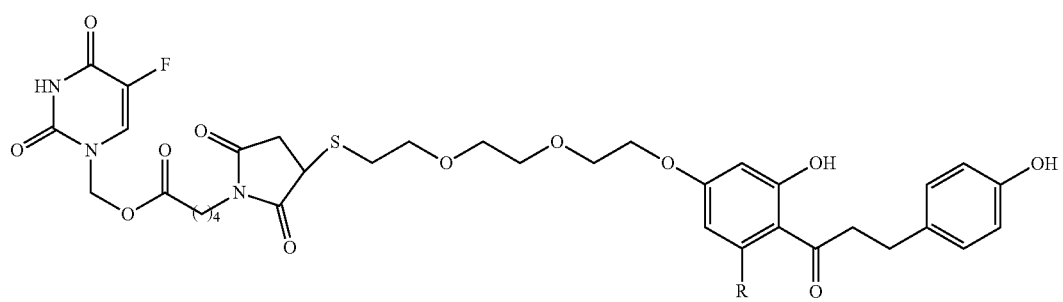
In one embodiment of the conjugate or a pharmaceutically acceptable salt thereof, the conjugate is selected from the group consisting of:

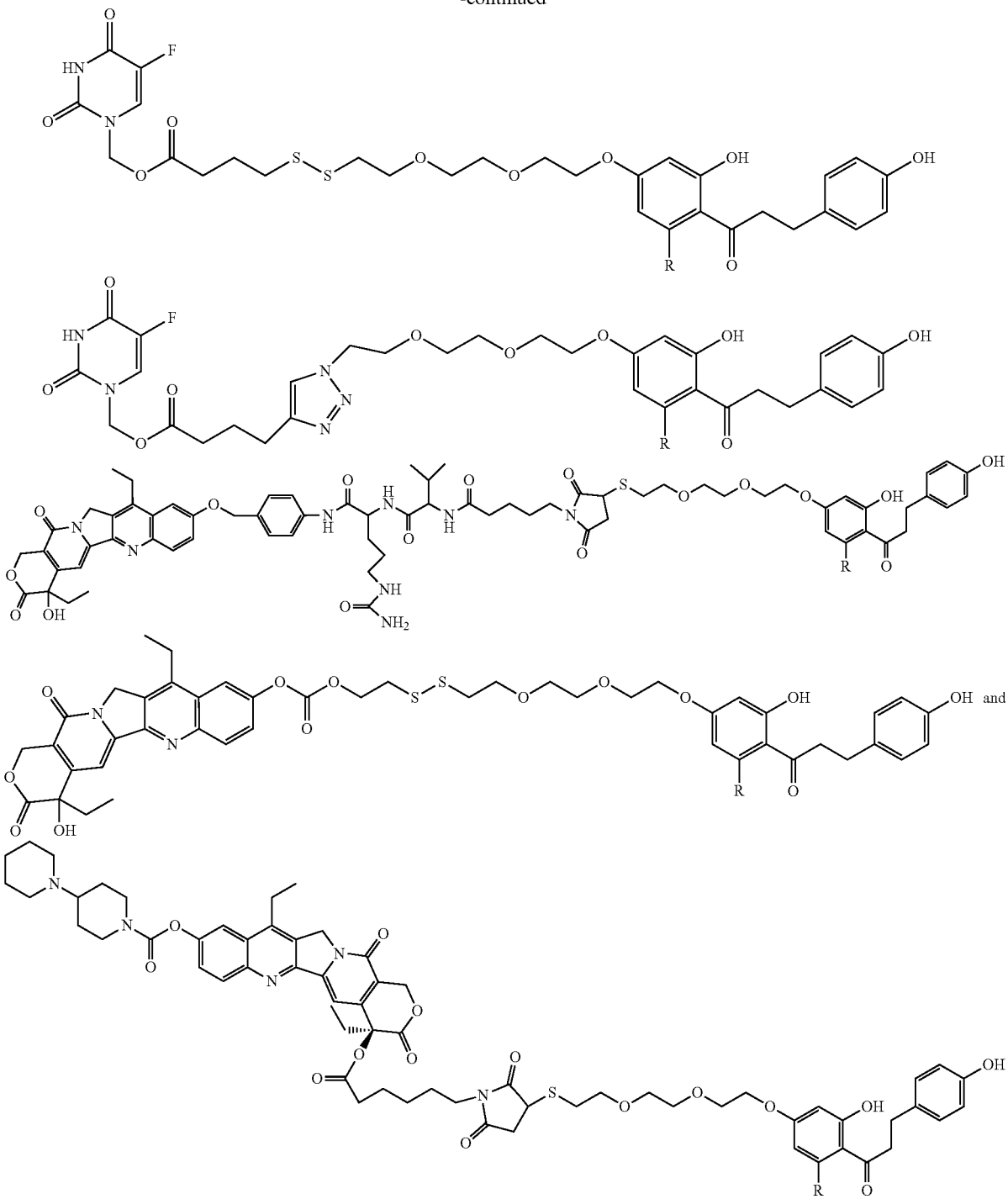

wherein R is OH or

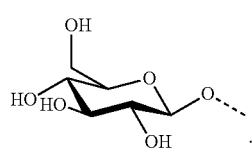

In some embodiments of the disclosure, compounds 4-7, 30-31, and 44-45 wherein phloretin 3 (or phlorizin 2) are connected to 5-FU, SN-38, or irinotecan through a redox-sensitive linker. In compounds 4-5, a succinimidyl thioether (a moderately sensitive linker) is used, whereas compounds 6-7 and 30-31 incorporate a disulfide linker (a highly sensitive linker) instead. Compounds 8-9 and 42-43, incorporating triazole conjugates as a stable linker bearing group are also provided. Due to the overexpression of cathepsin B in the tumor microenvironment, compounds 37 and 38, which were consisted of the valine-citrulline dipeptides, para-amino benzyl spacer, and ether linkage, released SN-38 by the activation of cathepsin B and 1,6-elimination.

The compounds of formula I of the present disclosure are prepared according to general chemical synthetic procedures. The preparation of the embodiments of the compounds of the present disclosure is illustrated as follows.

Pharmaceutical Compositions and Treatments of the Methods of the Present Disclosure One embodiment of a second aspect of the present disclosure is a method for treating a disease, recurrence, or progression in a subject or increasing the likelihood of survival over a relevant period in a subject diagnosed with a disease, comprising administering to the subject the conjugate as described herein or a pharmaceutically acceptable salt thereof.

In some embodiments of the disclosure, a series of drug conjugates comprising 5-FU, SN-38, irinotecan, and either phlorizin or phloretin joined with a succinimidyl thioether, disulfide, triazole, or cathepsin B sensitive linker has been designed, synthesized, and biologically evaluated. In 5-FU series prodrugs, most of these compounds were less potent against CRC cell lines than 5-FU; however, compound 7, incorporating 5-FU, phloretin, and a disulfide bond, showed good stability ($t_{1/2}$=13 h) in human plasma and lability in the presence of 5 mM GSH ($t_{1/2}$=10.3 h), and its cytotoxicity towards HCT-116 and HT-29 cell lines was similar to that of 5-FU. In an orthotopic mice CRC model, compound 7 exhibited excellent antitumor efficacy and low toxicities, reducing tumor volume by 67% (only a 33% reduction was seen with 5-FU) without body weight loss. The colon-targeting effect was a consequence of high tissue penetration and GLUT-1 targeting efficacy, leading to considerable tumor inhibition in comparison to 5-FU. In SN-38 series prodrugs, although compound 31 showed similar cytotoxicity to SN-38 in cell assay, it exhibited better anti-tumor efficacy than irinotecan by reducing the tumor volume by 70% (only a 27% reduction was seen with irinotecan) with 65% free of SN-38 via i.p. route. Compound 38 (40 or 20 mg/kg) also exhibited good therapeutic efficacy than irinotecan (40 mg/kg) in a dose-dependent manner via i.v. injection, when only 43% or 22% of SN-38 was given. Besides, both compounds 31 and 38 did not decrease the body weight during the treatment. Targeting GLUT with cytotoxic small molecule drugs conjugated with the glutathione-sensitive and/or cathepsin B linkers is therefore proposed as a novel strategy for the treatment of CRC.

In one embodiment, the present disclosure provides a method for treating cancer in a subject, comprising administering to the subject an effective amount of the conjugate of the present disclosure. Such a method includes administering the conjugate of the present disclosure to a subject in an amount sufficient to treat the condition. For example, the cancers include but are not limited to the group consisting of squamous cell cancer, lung cancer including small-cell lung cancer, non-small cell lung cancer, adenocarcinoma of the lung and squamous carcinoma of the lung, cancer of the peritoneum, hepatocellular cancer, gastric or stomach cancer including gastrointestinal cancer, pancreatic cancer, glioblastoma, cervical cancer, ovarian cancer, liver cancer, bladder cancer, hepatoma, breast cancer, colon cancer, rectal cancer, colorectal cancer, endometrial or uterine carcinoma, salivary gland carcinoma, kidney or renal cancer, prostate cancer, vulval cancer, thyroid cancer, hepatic carcinoma, anal carcinoma, penile carcinoma, head and neck cancer, lymphomas, leukemias, myelomas, and myeloproliferative neoplasms.

The conjugate may be formulated into pharmaceutical compositions that may be administered orally, parenterally, by inhalation spray, topically, rectally, nasally, buccally, vaginally, or via an implanted reservoir. The term "parenteral" as used herein includes subcutaneous, intravenous, intramuscular, intra-articular, intra-synovial, intrasternal, intrathecal, intrahepatic, intralesional and intracranial injection or infusion techniques. Pharmaceutically acceptable carriers and diluents are familiar to those skilled in the art. For compositions formulated as liquid solutions, acceptable carriers and/or diluents include saline and sterile water, and may optionally include antioxidants, buffers, bacteriostats, and other common additives. The compositions can also be formulated as pills, capsules, granules, or tablets which contain, in addition to a compound of the invention, diluents, dispersing and surface-active agents, binders, and lubricants.

Pharmaceutical compositions within the scope of the present invention include all compositions where a compound of the present invention is combined with a pharmaceutically acceptable carrier. In one embodiment, the compound is present in the composition in an amount that is effective to achieve its intended therapeutic purpose. While individual needs may vary, a determination of optimal ranges of effective amounts of each compound is within the skill of the art.

The conjugate of the present disclosure may be useful in combination with one or more second therapeutic agents, particularly therapeutic agents suitable for the treatment and/or prevention of the conditions and diseases presented previously.

In one embodiment, the conjugate is present in the composition in an amount that is effective to achieve its intended therapeutic purpose. While individual needs may vary, a determination of optimal ranges of effective amounts of each compound is within the skill of the art.

The conjugate of the present disclosure may be useful in combination with one or more second therapeutic agents, particularly therapeutic agents suitable for the treatment and/or prevention of the conditions and diseases presented herein.

For oral administration, suitable pharmaceutical compositions of the invention include powders, granules, pills, tablets, lozenges, chews, gels, and capsules as well as liquids, syrups, suspensions, elixirs, and emulsions. These compositions may also include anti-oxidants, flavorants, preservatives, suspending, thickening, and emulsifying agents, colorants, flavoring agents, and other pharmaceutically acceptable additives. Formulations for oral administration may be formulated to be immediate release or modified release, where modified release includes delayed, sustained, pulsed, controlled, targeted, and programmed release.

For parenteral administration, the compounds of the present invention are administered directly into the bloodstream, into muscle, or into an internal organ via an intravenous, intraarterial, intraperitoneal, intramuscular, subcutaneous, or other injection or infusion. Parenteral formulations may be prepared in aqueous injection solutions which may contain, in addition to the compound of the invention, buffers, antioxidants, bacteriostats, salts, carbohydrates, and other additives commonly employed in such solutions. Parenteral administrations may be immediate release or modified release (such as an injected or implanted depot).

The conjugate of the present disclosure may also be administered topically, (intra)dermally, or transdermally to the skin or mucosa. Typical formulations include gels, hydrogels, lotions, solutions, creams, ointments, dressings, foams, skin patches, wafers, implants, and microemulsions. Compounds of the present invention may also be administered via inhalation or intranasal administration, such as with a dry powder, an aerosol spray, or drops. Additional routes of administration for compounds of the present invention include intravaginal and rectal (by means of a suppository, pessary, or enema), and ocular and aural.

Examples

Chemistry

Synthetic Routes

Compounds 4-9, 30-31, 37-38, and 42-45 were constructed by sequential derivatization of the central linker (Scheme 1). Addition of triethylene glycol and TsCl to ethanol/H$_2$O resulted in the tosylated intermediate, to which was added potassium thioacetate in acetone. After this mixture was heated at reflux for 1 h, compound 11 was obtained in 85% yield. Hydrolysis of compound 11 was accomplished using potassium carbonate (0.05 M) to give compound 12 in 80% yield, the free thiol of which was protected using 2-methyl-2-propanethiol to give compound 13 in 71% yield. After mesylation and bromide substitution, brominated compound 14 was obtained with 57% yield. Alkylation of phlorizin (3) with compound 14 using potassium carbonate as a base gave compound 15 (54%) as a major product. The regioselective nature of this alkylation was presumably due to the electro-withdrawing effect of the carbonyl group at the para-position of the benzyl group, and the reduced steric hindrance at this position. Deprotection of t-butylthiol group by 4.0N NaOH and TCEP gave compound 16 in 86% yield, which was refluxed with 1.0N HCl at 90° C. for 3 h quenching with NaHCO$_3$(aq) to give compound 17 (73% yield).

Phlorizin and phloretin azide-containing analogs 20 and 21 were similarly prepared. Methanesulfonyl chloride (MsCl) was added slowly to a solution of triethylene glycol and triethylamine in DCM at 0° C., with stirring. After 20 min, the reaction mixture was concentrated and dissolved the residue in EtOH, to which was added NaN$_3$. After refluxing for 24 h, azide linker 18 was obtained. This was mesylated, and then the mesyl group was exchanged with bromine using lithium bromide to provide compound 19, which was used to derivatize phlorizin to give the desired intermediate 20. After hydrolysis, phloretin derivative 21 was obtained.

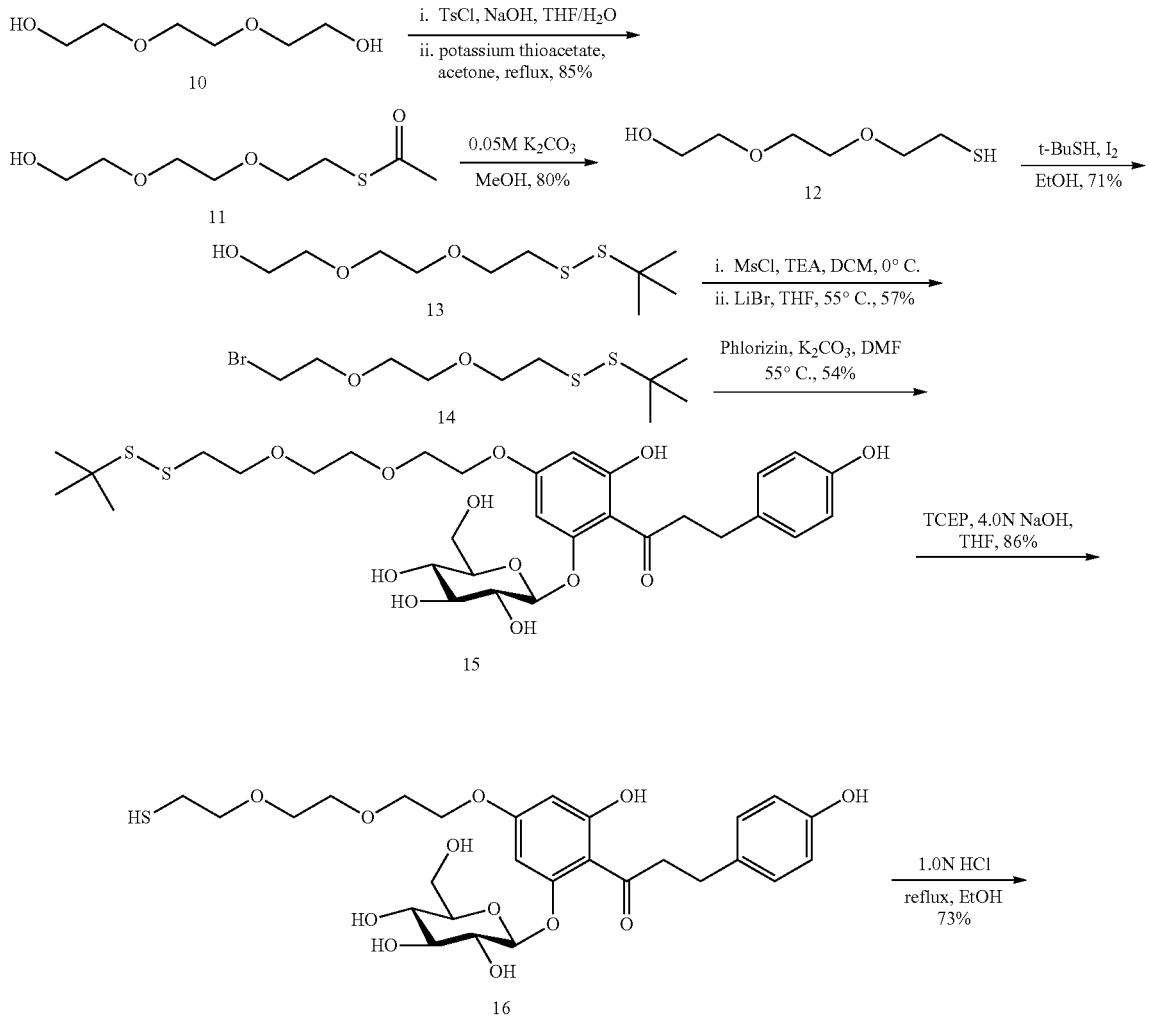

Scheme 1. Synthetic Route for Phlorizin and Phloretin Cojugates

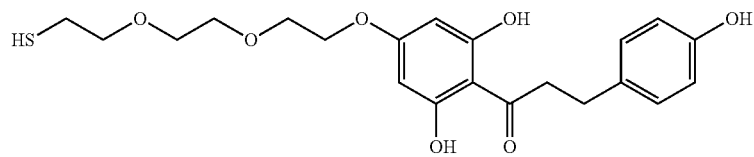

17

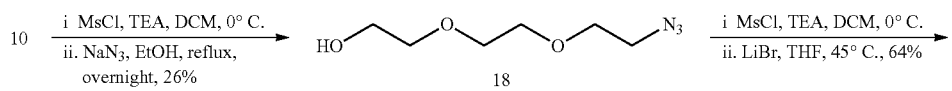

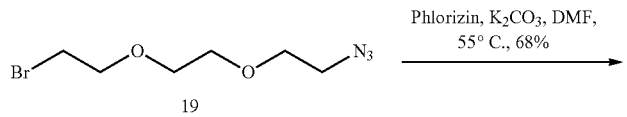

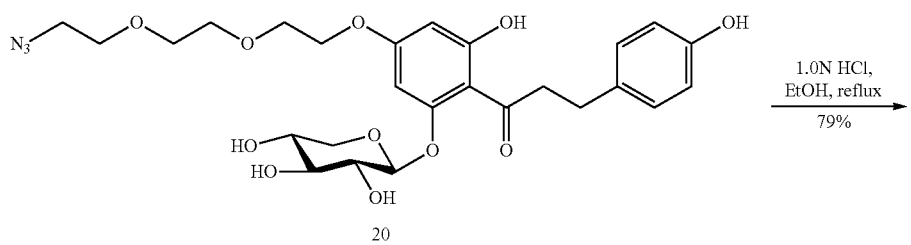

20

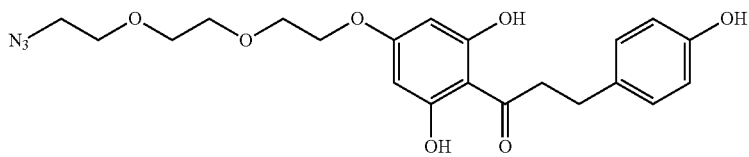

21

N-1 alkyl-substituted 5-FU derivatives are poorly cytotoxic and not converted to 5-FU in vivo. In anticipation of this problem, ester functionality was designed into the linker, it being hypothesized that this ester would be cleavable in the tumor micro-environment by endogenous esterases. The reaction of 5-FU with formaldehyde followed by 6-maleimidohexanoic acid, 4-(pyridin-2-yldisulfanyl)-butanoic acid, or 4-pentynoic acid and the coupling reagents dicyclohexylcarbodiimide (DCC) and 4-dimethylaminopyridine (DMAP) gave compounds 22-24, respectively (Scheme 2). Compound 16 and compound 17 were conjugated with maleimide of 5-FU (22) to give compounds 4 and 5, respectively; and the carboxylic acid of 23, to give compounds 6 and 7, respectively. Compounds 20 and 21 were conjugated with alkyne-containing 5-FU (24) under the (Cu(I)-catalyzed azide-alkyne cycloaddition) click condition to give compounds 8 and 9.

Scheme 2. Synthetic Route for the Conjugates 4-9

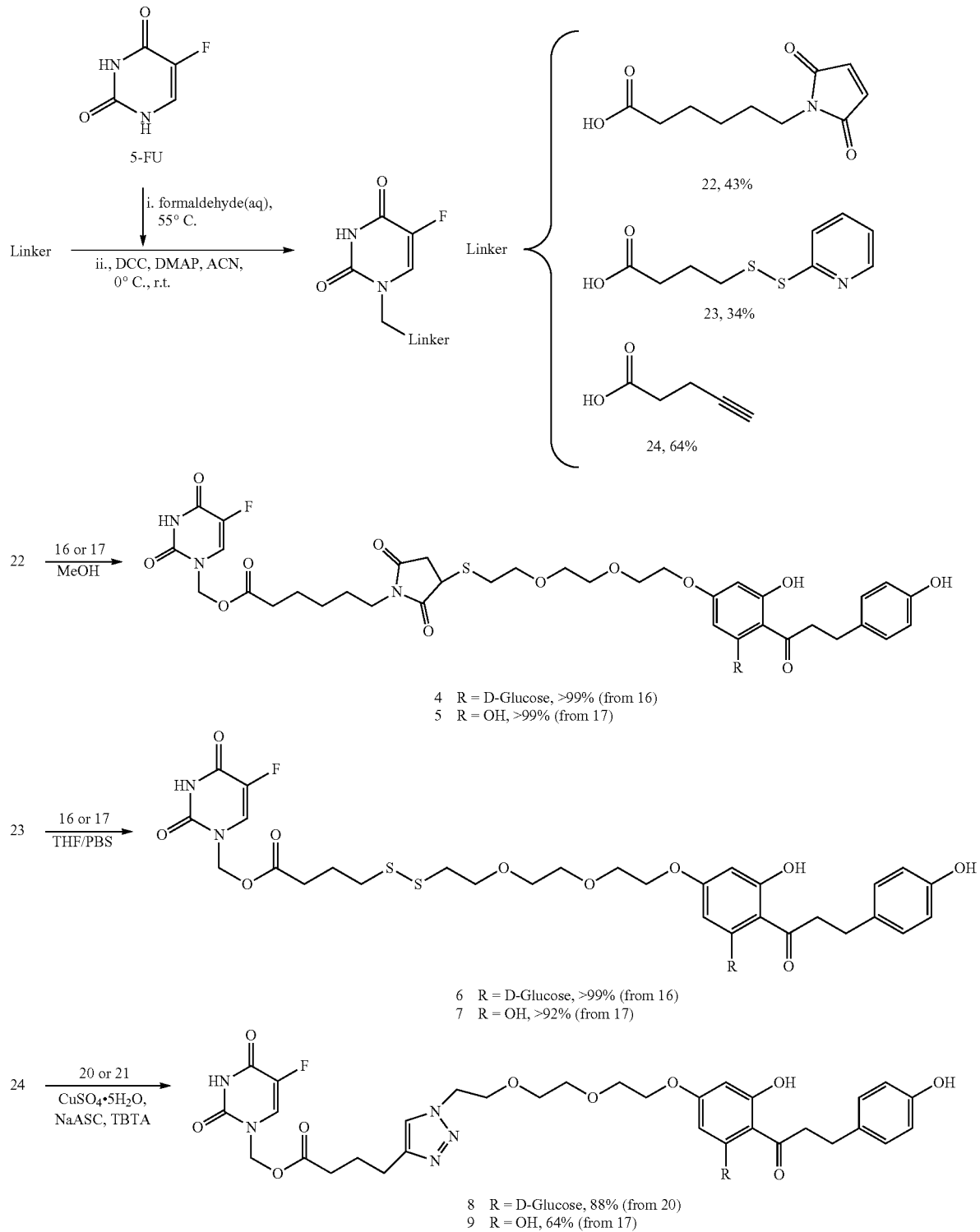

Compounds 30 and 31 were synthesized using mercaptoethanol (25) as starting material through four steps (Scheme 3). First, compound 25 was coupled with aldrithiol-2 in the presence of acetic acid to afford compound 26. Second, the hydroxyl group of compound 26 was reacted with p-nitrophenyl chloroformate to give compound 27. Compound 27 was then reacted with compound 28 (SN-38) to afford compound 29, to which was added compound 16 or compound 17 in THF under nitrogen atmosphere to compounds 30 or 31, respectively.

The synthesis of compounds 37 and 38 were depicted in Scheme 4. Fmoc-val-osu (32) was reacted with L-citrulline in THF/water/dimethoxymethane (DMM) by using sodium bicarbonate as base to give compound 33 (Fmoc-val-cit). Compound 33 was then reacted with p-aminobenzyl alcohol in the presence of N-ethoxycarbonyl-2-ethoxy-1,2-dihydroquinoline (EEDQ) to afford compound 34 (Fmoc-val-cit-pab-OH). To synthesize compound 36 which contains ether linkage, a bromide leaving group was replaced with benzyl alcohol on compound 34 by adding 33% HBr in glacial acetic acid to give the intermediate 35 first. The intermediate was added to a mixture of 28 and cesium carbonate in DMF. After stirring for 20 min, piperidine was added to the reaction mixture for the deprotection of Fmoc to give val-cit-pab-O—SN-38 in one-pot reaction. Val-cit-pab-O—SN-38 was then reacted with TEA and 5-maleimido valeric acid-NHS in DMF to give compound 36. Finally, compound 36 was coupled with compounds 16 or 17 in MeOH to afford compounds 37 or 38, respectively.

The synthesis of compounds 42-45 were disclosed in Scheme 5. Irinotecan was coupled with 4-pentynoic acid or 6-maleimidocaproic acid in the presence of DCC and DMAP to give compounds 40 or 41, respectively. The alkyne-containing 40 was then conjugated with compounds 20 or 21 under click condition to give compounds 42 and 43. On the other hand, maleimide 41 was conjugated with compound 16 or compound 17 to give compounds 44 and 45, respectively.

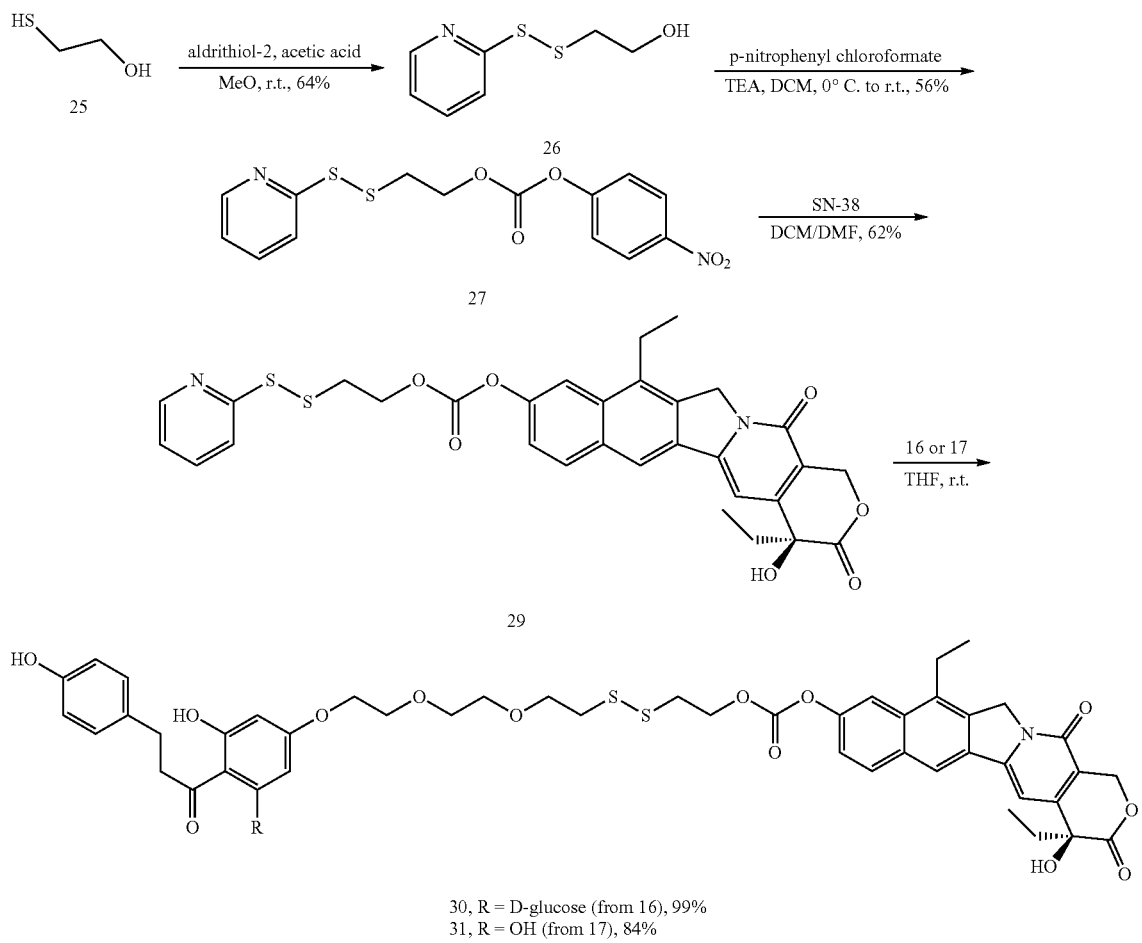

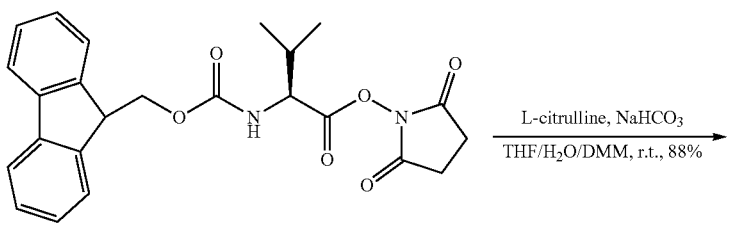

-continued
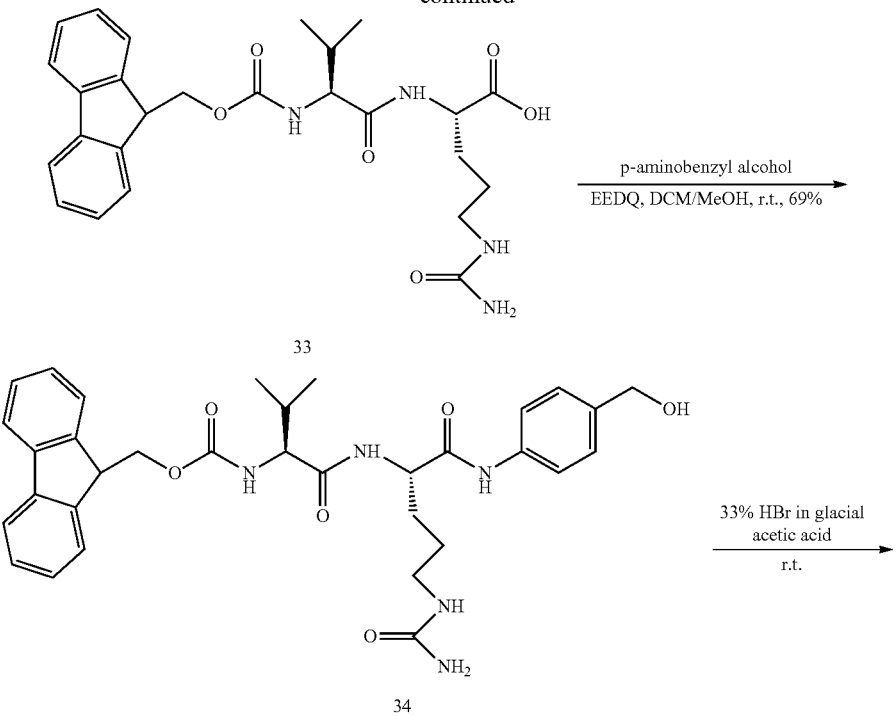
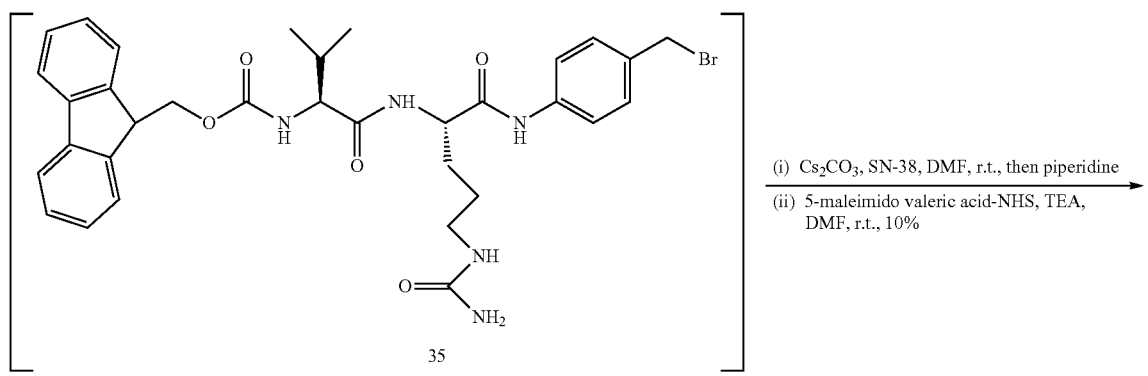
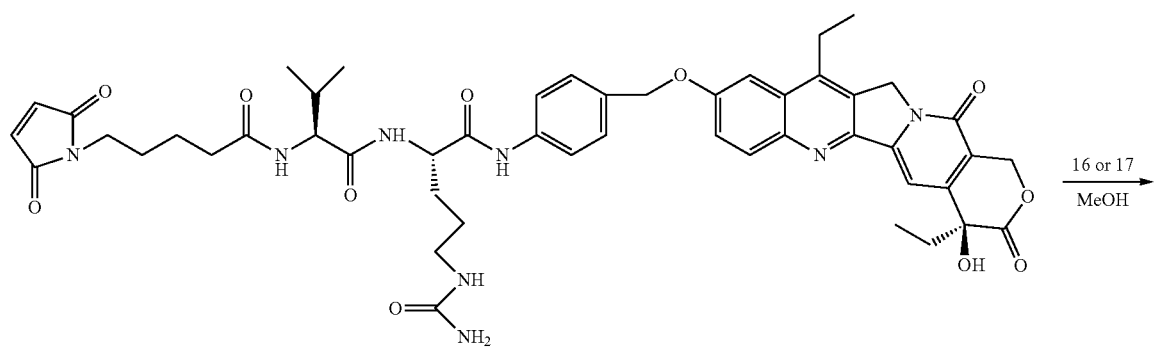

-continued
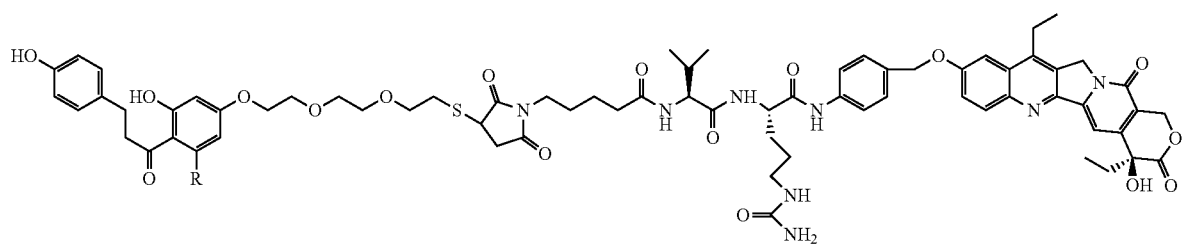
37, R = D-glucose (from 16), 50%
38, R = OH (from 17), 32%
Scheme 5. Synthetic Route for the Conjugates 42-45
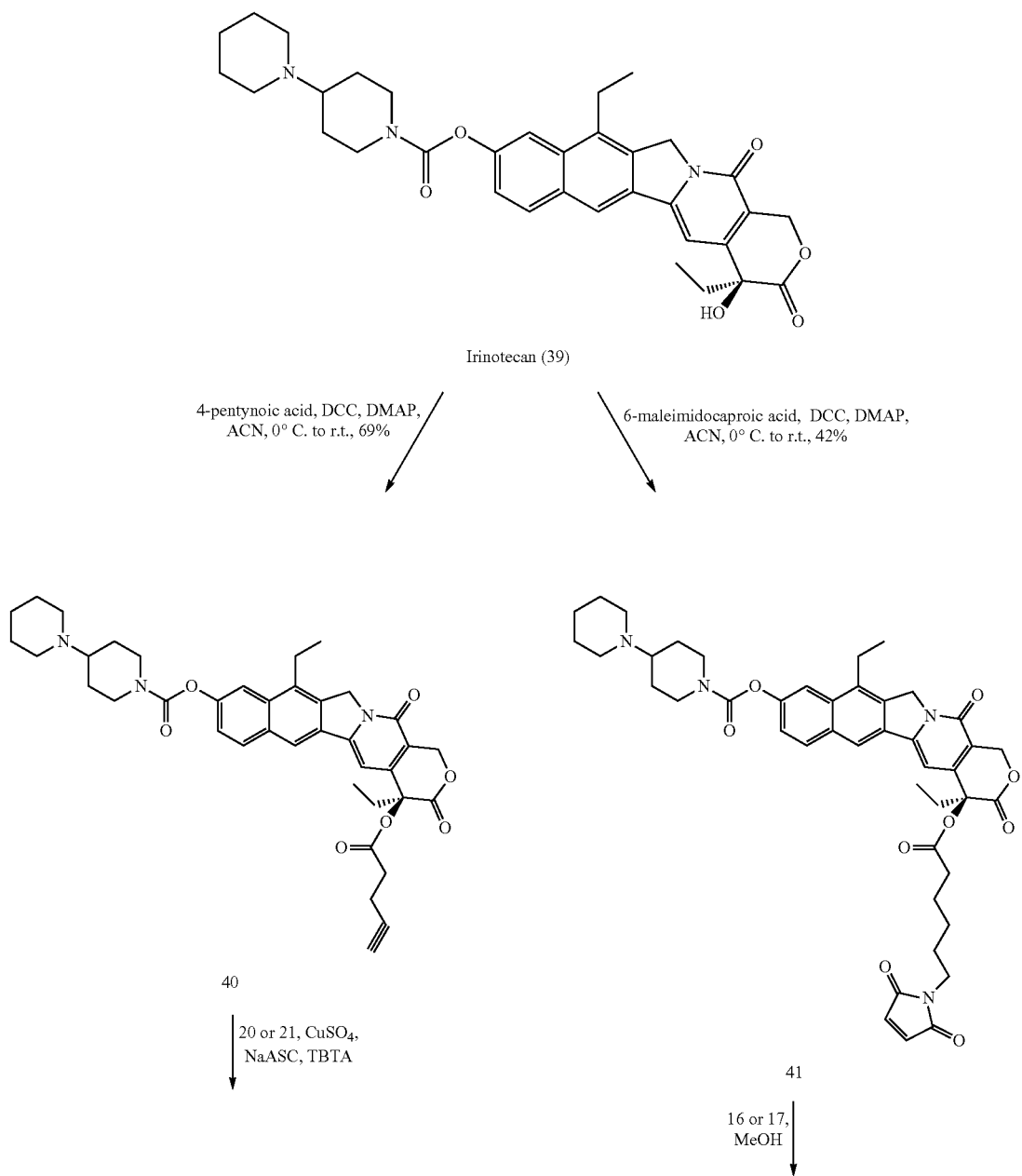

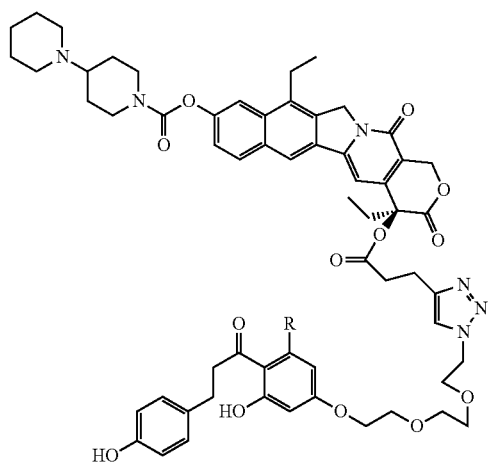
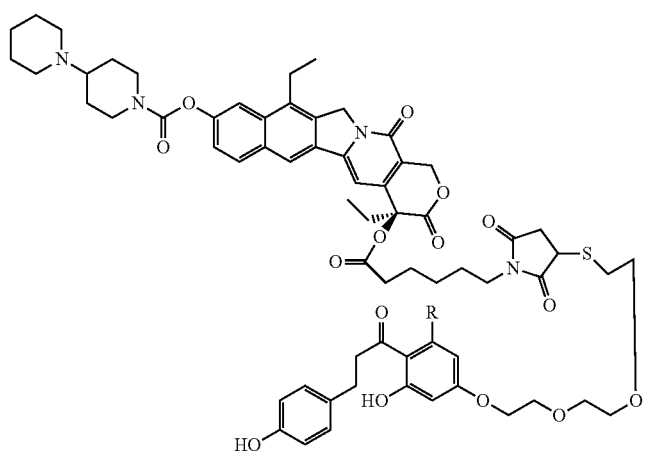

42, R = D-glucose (from 20), 67%
43, R = OH (from 21), 59%

44, R = D-glucose (from 16), 69%
45, R = OH (from 17), 58%

General Chemicals

Reagents and solvents for synthesis were of reagent grade and used without further purification. HPLC analysis was performed on a HITACHI D-2000 Elite system equipped with a BDS HYPERSIL C18 (5 μm, 4.6×250 mm) column. The mobile phase was a mixture of ACN and dd $H_2O$ or $NaH_2PO_4$ buffer, which were filtered through a 0.45 mm membrane filter before use. The column was eluted with the mobile phase at a flow rate of 1.0 mL/min. The eluate was monitored by measuring the absorption at 254 or 265 nm at 25° C. The purities of all final products were confirmed by HPLC to be >95% prior to their in vitro and in vivo use. Thin-layer chromatography (0.25 mm, E. Merck silica gel 60 $F_{254}$) was used to monitor reaction progress; plates were visualized by UV (state wavelength), or by staining with cerium or ninhydrin and heating. Acquisition of $^1H$ and $^{13}C$ nuclear magnetic resonance (NMR) spectra were performed on Bruker-AV-400 (400 MHz) and Bruker-AV-600 (600 MHz) (See Supplementary information). Chemical shifts are referenced to residual solvent peaks in parts per million (δ): $^1H$ δ=2.50, $^{13}C$ δ=39.52 for $d_6$-DMSO; $^1H$ δ=3.31, $^{13}C$ δ=49.00 for $CD_3OD$; $^1H$ δ=2.05, $^{13}C$ δ=29.84, 206.26 for $d_6$-acetone; $^1H$ δ=7.26, $^{13}C$ δ=77.16 for $CDCl_3$. Coupling constants (J) are given in Hertz (Hz). Splitting patterns are denoted as s (singlet), d (doublet), dd (double doublet), t (triplet), q (quartet), m (multiplet). Mass spectra were acquired using a Burker bioTOF III and reported in m/z.

(5-Fluoro-2,4-dioxo-3,4-dihydropyrimidin-1(2H)-yl) methyl 6-(3-((2-(2-(2-(3-hydroxy-4-(3-(4-hydroxyphenyl)propanoyl)-5-(((2S,3R,5S,6R)-3,4,5-trihydroxy-6-(hydroxymethyl)tetrahydro-2H-pyran-2-yl) oxy)phenoxy)ethoxy)ethoxy)ethyl)thio)-2,5-dioxopyrrolidin-1-yl)hexanoate (4)

To a solution of 16 (35 mg, 0.06 mmol) in dry methanol (2 mL) was added compound 22 (21 mg, 0.06 mmol). The reaction mixture was stirred for 10 min and then was concentrated in vacuo. The residue was purified by column chromatography (silica gel; DCM/MeOH=12/1) to give compound 4 (53 mg, 0.06 mmol, >99%) as foam. $^1H$ NMR (600 MHz, $CD_3OD$) δ 7.88 (d, J=6 Hz, 1H, H-29), 7.07 (d, J=8.2 Hz, 2H, H-2, H-6), 6.67 (d, J=8.2 Hz, 2H, H-3, H-5), 6.31-6.29 (m, 1H, H-3'), 6.11-6.09 (m, 1H, H-5'), 5.61 (s, 2H, H-23), 5.11 (d, J=7.2 Hz, 1H, H-1"), 4.15 (t, J=4.8 Hz, 2H), 4.03-4.00 (m, 1H), 3.90 (d, J=4.2 Hz, 1H), 3.81 (t, J=4.2 Hz, 2H), 3.77-3.70 (m, 3H), 3.67 (t, J=4.2 Hz, 2H), 3.63 (t, J=5.4 Hz, 2H), 3.50-3.45 (m, 5H), 3.42-3.30 (m, 3H), 3.17-3.11 (m, 1H), 3.09-3.05 (m, 1H), 2.89-2.81 (m, 3H), 2.50 (dd, $J_1$=15.6, 3 Hz, 1H), 2.33 (t, J=7.2 Hz, 2H, H-21), 1.60-1.58 (m, 2H, H-20), 1.52-1.50 (m, 2H, H-18), 1.28-1.26 (m, 2H, H-19) ppm; $^{13}C$ NMR (150 MHz, $CD_3OD$) 206.8, 178.9, 177.2, 174.6, 167.2, 166.2, 161.9, 159.6 (d, $J_{CCF}$=26.1 Hz), 156.3, 151.0, 141.4 (d, $J_{CF}$=232.5 Hz), 133.7, 130.5 (d, $J_{CCF}$=33.1 Hz), 130.4 (2C), 116.0 (2C), 107.6, 102.1, 97.1, 95.2, 78.4, 74.7, 72.1, 71.7, 71.6, 71.2, 71.1, 70.4, 69.0, 62.5, 49.8, 47.0, 40.8, 39.4, 37.3, 34.3, 32.0, 30.6, 28.0, 26.9, 25.0 ppm; HRMS (ESI TOF-MS) $C_{42}H_{52}FN_3O_{18}SNa^+$ [M+Na]$^+$: calc. 960.2843, found: 960.2847.

(5-Fluoro-2,4-dioxo-3,4-dihydropyrimidin-1(2H)-yl) methyl 6-(3-((2-(2-(2-(3,5-dihydroxy-4-(3-(4-hydroxyphenyl)propanoyl)phenoxy)ethoxy)ethoxy) ethyl)thio)-2,5-dioxopyrrolidin-1-yl)hexanoate (5)

To a solution of 17 (22 mg, 0.05 mmol) in dry MeOH (1 mL) was added compound 22 (19 mg, 0.05 mmol). The reaction mixture was stirred for 10 min and then was concentrated in vacuo. The residue was purified by column chromatography (silica gel; DCM/MeOH=12/1) to give (39 mg, 0.05 mmol, >99%) as foam. $^1H$ NMR (400 MHz, $CD_3OD$) δ 7.89 (d, J=6 Hz, 1H, H-29), 7.05 (d, J=8.4 Hz, 2H, H-2, H-6), 6.68 (d, J=8.4 Hz, 2H, H-3, H-5), 5.92 (s, 2H, H-3', H-5'), 5.61 (s, 2H), 4.09 (t, J=4.4 Hz, 2H), 4.09-3.99 (m, 1H), 3.81 (t, J=4.4 Hz, 2H), 3.76-3.72 (m, 2H), 3.69-3.64 (m, 4H), 3.42 (t, J=7 Hz, 2H), 3.21-3.20 (m, 1H), 3.11-3.07 (m, 2H), 2.87-2.83 (m, 3H), 2.47 (dd, J=14.8, 3.6 Hz, 1H), 2.34 (t, J=7.3 Hz, 2H), 1.62-1.50 (m, 4H), 1.29-1.27 (m, 2H) ppm; $^{13}C$ NMR (100 MHz, $CD_3OD$) δ 206.7, 178.9, 177.1, 174.5, 166.5, 165.5 (2C), 159.7 (d, $J_{CCF}$=27.4 Hz), 156.4, 151.3, 141.6 (d, $J_{CF}$=227 Hz), 133.8, 130.5 (d, $J_{CCF}$=32.2 Hz), 130.3 (2C), 116.1 (2C), 106.1, 94.8 (2C), 72.1, 71.7, 71.6, 71.2, 70.4, 68.7, 47.4, 40.7, 39.4, 37.2, 34.3, 32.0, 31.2, 28.0, 26.9, 25.0 ppm; HRMS (ESI TOF-MS) $C_{36}H_{42}FN_3O_{13}SNa^+$ [M+Na]$^+$: calc. 798.2315, found: 798.2319.

(5-fluoro-2,4-dioxo-3,4-dihydropyrimidin-1(2H)-yl) methyl 4-((2-(2-(2-(3-hydroxy-4-(3-(4-hydroxyphenyl)propanoyl)-5-(((2S,3R,5S,6R)-3,4,5-trihydroxy-6-(hydroxymethyl)tetrahydro-2H-pyran-2-yl)oxy) phenoxy)ethoxy)ethoxy)ethyl)disulfanyl)butanoate (6)

To a solution of compound 16 (76 mg, 0.13 mmol) in THF was added compound 23 (50 mg, 0.13 mmol) and phosphate buffer (pH=8.0). The mixture was stirred for 2 h at ambient temperature. The solvent was removed in vacuo. The residue was purified by column chromatography (silica gel; DCM/MeOH=15/1 to 10/1) to give compound 6 (107 mg, 0.13 mmol, >99%) as oil; $^1$H NMR (400 MHz, CD$_3$OD) δ 7.89 (t, J=6.1 Hz, 1H), 7.07 (t, J=8.4 Hz, 2H), 6.68 (t, J=8.4 Hz, 2H), 6.32 (d, J=2.2 Hz, 1H), 6.13 (d, J=2.2 Hz, 1H), 5.62 (s, 2H), 5.10-5.03 (m, 1H), 4.64 (t, J=7.2 Hz, 1H), 4.17-4.05 (m, 2H), 3.90 (dd, J=12.4 Hz, 2.0 Hz, 1H), 3.83-3.95 (m, 2H), 3.59-3.73 (m, 7H), 3.44-3.54 (m, 6H), 3.34-3.39 (m, 1H), 2.87 (m, 4H), 2.72 (t, J=7.0 Hz, 2H), 2.49 (t, J=7.1 Hz, 2H), 1.98 (t, J=7.0 Hz, 2H); $^{13}$C NMR (100 MHz, CD$_3$OD) δ 205.5, 172.9, 166.0, 165.0, 160.6, 159.8 (d, $J_{CCF}$=27 Hz), 155.0, 149.8, 140.0 (d, $J_{CF}$=233 Hz), 132.4, 129.3 (d, $J_{CCF}$=35 Hz), 129.1 (2C), 114.7 (2C), 106.3, 100.8, 95.8, 93.8, 77.1, 77.1, 73.4, 70.0 (2C), 69.8, 69.5 (2C), 67.6, 66.3, 61.1, 45.8, 38.0, 37.3, 31.7, 29.3, 23.6 ppm; HRMS (ESI TOF-MS) C$_{36}$H$_{45}$FN$_2$O$_{16}$S$_2$$^+$ [M+H]$^+$: calc. 845.2267, found: 845.2279.

(5-Fluoro-2,4-dioxo-3,4-dihydropyrimidin-1(2H)-yl) methyl 4-((2-(2-(2-(3,5-dihydroxy-4-(3-(4-hydroxyphenyl)propanoyl)phenoxy)ethoxy)ethoxy)ethyl) disulfanyl)butanoate (7)

To a solution of compound 17 (55 mg, 0.13 mmol) in THF was added compound 23 (50 mg, 0.13 mmol) and phosphate buffer (pH 8.0). The mixture was stirred for 2 h at ambient temperature. The solvent was removed in vacuo. The residue was purified by column chromatography (silica gel; DCM/MeOH=20/1) to give compound 7 (85 mg, 0.12 mmol, 92%) as a solid; $^1$H NMR (600 MHz, d$_6$-acetone) δ 7.93 (d, J=6.4 Hz, 1H), 7.09 (d, J=8.4 Hz, 2H), 6.75 (d, J=9.4 Hz, 2H), 5.69 (s, 2H), 6.01 (s, 2H), 4.15 (t, J=4.6 Hz, 2H), 3.81 (t, J=4.3 Hz, 2H), 3.70 (t, J=6.5 Hz, 2H), 3.66-3.60 (m, 4H), 3.35 (t, J=8.0 Hz, 2H), 2.89-2.77 (m, 4H), 2.78 (t, J=7.2 Hz, 2H), 2.52 (t, J=7.2 Hz, 2H), 2.07-2.04 (m, 2H); $^{13}$C NMR (150 MHz, d$_6$-acetone) δ 205.8, 173.3, 166.1, 165.3, 157.9 (d, $J_{CCF}$=27 Hz), 156.4, 150.1, 140.9 (d, $J_{CF}$=231 Hz), 133.4, 130.2 (2C), 129.0 (d, $J_{CCF}$=34.5 Hz), 115.2 (2C), 105.7, 94.0 (2C), 71.4, 71.3, 71.0, 70.1, 70.0, 68.5, 47.0, 39.3, 38.1, 32.7, 30.5, 30.3, 24.7 ppm. HRMS (ESI TOF-MS) C$_{30}$H$_{35}$FN$_2$O$_{11}$S$_2$$^+$ [M+H]$^+$: calc. 683.1739, found: 683.1763.

(5-Fluoro-2,4-dioxo-3,4-dihydropyrimidin-1(2H)-yl) methyl 3-(1-(2-(2-(2-(3-hydroxy-4-(3-(4-hydroxyphenyl)propanoyl)-5-(((2S,3R,5S,6R)-3,4,5-trihydroxy-6-(hydroxymethyl)tetrahydro-2H-pyran-2-yl) oxy)phenoxy)ethoxy)ethoxy)ethyl)-1H-1,2,3-triazol-4-yl)propanoate (8)

To a solution of 20 (95 mg, 0.16 mmol) in EtOH/water (3/1, 2 mL) was added tris(benzyltriazolylmethyl)amine (TBTA, 18 mg, 0.03 mmol), sodium ascorbic acid (NaASC, 20.8 mg, 0.10 mmol), copper (II) sulfate pentahydrate (3.3 mg, 0.01 mmol), and compound 24 (38 mg, 0.16 mmol). The reaction mixture was stirred for 12 h and then concentrated in vacuo. The mixture was dissolved in EtOAc and was extracted with water. The organic layers were concentrated in vacuo and purified by column chromatography (silica gel; DCM/MeOH=10/1) to give compound 8 (117 mg, 0.14 mmol, 88%) as foam. $^1$H-NMR (600 MHz, CD$_3$OD) δ 7.81 (d, J=6 Hz, 1H, H-24), 7.77 (s, 1H, H-13), 7.06 (d, J=8.4 Hz, 2H, H-2, H-6), 6.67 (d, J=8.4 Hz, 2H, H-3, H-5), 6.30 (d, J=2.4 Hz, 1H, H-3'), 6.12 (d, J=2.4 Hz, 1H, H-5'), 5.59 (s, 2H, H-18), 5.07 (d, J=7.2 Hz, 1H, H-1''), 4.50 (t, J=4.8 Hz, 2H, H-12), 4.15 (t, J=4.2 Hz, 2H, H-7), 3.88 (dd, J=10, 2 Hz, 1H), 3.80 (t, J=4.8 Hz, 2H), 3.79-3.77 (m, 2H), 3.68 (q, J=6 Hz, 1H), 3.66-3.61 (m, 4H), 3.5-3.4 (m, 5H), 3.38-3.34 (m, 1H), 2.94 (t, J=7.8 Hz, 2H, H-16), 2.88 (t, J=7.2 Hz, 2H, H-(3), 2.72 (t, J=7.2 Hz, 2H, H-17) ppm; $^{13}$C NMR (150 MHz, CD$_3$OD) δ 206.8, 173.5, 167.2, 166.2, 161.8, 159.5 (d, $J_{CCF}$=26 Hz), 156.4, 150.9, 146.9, 141.3 (d, $J_{CF}$=232 Hz), 133.7, 130.5 (d, $J_{CCF}$=34 Hz), 130.3 (2C), 124.4, 116.0 (2C), 107.6, 102.1, 97.1, 95.1, 78.5, 78.4, 74.7, 71.6, 71.5, 71.4, 71.1, 70.4, 70.3, 68.9, 62.4, 51.3, 47.0, 34.0, 30.6, 21.4 ppm; HRMS (ESI TOF-MS) C$_{37}$H$_{45}$FN$_5$O$_{16}$$^+$ [M+H]$^+$: calc. 834.2840, found: 834.2855.

(5-Fluoro-2,4-dioxo-3,4-dihydropyrimidin-1(2H)-yl) methyl 3-(1-(2-(2-(2-(3-hydroxy-4-(3-(4-hydroxyphenyl)propanoyl)-5-(((2S,3R,5S,6R)-3,4,5-trihydroxy-6-(hydroxymethyl)tetrahydro-2H-pyran-2-yl) oxy)phenoxy)ethoxy)ethoxy)ethyl)-1H-1,2,3-triazol-4-yl)propanoate (9)

To a solution of 21 (62.3 mg, 0.14 mmol) in EtOH/water (v/v=3:1, 2 mL) was added TBTA (7.9 mg, 0.01 mmol), sodium ascorbic acid (NaASC, 45 mg, 0.22 mmol), copper (II) sulfate pentahydrate (5.6 mg, 0.02 mmol), and compound 24 (35.7 mg, 0.15 mmol). The reaction mixture was stirred for 12 h and then concentrated in vacuo. The mixture was then dissolved in EtOAc and was extracted with water. The organic layers were concentrated in vacuo and purified by column chromatography (silica gel: DCM/MeOH=14/1) to give compound 9 (62.9 mg, 0.09 mmol, 64%) as foam; $^1$H NMR (400 MHz, d$_6$-DMSO) δ 8.11 (d, J=6.4 Hz, 1H, H-24), 7.85 (s, 1H, H-13), 7.05 (d, J=8.4 Hz, 2H, H-2, H-6), 6.69 (d, J=8.4 Hz, 2H, H-3, H-5), 5.96-5.96 (m, 2H, H-3', H-5'), 5.59 (s, 2H, H-18), 4.48 (t, J=5 Hz, 2H, H-12), 4.12-4.05 (m, 2H), 3.82 (t, J=5 Hz, 2H), 3.75-3.65 (m, 2H), 3.59-3.51 (m, 4H), 3.27 (t, J=7.6 Hz, 2H), 2.89 (t, J=7.2 Hz, 2H, H-16), 2.80 (t, J=7.4 Hz, 2H, H-β)), 2.7 (t, J=7.2 Hz, 2H, H-17) ppm; $^{13}$C NMR (100 MHz, CD$_3$OD) δ 206.7, 173.6, 166.5, 165.6 (2C), 159.7 (d, $J_{CCF}$=26 Hz), 156.5, 151.1, 147.0, 141.3 (d, $J_{CF}$=232 Hz), 133.9, 130.4 (d, $J_{CCF}$=34 Hz), 130.3 (2C), 124.4, 116.1 (2C), 106.1, 94.8 (2C), 71.6, 71.6, 71.4, 70.5, 70.3, 68.7, 51.3, 47.4, 34.0, 31.2, 21.5 ppm; HRMS (ESI TOF-MS) C$_{31}$H$_{35}$FN$_5$O$_{11}$$^+$ [M+H]$^+$: calc. 672.2312, found: 672.2318.

S-(2-(2-(2-Hydroxyethoxy)ethoxy)ethyl) ethanethioate (11)

Triethylene glycol (10, 50.0 g, 333 mmol) in THF (300 mL) was cooled to 0° C. in an ice bath. Then, NaOH (4.40 g, 110 mmol) in water (200 mL) was added and stirred for 10 min. Tosyl chloride (TsCl, 6.34 g, 33.3 mmol) in dry THF (50 mL) was added dropwise (~30 min). After stirring for an additional 2 h at ambient temperature, the reaction was poured into water and extracted with ether. The aqueous layers were re-extracted with DCM. The combined organic layers were dried over MgSO$_4$ and concentrated in vacuo to give a colorless oil. Then, the intermediate in dry acetone (200 mL) was added potassium thioacetate (3.8 g, 33.3 mmol). The reaction mixture was heated at reflux for 1 h. The in-dissolved solids were filtered and the filtrate was concentrated in vacuo. The residue was purified by column chromatography (silica gel; Hex/EtOAc=1/1) to give compound 11 (5.89 g, 28.3 mmol, 85%) as yellow oil; $^1$H NMR (400 MHz, CDCl$_3$) δ 3.70-3.54 (m, 10H), 3.06 (t, J=6.4 Hz, 2H), 2.30 (s, 3H) ppm; $^{13}$C NMR (100 MHz, CDCl$_3$) δ 195.5, 72.4, 70.2, 69.6 (2C), 61.6, 30.4, 28.6 ppm; HRMS (ESI TOF-MS) C$_8$H$_{17}$O$_4$S+Na$^+$ [M+Na]$^+$: calc. 231.0662, found: 231.0672.

2-(2-(2-Mercaptoethoxy)ethoxy)ethanol (12)

To a stirred solution of 11 (5.7 g, 27.40 mmol) in dry MeOH (50 mL) was added K$_2$CO$_3$ (345 mg, 2.50 mmol). The reaction mixture was quenched by NH$_4$Cl solution and was filtered to remove precipitates. The filtrate was concentrated in vacuo. The residue was dissolved in EtOAc and washed with water. The organic layers were combined and dried over MgSO$_4$. The residue was concentrated in vacuo and purified by column chromatography (silica gel; Hex/EtOAc=1/1) to give compound 12 (3.63 g, 21.86 mmol 80%) as yellow oil; $^1$H NMR (400 MHz, CDCl$_3$) δ 3.74-3.71 (m, 4H), 3.67-3.65 (m, 4H), 3.60-3.57 (m, 2H), 2.90 (t, J=6.4 Hz, 2H) ppm; $^{13}$C NMR (100 MHz, CDCl$_3$) δ 72.5, 70.3, 70.2, 69.5, 61.6, 38.3 ppm; HRMS (ESI TOF-MS) C$_6$H$_{15}$O$_3$S+ [M+H]$^+$: calc. 167.0736, found: 167.0735.

2-(2-(2-(tert-Butyldisulfanyl)ethoxy)ethoxy)ethanol (13)

To a stirred of 12 (1.43 g, 8.56 mmol) in EtOH (5 mL), was added 2-methyl-2-propanethiol (9.7 mL, 7.76 g, 86.04 mmol). The reaction mixture was cooled to 0° C. and a solution of iodine (3.0 g) in EtOH (20 mL) was added dropwise until the color of the reaction changed from colorless to dark brown. After 12 h, saturated NaHCO$_3$ solution was added until pH >7. The reaction solution was concentrated in vacuo. Then the residue was dissolved in EtOAc and was extracted with saturated NaHCO$_3$ solution and brine. The combined organic layers were dried over MgSO$_4$, filtered, concentrated in vacuo. The residue was purified by column chromatography (silica gel; Hex/EtOAc=2/1) to give compound 13 (1.54 g, 6.06 mmol, 71%) as yellow oil; $^1$H NMR (400 MHz, CDCl$_3$) δ 3.71-3.68 (m, 4H), 3.66-3.61 (m, 4H), 3.61-3.57 (m, 2H), 2.86 (t, J=6.8 Hz, 2H), 1.30 (s, 9H) ppm; $^{13}$C NMR (100 MHz, CDCl$_3$) δ 72.4, 70.2, 69.7 (2C), 61.6, 47.7, 36.6, 29.7 (3C) ppm. HRMS (ESI TOF-MS) C$_{10}$H$_{22}$O$_3$S$_2$$^+$ [M+H]$^+$: calc. 255.1083, found: 255.1089.

1-(2-(2-(2-Bromoethoxy)ethoxy)ethyl)-2-(tert-butyl)disulfane (14)

To a stirred solution of compound 13 (70.0 mg, 0.28 mmol) in dry DCM (2 mL), at 0° C. was added TEA (33.5 mg, 0.33 mmol), and the reaction mixture was stirred for 10 min. methanesulfonyl chloride (32.0 mg, 0.28 mmol) was added to the reaction mixture over a period of 10 min. The reaction mixture was extracted with water then dried over MgSO$_4$ to afford the mesylated intermediate in DCM. LiBr (60.2 mg, 0.69 mmol) in THF (1 mL) was then added to the above solution. The residue was stirred at 55° C. for 18 h. The reaction mixture was concentrated, extracted with EtOAc and water, and then dried over MgSO$_4$. The residue was concentrated and purified by flash column chromatography (silica gel; Hex/EtOAc=8/1) to give compound 14 (50 mg, 0.16 mmol, 57%, 2 steps) as colorless oil. $^1$H NMR (400 MHz, CDCl$_3$) δ 3.77 (t, J=6 Hz, 2H), 3.68-3.65 (m, 2H), 3.63-3.58 (m, 4H), 3.44 (t, J=6.8 Hz, 2H), 2.83 (t, J=6.8 Hz, 2H), 1.28 (s, 9H) ppm; $^{13}$C NMR (100 MHz, CDCl$_3$) δ 71.1, 70.3, 70.2, 69.8, 47.7, 39.7, 29.7 (3C) ppm; HRMS (ESI TOF-MS) C$_{10}$H$_{21}$BrO$_2$S$_2$Na$^+$ [M+Na]$^+$: calc. 339.0059, found: 339.0066.

1-(4-(2-(2-(2-(tert-Butyldisulfanyl)ethoxy)ethoxy)ethoxy)-2-hydroxy-6-(((2S,3R,5S,6R)-3,4,5-trihydroxy-6-(hydroxymethyl)tetrahydro-2H-pyran-2-yl)oxy)phenyl)-3-(4-hydroxyphenyl)propan-1-one (15)

Phlorizin (3, 1.0 g, 2.29 mmol) in dry DMF (10 mL) was added K$_2$CO$_3$ (436 mg, 3.15 mmol) at ambient temperature and stirred for 10 min. Compound 14 (1.0 g, 3.16 mmol) was added and the reaction mixture was heated at 55° C. for 12 h. The reaction mixture was concentrated in vacuo. The residue was extracted with water/EtOAc three times. The organic layers were combined and concentrated in vacuo. The residue was purified by column chromatography (silica gel; DCM/MeOH=10/1) to give compound 15 (837 mg, 1.25 mmol, 54%) as foam; $^1$H NMR (400 MHz, CD$_3$OD) δ 7.06 (d, J=8.4 Hz, 2H, H-2, H-6), 6.68 (d, J=8.4 Hz, 2H, H-3, H-5), 6.33 (d, J=2.4 Hz, 1H, H-3'), 6.14 (d, J=2.4 Hz, 1H, H-5'), 5.08 (d, J=7.6 Hz, 1H, H-1"), 4.15 (t, J=4.4 Hz, 2H), 3.91-3.88 (m, 1H), 3.82 (t, J=4.4 Hz, 2H), 3.71-3.62 (m, 5H), 3.61-3.60 (m, 2H), 3.50-3.44 (m, 5H), 3.34 (d, J=9.2 Hz, 1H), 2.90-2.84 (m, 4H), 1.30 (s, 9H, H-14, H-15, H-16) ppm; $^{13}$C NMR (150 MHz, CD$_3$OD) δ 206.8, 167.2, 166.2, 161.8, 156.3, 133.7, 130.3 (2C), 116.0 (2C), 107.6, 102.1, 97.1, 95.1, 78.4, 74.7, 71.6, 71.3, 71.1, 70.7, 70.5, 68.9, 62.4, 48.4, 47.0, 40.9, 30.6, 30.2 (3C) ppm; HRMS (ESI TOF-MS) C$_{31}$H$_{44}$NaO$_{12}$S$_2$Na$^+$ [M+Na]$^+$: calc. 695.2166, found: 695.2174.

1-(2-Hydroxy-4-(2-(2-(2-mercaptoethoxy)ethoxy)ethoxy)-6-(((2S,3R,5S,6R)-3,4,5-trihydroxy-6-(hydroxymethyl)tetrahydro-2H-pyran-2-yl)oxy)phenyl)-3-(4-hydroxyphenyl)propan-1-one (16)

To a stirred solution of 15 (156 mg, 0.23 mmol) in dry THF (5 mL) was added TCEP (133 mg, 0.46 mmol) and 4.0N NaOH solution (1 mL). The reaction mixture was stirred for 5 h and then was concentrated in vacuo. The residue was dissolved in EtOAc and the precipitate was filtered. The filtrate was concentrated in vacuo and was purified by column (silica gel; DCM/MeOH=10/1) to give compound 16 (115 mg, 0.20 mmol, 86%) as foam; $^1$H NMR (400 MHz, CD$_3$OD) δ 7.06 (d, J=8.4 Hz, 2H, H-2, H-6), 6.68 (d, J=8.4 Hz, 2H, H-3, H-5), 6.33 (d, J=2.4 Hz, 1H, H-3'), 6.14 (d, J=2.4 Hz, 1H, H-5'), 5.08 (d, J=7.2 Hz, 1H, H-1"), 4.15 (t, J=4.4 Hz, 1H, H-7), 3.91 (dd, J=10, 2 Hz, 1H), 3.84-3.81 (m, 2H), 3.71-3.68 (m, 3H), 3.64-3.62 (m, 2H), 3.59 (t, J=6.4 Hz, 2H), 3.50-3.43 (m, 5H), 3.39-3.37 (m, 1H), 2.88 (t, J=7.5 Hz, 2H), 2.64 (t, J=6.4 Hz, 2H) ppm; $^{13}$C NMR (100 MHz, CD$_3$OD) δ 206.8, 167.3, 166.3, 161.8, 156.3, 133.7, 130.3 (2C), 116.0 (2C), 107.6, 102.1, 97.1, 95.1, 78.5, 78.4, 74.7, 74.1, 71.6, 71.1 (2C), 70.5, 68.9, 62.4, 47.0, 30.7, 24.6 ppm; HRMS (ESI TOF-MS) C$_{27}$H$_{36}$O$_{12}$SNa$^+$ [M+Na]$^+$: calc. 607.1820, found: 607.1821.

1-(2,6-Dihydroxy-4-(2-(2-(2-mercaptoethoxy)ethoxy)phenyl)-3-(4-hydroxyphenyl)propan-1-one (17)

To a solution of compound 16 (210 mg, 0.36 mmol) in EtOH (2 mL) was added 1.0N HCl (1 mL). The mixture was heated at reflux for 3 h. The reaction mixture was cooled and the solvent was evaporated in vacuo. The residue was extracted with water and EtOAc, dried over MgSO$_4$. The organic layers were combined and concentrated in vacuo. The residue was purified by column chromatography (silica gel; Hex/EtOAc=1/1) to give compound 17 (111 mg, 0.26 mmol, 73%) as foam; $^1$H NMR (400 MHz, CDCl$_3$) δ 7.00 (d, J=8.4 Hz, 2H, H-2, H-6), 6.70 (d, J=8.4 Hz, 2H, H-3, H-5), 5.87 (s, 2H, H-3', H-5'), 4.00 (t, J=3.2 Hz, 2H), 3.79-3.77 (m, 2H), 3.71-3.69 (m, 2H), 3.63-3.61 (m, 2H), 3.54 (t, J=6.4 Hz, 2H), 3.27 (t, J=7.6 Hz, 2H), 2.83 (t, J=7.6 Hz, 2H), 2.62-2.57 (m, 2H); $^{13}$C NMR (100 MHz, CDCl$_3$) δ 205.2, 164.5 (2C), 153.7, 133.4, 129.5 (2C), 115.3 (2C), 94.5 (2C), 77.2, 72.8, 70.4, 70.4, 69.9, 69.4, 67.0, 45.8, 29.8, 23.9; HRMS (ESI TOF-MS) C$_{21}$H$_{26}$O$_7$SNa$^+$ [M+Na]$^+$: calc. 445.1291, found: 445.1328.

2-(2-(2-Azidoethoxy)ethoxy)ethanol (18)

Triethylene glycol (10, 50.0 g, 333 mmol) in dry DCM (250 mL) at 0° C. was added TEA (37.0 g, 366 mmol) and the reaction mixture was stirred for 10 min. Then, methanesulfonyl chloride (30.5 g, 266 mmol) was added to the reaction mixture over a period of 20 min. The reaction mixture was extracted with water, dried over MgSO$_4$ and concentrated to afford 2-(2-(2-hydroxyethoxy)ethoxy)ethyl methanesulfonate. The mesylated intermediate in EtOH (250 mL) was added sodium azide (21.6 g, 332 mmol) and was heated at reflux overnight. Water was added and the mixture was extracted with DCM. The organic layers were dried over MgSO$_4$, concentrated, and purified by flash column chromatography (silica gel; EA/Hex=3/1 to 1/5) to give compound 18 (12.1 g, 69.1 mmol, 26%, 2 steps) as colorless oil. $^1$H-NMR (200 MHz, CDCl$_3$) δ 3.68-3.64 (m, 2H), 3.63-360 (m, 6H), 3.57-3.53 (m, 2H), 3.34 (t, J=5.2 Hz, 2H) ppm; $^{13}$C-NMR (50 MHz, CDCl$_3$) δ 72.4, 70.5, 70.2, 69.8, 61.5, 50.5 ppm; HRMS (ESI TOF-MS) C$_6$H$_{14}$N$_3$O$_3$+ [M+H]$^+$: calc. 176.1030, found: 176.1029.

1-Azido-2-(2-(2-bromoethoxy)ethoxy)ethane (19)

To a stirred solution of compound 18 (8.0 g, 45.7 mmol) in dry DCM (100 mL), at 0° C. was added TEA (9.25 g, 91.4 mmol) and the reaction mixture was stirred for 10 min. Then methanesulfonyl chloride (6.28 g, 54.8 mmol) was added to the reaction mixture over a period of 20 min. The reaction mixture was extracted with water and dried over MgSO$_4$ to afford the mesylated intermediate in DCM. Lithium bromide (11.9 g, 137 mmol) was dissolved in THF (150 mL) was added to the mesylated intermediate and reaction mixture. The residue was stirred at 45° C. for 18 h. The reaction mixture was concentrated, extracted with EtOAc and water, EtOAc layers were collected, dried over MgSO$_4$ and then filtered. The filtrate was concentrated and purified by flash column chromatography (silica gel; Hex/EtOAc=4/1) to give compound 19 (6.9 g, 29.1 mmol, 64%, 2 steps) as colorless oil. $^1$H NMR (200 MHz, CDCl$_3$) δ 3.73 (t, J=6 Hz, 2H), 3.6-3.5 (m, 6H), 3.4 (t, J=6 Hz, 2H), 3.3 (t, J=5 Hz) ppm; $^{13}$C NMR (50 MHz, CDCl$_3$) δ 70.9, 70.3, 70.2, 69.7, 50.3, 30.1 ppm.

1-(4-(2-(2-(2-Azidoethoxy)ethoxy)ethoxy)-2-hydroxy-6-(((2S,3R,5S,6R)-3,4,5-trihydroxy-6-(hydroxymethyl)tetrahydro-2H-pyran-2-yl)oxy)phenyl)-3-(4-hydroxyphenyl)propan-1-one (20)

Phlorizin (3, 2.31 g, 5.30 mmol) in dry DMF (15 mL) was added K$_2$CO$_3$ (1.11 g, 8.03 mmol) at ambient temperature and stirred for 10 min. Compound 19 (1.66 g, 7.00 mmol) was added and the reaction mixture was heated at 55° C. for 12 h. The reaction mixture was concentrated in vacuo. The residue was extracted with water/EtOAc three times. The organic layers were combined and concentrated in vacuo. The residue was purified by column chromatography (silica gel; DCM/MeOH=10/1) to give compound 20 (2.13 g, 3.59 mmol, 68%) as foam; $^1$H NMR (600 MHz, CD$_3$OD) δ 7.08 (d, J=8.4 Hz, 2H, H-2, H-6), 6.70 (d, J=8.4, 2H, H-3, H-5), 6.34 (d, J=2.4 Hz, 1H, H-3'), 6.15 (d, J=2.4 Hz, 1H, H-5'), 5.10 (d, J=7.2 Hz, 1H, C-1''), 4.16 (t, J=4.4 Hz, 2H, H-9), 3.91 (d, J=2 Hz, 1H), 3.83 (t, J=4.4 Hz, 1H), 3.73-3.70 (m, 5H), 3.69-3.67 (m, 1H), 3.52-3.50 (m, 4H), 3.49-3.40 (m, 5H), 2.90 (t, J=7.8 Hz, 2H, H-12) ppm; $^{13}$C NMR (150 MHz, CD$_3$OD) δ 206.8, 167.2, 166.2, 161.8, 156.3, 133.7, 130.3 (2C), 116.0 (2C), 107.6, 102.1, 97.1, 95.1, 78.4, 74.7, 71.7, 71.3, 71.1, 70.7, 70.5, 68.9, 62.4, 51.7, 47.0, 30.6 ppm; HRMS (ESI TOF-MS) C$_{27}$H$_{35}$N$_3$O$_{12}$Na$^+$ [M+Na]$^+$: calc. 616.2113, found: 616.2115.

1-(4-(2-(2-(2-Azidoethoxy)ethoxy)ethoxy)-2,6-dihydroxyphenyl)-3-(4-hydroxyphenyl)propan-1-one (21)

To a solution of compound 20 (195 mg, 0.33 mmol) in EtOH (5 mL) was added 1.0N HCl (3 mL). The mixture was refluxed at 90° C. for 3 h. The reaction mixture was cooled and the solvent was evaporated in vacuo. The residue was extracted with water/EtOAc, dried over MgSO$_4$. The organic layers were combined and concentrated in vacuo. The residue was purified by column chromatography (silica gel; Hex/EtOAc=1/1) to give compound 21 (110 mg, 0.26 mmol, 79%) as foam; $^1$H NMR (400 MHz, CDCl$_3$) δ 7.04 (d, J=8.4 Hz, 2H, C-2, C-6), 6.71 (d, J=8.4 Hz, 2H, C-3, C-5), 5.95-5.85 (m, 2H, C-3', C-5'), 4.06-4.04 (m, 2H, C-7), 3.82 (t, J=4.4 Hz, 2H), 3.73-3.70 (m, 2H), 3.67-3.65 (m, 2H), 3.60 (t, J=5 Hz, 2H), 3.33-3.28 (m, 4H, C-α, C-12), 2.89 (t, J=7.7 Hz, 2 Hz, C-β) ppm; $^{13}$C NMR (100 MHz, CDCl$_3$) δ 204.9, 164.5 (2C), 153.7, 133.7, 129.5 (2C), 115.2 (2C), 105.0, 94.6 (2C), 70.6, 70.4, 69.9, 69.8, 67.1, 50.5, 45.8, 29.7 ppm; HRMS (ESI TOF-MS) C$_{21}$H$_{25}$N$_3$O$_7$Na$^+$ [M+Na]$^+$: calc. 454.1585, found: 454.1583.

1-(6-Maleimidohexanoyloxymethyl)-5-fluorouracil (22)

A solution of 5-FU (100 mg, 0.77 mmol) in water (0.5 mL) was added formaldehyde (37 wt. %, 0.5 mL) at 55° C. and stirred for another 3 h after the solids completely disappeared. Then, solvent was removed in vacuo to get colorless and viscous oil. In another flask, 6-maleimidohexanoic acid (195 mg, 0.92 mmol) in dry ACN (2 mL) were added DCC (190 mg, 0.92 mmol), DMAP (9.5 mg, 0.08 mmol) at 0° C. and stirred for 10 min. Then, the above mentioned oil in dry ACN (0.5 mL) was added to the reaction flask. The reaction mixture was stirred at 0° C. for 30 min, and then stirred at room temperature for 12 h. The precipitates formed in the reaction were filtered, and the filtrate was evaporated in vacuo. The residue in EtOAc was extracted with 1.0N HCl, saturated NaHCO$_3$, and water. The organic layers were dried over MgSO$_4$ and concentrated in vacuo. The residue was purified by column chromatography (silica gel; Hex/EtOAc=1/1) to give compound 22 (117 mg, 0.33 mmol, 43%) as foam. $^1$H NMR (600 MHz, CD$_3$OD) δ 7.92 (d, J=6 Hz, 1H, H-6), 6.79 (s, 2H, H-16, H-17), 5.63 (s, 2H, H-7), 3.48 (t, J=6.9 Hz, 2H, H-13), 2.38 (t, J=7.3 Hz, 2H, H-9), 1.68-1.63 (m, 2H, H-10), 1.59-1.54 (m, 2H, H-12), 1.32-1.27 (m, 2H, H-11); $^{13}$C NMR (150 MHz, CD$_3$OD) δ 174.6, 172.5 (2C), 159.7 (d, J$_{CCF}$=25 H), 151.1, 141.4 (d, J$_{CF}$=233 Hz), 135.3 (2C), 130.5 (d, J$_{CCF}$=34 Hz), 71.6, 38.2, 34.3, 29.1, 27.0, 25.1; HRMS (ESI TOF-MS) C$_{15}$H$_{16}$FN$_3$O$_6$C$_{21}$Na$^+$ [M+Na]$^+$: calc. 376.0915, found: 376.0915.

1-(4-(Pyridin-2-yldisulfanyl) butyroyloxymethyl)-5-fluorouracil (23)

A solution of 5-FU (100 mg, 0.77 mmol) in 37 wt. % formaldehyde solution (0.5 mL) was stirred at 60° C. until the solids completely disappeared and stirred at 60° C. for another 3 h. Solvent was removed in vacuo to get colorless oil. In another flask was added to 4-(2-pyridyldithio)butanoic acid (206 mg, 0.90 mmol), Dicyclohexylcarbodiimide (DCC, 190 mg, 0.92 mmol), and DMAP (11 mg, 0.09 mmol) in ACN (5 mL) at 0° C. and the reaction was stirred for 10 min. Then, the solution was added to the above-mentioned colorless oil. The reaction mixture was stirred at 0° C. for 30 min, and then stirred at room temperature for 12 h. The precipitates formed in the reaction were filtered, and the filtrate was evaporated in vacuo. The residue in EtOAc was extracted with 1.0N HCl, saturated NaHCO$_3$, and water. The organic layers were dried over MgSO$_4$ and concentrated in vacuo. The residue was purified by column chromatography (silica gel; CHCl$_3$/MeOH=25/1) to give compound 23 (95.5 mg, 0.26 mmol, 34%, 2 steps) as solid; $^1$H NMR (400 MHz, CDCl$_3$) δ 8.41 (d, J=4.8 Hz, 1H), 7.62 (t, J=7.3 Hz, 2H), 7.58 (d, J=5.4 Hz, 1H), 7.11-7.01 (m, 1H), 5.60 (s, 2H), 2.78 (t, J=7 Hz, 2H), 2.50 (t, J=7.2 Hz, 2H), 1.21-1.91 (m, 2H); $^{13}$C NMR (100 MHz, CDCl$_3$) δ 173.1, 159.8 (d, J$_{CCF}$=27 Hz), 156.9, 149.8, 149.3, 140.3 (d, J$_{CF}$=238 Hz), 137.2, 128.5 (d, J$_{CCF}$=24 Hz), 120.9, 120.0, 69.8, 37.6, 32.2, 23.5, ppm; HRMS (ESI TOF-MS) C$_{14}$H$_{15}$F$_1$N$_3$O$_4$S$_2$$^+$ [M+H]$^+$: calc. 372.0485, found: 372.0483.

1-(Pent-4-ynoyloxymethyl)-5-fluorouracil (24)

A solution of 5-FU (100 mg, 0.77 mmol) in 37 wt. % formaldehyde solution (0.5 mL) was stirred at 60° C. until the solids completely disappeared and stirred at 60° C. for another 3 h. Solvent was removed in vacuo to get colorless oil. In another flask was added pent-4-ynoic acid (105 mg, 1.07 mmol), DCC (285 mg, 1.38 mmol), and DMAP (11 mg, 0.09 mmol) was added to ACN (5 mL) at 0° C. and the reaction was stirred for 10 min to give pre-activated pent-4-ynoic acid. Then, pre-activated pent-4-ynoic acid in ACN was added to the above mentioned colorless oil. The reaction mixture was stirred at 0° C. for 30 min, and then stirred at room temperature for 12 h. The solids were filtered, and the filtrate was evaporated in vacuo. The residue in EtOAc was extracted with 1.0N HCl, saturated NaHCO$_3$ solution, and water, sequentially. The organic layers were dried over MgSO$_4$ and concentrated in vacuo, purified by column chromatography (silica gel; Hex/EtOAc=2/1) to give compound 24 (118 mg, 0.49 mmol, 64%) as amorphous solids; $^1$H NMR (400 MHz, CDCl$_3$) δ 0.7.59 (d, J=5.4 Hz, 1H, H-6), 5.65 (s, 2H, H-7), 2.67-2.55 (m, 2H), 2.54-2.46 (m, 2H), 1.97 (t, J=2.5 Hz, 1H, H-12) ppm; $^{13}$C NMR (150 MHz, CDCl$_3$) δ 171.9, 156.4 (d, J$_{CCF}$=28 Hz), 148.8, 140.1 (d, J$_{CF}$=237 Hz), 128.3 (d, J$_{CCF}$=33 Hz), 81.5, 69.7, 69.5, 32.9, 14.1 ppm; HRMS (ESI TOF-MS) C$_{10}$H$_9$FN$_2$O$_4$Na$^+$ [M+Na]$^+$: calc. 263.0439, found: 263.0443.

2-(pyridine-2-yldisulfanyl) ethanol (26)

To a solution of aldrithiol-2 (5 g, 0.02 mol) and acetic acid (0.33 mL) in anhydrous MeOH (25 mL) was added mercaptoethanol (1.2 mL, 0.02 mol) drop wise. The reaction mixture was degassed with nitrogen for 20 min, and stirred at room temperature for 26 h. Then, the solvent was evaporated to dryness under reduced pressure, and the crude product was purified by column chromatography (silica gel; EtOAc/Hex=15/85 to 30/70) to give compound 26 (2.4 g, 64%) as colorless oil. $^1$H NMR (400 MHz, CDCl$_3$) δ 2.95 (t, J=5.1 Hz, 2H), 3.78-3.82 (m, 2H), 5.76 (t, J=6.7 Hz, 1H), 7.13-7.17 (m, 1H), 7.39 (d, J=8.0 Hz, 1H), 7.56-7.60 (m, 1H), 8.51-8.52 (m, 1H) ppm; $^{13}$C NMR (100 MHz, CDCl$_3$) δ 42.7, 58.3, 121.6, 122.0, 136.9, 149.9, 159.2 ppm. HRMS (ESI-TOF) calcd. for C$_7$H$_{10}$NOS$_2$ [M+H]$^+$: 188.0198, found: 188.0191.

(4-nitrophenyl) 2-(pyridin-2-yldisulfanyl)ethyl carbonate (27)

To a solution of compound 26 (1.05 g, 5.60 mmol) in anhydrous DCM (10 mL) was added trimethylamine (0.79 mL, 5.6 mmol) and p-nitrophenyl chloroformate (1.70 g, 8.40 mmol) in anhydrous DCM (5 mL) at 0° C. The reaction mixture was allowed to stir for another 1 h at room temperature. The mixture was then filtered to remove precipitated white solid, and partial solvent was removed in vacuo. The crude product was purified by column chromatography (silica gel; EtOAc/Hex=1/8 to 1/4) to give compound 27 (1.1 g, 56%) as colorless oil. $^1$H NMR (400 MHz, CDCl$_3$) δ 3.16 (t, J=6.4 Hz, 2H), 4.56 (t, J=6.4 Hz, 2H), 7.11-7.14 (m, 1H), 7.36-7.40 (m, 2H), 7.63-7.69 (m, 2H), 8.26-8.30 (m, 2H), 8.48-8.50 (m, 1H) ppm; $^{13}$C NMR (100 MHz, CDCl$_3$) δ 36.9, 66.8, 120.3, 121.3, 121.9, 121.9, 125.5, 137.2, 145.6, 150.1, 152.4, 155.5, 159.2 ppm. HRMS (ESI) calcd. For C$_{14}$H$_{13}$N$_2$O$_5$S$_2$ [M+H]$^+$: 353.0260, found: 353.0268.

(S)-4,11-diethyl-4-hydroxy-3,14-dioxo-3,4,12,14-tetrahydro-1H-pyrano[3',4':6,7]indolizino[1,2-b]quinolin-9-yl(2-(pyridin-2-yldisulfanyl)ethyl)carbonate (29)

To a solution of SN-38 (28, 288 mg, 0.73 mmol) in anhydrous DMF (27 mL) was added trimethylamine (103 μl, 0.73 mmol) and compound 27 (310 mg, 0.88 mmol) dissolved in anhydrous DCM (9 mL). The reaction mixture was stirred at ambient temperature under nitrogen for 24 h. Then, the mixture was evaporated to dryness in vacuo and purified by column chromatography (silica gel; MeOH/DCM=1/99 to 1/50) to give compound 29 (273 mg, 62%) as yellow powder. $^1$H NMR (600 MHz, CDCl$_3$) δ 1.03 (t, J=7.4 Hz, 3H), 1.39 (t, J=7.7 Hz, 3H), 1.85-1.95 (m, 2H), 3.13-3.17 (m, 2H), 3.19 (t, J=6.4 Hz, 2H), 3.93 (s, 1H), 4.59 (t, J=6.4 Hz, 2H), 5.25 (s, 2H), 5.30 (d, J=16.1 Hz, 1H), 5.74 (d, J=16.2 Hz, 1H), 7.11-7.13 (m, 1H), 7.61-7.70 (m, 4H), 7.90 (d, J=2.5 Hz, 1H), 8.23 (d, J=9.2 Hz, 1H), 8.50 (d, J=4.6 Hz, 1H) ppm; $^{13}$C NMR (150 MHz, CDCl$_3$) δ 8.0, 14.1, 23.3, 31.7, 37.0, 49.5, 66.4, 66.6, 72.9, 98.3, 114.2, 118.8, 120.3, 121.2, 124.7, 127.5 (2C), 132.4, 137.2, 145.6, 146.9, 147.6, 149.9, 150.0, 150.3, 152.2, 153.2, 157.7, 159.3, 174.0 ppm. HRMS (ESI) calcd. For. C$_{30}$H$_{28}$N$_3$O$_7$S$_2$ [M+H]$^+$: 606.1363, found: 606.1366.

(S)-4,11-diethyl-4-hydroxy-3,14-dioxo-3,4,12,14-tetrahydro-1H-pyrano[3',4':6,7]indolizino[1,2-b]quinolin-9-yl(2-((2-(2-(2-(4-hydroxy-3-(3-(4-hydroxyphenyl)propanoyl)-2-(((2S,3R,4S,5S,6R)-3,4,5-trihydroxy-6-(hydroxymethyl)tetrahydro-2H)pyran-2-yl)oxy)phenoxy)ethoxy)ethoxy)ethyl)disulfanyl)ethyl) carbonate (30)

To a solution of compound 16 (9 mg, 15.4 μmol) in anhydrous THF (800 μL) was added compound 29 (9 mg, 14.9 µmol) in anhydrous THF (300 µL). The reaction mixture was stirred at ambient temperature under nitrogen for 4.5 h. The mixture was evaporated to dryness under reduced pressure, and the crude product was purified by column chromatography (silica gel; MeOH/DCM=1/15) to give compound 30 (16 mg, 99%) as white powders. $^1$H NMR (600 MHz, (CD$_3$)$_2$CO+D2O) δ 0.99 (t, J=7.3 Hz, 3H), 1.39 (t, J=7.7 Hz, 3H), 1.91-2.0 (m, 2H), 2.81 (t, J=7.4 Hz, 2H), 2.99 (t, J=6.4 Hz, 2H), 3.17 (t, J=6.4 Hz, 2H), 3.25 (q, J=7.7, 15.4 Hz, 2H), 3.34-3.60 (m, 6H), 3.65-3.67 (m, 4H), 3.69-3.72 (dd, J=5.9, 12.0 Hz, 1H), 3.76 (t, J=6.4 Hz, 2H), 3.78 (t, J=4.5 Hz, 2H), 3.90 (dd, J=2.5, 12.0 Hz, 1H), 4.11 (m, 2H), 4.58 (t, J=6.3 Hz, 2H), 5.14 (d, J=7.32 Hz, 1H), 5.27 (d, J=1.0, 2H), 5.36 (d, J=16.1 Hz, 1H), 5.53 (d, J=16.4 Hz, 1H), 5.98 (d, J=2.3 Hz, 1H), 6.27 (d, J=2.3 Hz, 1H), 6.70 (d, J=8.5 Hz, 2H), 7.06 (d, J=8.4 Hz, 2H), 7.50 (s, 1H), 7.73 (dd, J=2.5, 9.2 Hz, 1H), 8.09 (d, J=2.5 Hz, 1H), 8.21 (d, J=9.2 Hz, 1H) ppm; $^{13}$C NMR (150 MHz, (CD$_3$)$_2$CO+D2O) δ 8.2, 14.3, 23.4, 31.8, 37.6, 39.7, 46.4, 50.2, 62.3, 66.3, 67.5, 68.6, 69.9, 70.9, 71.0, 71.3, 73.6, 74.3, 78.1, 94.6, 96.6, 97.9, 101.9, 106.9, 115.6, 115.8, 120.1, 125.6, 128.2, 129.3, 130.1, 132.6, 133.0, 146.6, 147.4, 148.0, 150.7, 151.2, 153.3, 154.1, 156.2, 158.2, 161.6, 165.8, 166.8, 173.5, 206.1 ppm. HRMS (ESI TOF-MS) C$_{52}$H$_{59}$N$_2$O$_{19}$S$_2$ [M+H]$^+$: calc. 1079.3148, found: 1079.3157.

(S)-4,11-diethyl-4-hydroxy-3,14-dioxo-3,4,12,14-tetrahydro-1H-pyrano[3',4':6,7]indolizino[1,2-b]quinolin-9-yl(2-((2-(2-(2-(2,4-dihydroxy-3-(3-(4-hydroxyphenyl)propanoyl)phenoxy)ethoxy)eyhoxy)ethyl)disulfanyl)ethyl) carbonate (31)

Compound 17 (50 mg, 0.12 mmol) was dissolved in anhydrous THF (10 mL). Compound 29 (60 mg, 0.10 mmol) was then added to the above solution and stirred for 1 h at room temperature under nitrogen atmosphere. The reaction mixture was concentrated in vacuo to remove solvent. The crude product was purified by column chromatography (silica gel; MeOH/DCM=1/25) to give compound 31 (76.2 mg, 84%) as yellow solids. $^1$H NMR (600 MHz, (CD$_3$)$_2$CO+ D2O) δ 1.01 (t, J=7.4 Hz, 3H), 1.41 (t, J=7.6 Hz, 3H), 1.93-2.0 (m, 2H), 2.86 (m, 2H), 2.99 (t, J=6.2 Hz, 2H), 3.17 (t, J=6.3 Hz, 2H), 3.26-3.32 (m, 4H), 3.64-3.66 (m, 4H), 3.76 (t, J=6.2 Hz, 2H), 3.78 (t, J=4.7 Hz, 2H), 4.09 (t, J=4.5 Hz, 2H), 4.58 (t, J=6.4 Hz, 2H), 5.28 (s, 2H), 5.39 (d, J=16.1 Hz, 1H), 5.54 (d, J=16.1 Hz, 1H), 5.96 (s, 2H), 6.73 (d, J=8.3 Hz, 2H), 7.06 (d, J=8.3 Hz, 2H), 7.47 (s, 1H), 7.74 (dd, J=2.5, 9.2 Hz, 1H), 8.11 (d, J=2.5 Hz, 1H), 8.22 (d, J=9.1 Hz, 1H), 11.82 (br, s, 1H) ppm; $^{13}$C NMR (150 MHz, (CD$_3$)$_2$CO+D2O) δ 8.2, 14.3, 23.4, 31.9, 37.6, 46.9, 50.2, 66.4, 67.5, 68.5, 70.0, 71.1, 71.4, 73.7, 94.8, 97.4, 105.7, 115.6, 116.0, 120.1, 125.6, 128.3, 129.4, 130.2, 132.7, 133.4, 146.4, 147.6, 148.2, 150.7, 150.9, 153.5, 154.1, 156.4, 158.0, 165.1, 166.0, 173.6, 205.8 ppm. HRMS (ESI TOF-MS) C$_{46}$H$_{48}$N$_2$O$_{14}$S$_2$ [M+H]$^+$: calc. 917.2620, found: 917.2621.

(S)-2((S)-2((((9H-fluoren-9-yl)methoxy)carbonyl)amino)-3-methylbutanamido)-5-ureidopentanoic acid (33)

To a solution of compound 32 (5 g, 11.46 mmol) and L-citrulline (2.1 g, 12 mmol) in dimethoxymethane (50 mL) and THF (25 mL) was added sodium bicarbonate (1 g, 12 mmol) in water (50 mL). The reaction was stirred at r.t and left in the dark. After 5 days, 20% citric acid$_{(aq)}$ was added to the mixture and pH adjusted to approximately 5. The solution was extracted with 10% isopropyl alcohol in EtOAc at equivalent volume three times. The organic layers were combined and washed with water another three times. The organic layer was then collected, dried over MgSO$_4$, and evaporated to dryness in vacuo to give the crude product. Finally, the crude product was spread in ether and sonicated to yield compound 33 (5 g, 88%) as white solids. $^1$H NMR (400 MHz, DMSO-d$_6$) δ 0.85-0.9 (m, 6H), 1.39-1.41 (m, 2H), 1.51-1.61 (m, 1H), 1.69-1.70 (m, 1H), 1.95-2.00 (m, 1H), 2.94 (m, 2H), 3.92 (t, J=8.24 Hz, 1H), 4.12-4.17 (m, 1H), 4.21-4.31 (m, 3H), 5.37 (s, 2H), 5.94 (t, J=4.44 Hz, 1H), 7.30-7.34 (m, 1H), 7.38-7.43 (m, 3H), 7.75 (t, J=7.12 Hz, 2H), 7.89 (d, J=7.48 Hz, 2H), 8.17 (d, J=7.16 Hz, 2H), 12.55 (br, s, 1H) ppm; $^{13}$C NMR (100 MHz, DMSO-d$_6$) δ 18.2, 19.2, 26.6, 28.4, 30.6, 38.8, 46.7, 51.9, 59.8, 65.7, 120.1, 125.4, 127.1, 127.7, 140.7, 143.8, 143.9, 156.1, 158.7, 171.3, 173.4 ppm. HRMS (ESI TOF-MS) C$_{26}$H$_{32}$N$_4$O$_6$ [M+H]$^+$: calc. 497.2395, found: 497.2404.

(9H-Fluoren-9-yl)methyl((S)-1-(((S)-1-[[4-(hydroxymethyl)phenyl]amino]-1-oxo-5-ureidopentan-2-yl)amino)-3-methyl-1-oxobutan-2-yl)carbamate (34)

Compound 33 (6 g, 12.1 mmol), p-aminobenzyl alcohol (3 g, 24.2 mmol) and N-ethoxycarbonyl-2-ethoxy-1,2-dihydroquinoline (EEDQ, 6 g, 24.2 mmole) were dissolved in dry DCM (200 mL) and MeOH (100 mL). The reaction mixture was stirred at r.t and left in the dark. After 24 h, the mixture was evaporated to dryness in vacuo. The residue was washed with ether/ethyl acetate (v/v=1/1) to yield compound 34 as brownish solids (5 g, 69%). $^1$H NMR (400 MHz, DMSO-d$_6$) δ 0.84-0.89 (m, 6H), 1.38-1.44 (m, 2H), 1.58-1.70 (m, 2H), 1.97-2.01 (m, 1H), 2.91-3.04 (m, 2H), 3.93 (t, J=7.34 Hz, 1H), 4.23-4.33 (m, 3H), 4.42-4.43 (m, 3H), 5.11 (t, J=5.76 Hz, 1H), 5.43 (s, 2H), 5.99 (t, J=4.72 Hz, 1H), 7.23 (d, J=8.16 Hz, 2H), 7.30-7.34 (m, 2H), 7.39-7.46 (m, 3H), 7.54 (d, J=8.4 Hz, 2H), 7.74 (t, J=7.84H, 2H), 7.89 (d, J=7.44 Hz, 1H), 8.11 (d, J=7.64 Hz, 1H), 9.99 (s, 1H) ppm; $^{13}$C NMR (100 MHz, DMSO-d$_6$) δ 18.3, 19.2, 26.8, 29.5, 30.4, 38.6, 46.7, 53.0, 60.1, 62.6, 65.7, 118.9, 120.1, 125.4, 126.9, 127.1, 127.6, 137.4, 137.5, 140.7, 143.8, 143.9, 156.1, 158.9, 170.3, 171.2 ppm. HRMS (ESI TOF-MS) C$_{33}$H$_{40}$N$_5$O$_6$ [M+H]$^+$: calc. 602.2973, found: 602.2987.

(S)—N-(4-(((((S)-4,11-diethyl-4-hydroxy-3,14-dioxo-3,4,12,14-tetrahydro-1H-pyrano[3',4':6, 7]indolizino[1,2-b]quinolin-9-yl)oxy)methyl)phenyl)-2-((S)-2-(5-(2,5-dioxo-2,5-dihydro-1H-pyrrol-1-yl)pentanamido)-3-methylbutanamido)-5-ureidopentanamide (36)

Compound 34 (1.71 g, 2.84 mmol) was added HBr (33 wt % in glacial acetic acid, 30 mL) at 0° C. and stirred for 10 min. The mixture was warmed to r.t and stirred for another 2 h. The reaction was then quenched with 500 mL water and the brominated intermediate 35 would be precipitated. The intermediate 35 was collected by filtration, washed with additional water to remove residual acid, and dried in vacuum to give crude 35 (1.52 g) as brownish solids. To a solution of SN-38 (694 mg, 1.77 mmol) and Cs$_2$CO$_3$ (811.4 mg, 2.3 mmol) in dry DMF (50 mL) was added crude 35, and the reaction mixture was stirred for 20 min. Then, piperidine (5 mL) was added to the above mixture, and stirred for another 10 min. The mixture was then evaporated to dryness in vacuo and purified by column chromatography (silica gel; MeOH/15 DCM=50/1 to 5/1 gradually) to give crude val-cit-pab-O—SN-38 (316 mg) as yellow solids. The crude val-cit-pab-O—SN-38 (316 mg) was dissolved in dry DMF (25 mL), and was added TEA (58.6 µL, 0.42 mmol) and 5-maleimido valeric acid-NHS (161.8 mg, 0.55 mmol). After stirring for 3.5 h, the mixture was evaporated to dryness in vacuo, and purified by column chromatography (silica gel; MeOH/DCM=10/1) to give compound 36 (164.4 mg, 10%) as yellow solids. $^1$H NMR (600 MHz, DMSO-$d_6$) δ 0.81-0.89 (m, 9H), 1.26 (t, J=7.6 Hz, 3H), 1.32-1.49 (m, 6H), 1.56-1.61 (m, 1H), 1.67-1.73 (m, 1H), 1.81-1.91 (m, 2H), 1.94-1.99 (m, 1H), 2.12-2.17 (m, 1H), 2.18-2.23 (m, 1H), 2.92-2.97 (m, 1H), 3.00-3.05 (m, 1H), 3.14-3.15 (m, 2H), 4.18 (t, J=7.8 Hz, 1H), 4.35-4.40 (m, 1H), 5.25 (s, 2H), 5.28 (s, 2H), 5.38-5.44 (m, 4H), 5.98 (t, J=5.4 Hz, 1H), 6.50 (s, 1H), 6.99 (s, 2H), 7.25 (s, 1H), 7.49 (d, J=8.52 Hz, 2H), 7.52 (d, J=9.24 Hz, 1H), 7.55 (s, 1H), 7.65 (d, J=8.46 Hz, 2H), 7.82 (d, J=8.58 Hz, 1H), 8.05 (dd, J=8.9, 2.2 Hz, 1H), 8.08 (d, J=7.4 Hz, 1H), 10.01 (s, 1H) ppm; $^{13}$C NMR (150 MHz, DMSO-$d_6$) δ 7.8, 13.5, 18.2, 19.2, 22.3, 22.7, 26.8, 27.7, 29.3, 30.3, 30.4, 34.6, 36.9, 38.6, 40.1, 49.5, 53.1, 57.6, 65.3, 69.6, 72.4, 96.0, 103.7, 118.3, 119.1, 122.7, 127.8, 128.3, 128.8, 131.3, 131.4, 134.5, 138.8, 143.9, 144.4, 146.3, 149.6, 150.1, 156.9, 157.2, 158.9, 170.7, 171.1, 171.3, 172.2, 172.6 ppm. HRMS (ESI TOF-MS) $C_{49}H_{57}N_8O_{11}$ [M+H]$^+$: calc. 933.4141, found: 933.4188.

(2S)—N-(4-((((S)-4,11-diethyl-4-hydroxy-3,14-dioxo-3,4,12,14-tetrahydro-1H-pyrano[3',4':6,7]indolizino[1,2-b]quinolin-9-yl)oxy)methyl)phenyl)-2-((2S)-2-(5-(3-((2-(2-(2-(3-hydroxy-4-(3-(4-hydroxyphenyl)propanoyl)-5-(((2S,3R,4S,5S,6R)-3,4,5-trihydroxy-6-(hydroxymethyl)tetrahydro-2H-pyran-2-yl)oxy)phenoxy)ethoxy)ethoxy)ethyl)thio)-2,5-dioxopyrrolidin-1-yl)pentanamido)-3-methylbutanamido)-5-ureidopentanamide (37)

To a solution of compound 36 (136 mg, 0.15 mmol) in MeOH (60 mL) was added 16 (108.6 mg, 0.26 mmol). The reaction was stirred at r.t. After 1.5 h, the mixture was evaporated to dryness in vacuo, and purified by column chromatography (silica gel; DCM/MeOH=7/1 to 5/1) to yield compound 37 (113 mg, 50%) as yellow solids. $^1$H NMR (600 MHz, DMSO-$d_6$) δ 0.82-0.89 (m, 9H), 1.27 (t, J=7.4 Hz, 3H), 1.36-1.45 (m, 6H), 1.59-1.69 (m, 2H), 1.81-1.91 (m, 2H), 1.94-1.98 (m, 1H), 2.08-2.22 (m, 2H), 2.50-2.22 (m, 1H), 2.77-2.84 (m, 3H), 2.92-3.04 (m, 3H), 3.14-3.18 (m, 4H), 3.26-3.30 (m, 3H), 3.35 (m, 2H), 3.39-3.47 (m, 3H), 3.54-3.57 (m, 4H), 3.60-3.63 (m, 2H), 3.70-3.72 (m, 3H), 4.02 (dd, J=8.7, 3.3 Hz, 1H), 4.14 (m, 2H), 4.19 (t, J=7.5 Hz, 1H), 4.35-4.40 (m, 1H), 4.63 (t, J=5.3 Hz, 1H), 5.04 (d, J=7.0 Hz, 1H), 5.08 (d, J=5.2 Hz, 1H), 5.16 (d, J=4.0 Hz, 1H), 5.28 (s, 4H), 5.33 (d, J=4.5 Hz, 1H), 5.42-5.45 (m, 4H), 5.99 (t, J=5.5 Hz, 1H), 6.12 (s, 1H), 6.28 (s, 1H), 6.49 (s, 1H), 6.64 (d, J=8.1 Hz, 2H), 7.03 (d, J=8.1 Hz, 2H), 7.26 (s, 1H), 7.49 (d, J=8.3 Hz, 2H), 7.54-7.56 (m, 1H), 7.59 (m, 1H), 7.66 (d, J=8.2 Hz, 2H), 7.81 (d, J=8.3 Hz, 1H), 8.07 (d, J=9.2 Hz, 1H), 8.10 (d, J=7.1 Hz, 1H), 9.11 (s, 1H), 10.02 (s, 1H), 13.33 (s, 1H) ppm; $^{13}$C NMR (150 MHz, DMSO-$d_6$) δ 7.7, 13.4, 18.2, 19.2, 22.2, 22.6, 26.7, 26.8, 28.9, 29.3, 30.3, 30.4, 34.6, 35.9, 38.0, 38.5, 40.1, 45.1, 49.5, 53.1, 57.6, 60.7, 65.3, 67.6, 68.6, 69.5, 69.7, 69.8, 72.4, 73.2, 76.7, 77.3, 93.7, 95.7, 96.0, 100.7, 103.8, 106.3, 115.0, 118.3, 119.1, 122.7, 127.8, 128.4, 128.7, 129.1, 131.3, 131.4, 138.8, 143.9, 144.5, 146.3, 149.6, 150.1, 155.3, 156.8, 157.2, 158.9, 160.2, 164.3, 164.8, 170.6, 171.3, 172.1, 172.5, 175.1, 176.8, 205.1 ppm. HRMS (ESI TOF-MS) $C_{76}H_{93}N_8O_{23}S$ [M+H]$^+$: calc. 1517.6069, found: 1517.6083.

(2S)—N-(4-((((S)-4,11-diethyl-4-hydroxy-3,14-dioxo-3,4,12,14-tetrahydro-1H-pyrano[3',4': 6,7]indolizinol[1,2-b]quinolin-9-yl)oxy)methyl)phenyl)-24 (2S)-2-(5-(34(2-(2-(2-(3,5-dihydroxy-4-(3-(4-hydroxyphenyl)propanoyl)phenoxy)ethoxy)ethoxy) ethyl)thio)-2,5-dioxopyrrolidin-1-yl)pentanamido)-3-methylbutanamido)-5-ureidopentanamide (38)

To a solution of compound 36 (36 mg, 0.04 mmol) in MeOH (20 mL) was added 17 (21.5 mg, 0.05 mmol). The suspension was stirred at r.t for 1 h. The mixture was evaporated to dryness in vacuo cesium carbonate, and ether/ethyl acetate (v/v=1/1) added to precipitate the crude product. The crude product was then purified by column chromatography (C18; ACN/H$_2$O=1/1) to give compound 38 (17.5 mg, 32%) as yellow solids. $^1$H NMR (600 MHz, DMSO-$d_6$) δ 0.82-0.89 (m, 9H), 1.27 (t, J=7.4 Hz, 3H), 1.36-1.45 (m, 6H), 1.58-1.60 (m, 1H), 1.70-1.72 (m, 1H), 1.82-1.91 (m, 2H), 1.94-1.99 (m, 1H), 2.13-2.22 (m, 2H), 2.48-2.52 (m, 1H), 2.76 (t, J=7.5 Hz, 2H), 2.79-2.83 (m, 1H), 2.93-2.99 (m, 2H), 3.01-3.04 (m, 1H), 3.13-3.17 (m, 3H), 3.24 (t, J=7.5 Hz, 2H), 3.35 (m, 2H), 3.53-3.56 (m, 4H), 3.59-3.64 (m, 2H), 3.70 (t, J=3.7 Hz, 2H), 4.02 (dd, J=8.9, 3.8 Hz, 1H), 4.05 (t, J=3.7 Hz, 2H), 4.19 (t, J=7.4 Hz, 1H), 4.38 (q, J=13.1, 7.5 Hz, 1H), 5.27-5.28 (m, 4H), 5.39-5.45 (m, 4H), 5.92 (s, 2H), 5.98 (t, J=5.4 Hz, 1H), 6.49 (br, s, 1H), 6.65 (d, J=8.2 Hz, 2H), 7.01 (d, J=8.2 Hz, 2H), 7.26 (s, 1H), 7.48 (d, J=8.3 Hz, 2H), 7.55 (dd, J=11.0, 1.9 Hz, 1H), 7.58 (d, J=1.6 Hz, 1H), 7.65 (d, J=8.3 Hz, 2H), 7.81 (d, J=8.5 Hz, 1H), 8.07 (d, J=9.1 Hz, 1H), 8.09 (d, J=7.3 Hz, 1H), 9.14 (br, s, 1H), 10.01 (s, 1H), 12.39 (br, s, 2H) ppm; $^{13}$C NMR (150 MHz, DMSO-$d_6$) δ 7.8, 13.4, 18.2, 19.2, 22.2, 22.6, 23.4, 26.7, 26.8, 29.3, 30.3, 30.4, 34.6, 35.9, 38.0, 38.6, 40.1, 45.6, 49.5, 53.1, 57.6, 65.3, 67.3, 68.6, 69.4, 69.5, 69.6, 69.8, 72.2, 72.4, 93.6, 96.0, 103.7, 104.6, 115.1, 118.3, 119.1, 122.7, 127.8, 128.4, 128.7, 129.1, 131.3, 131.4, 131.5, 138.8, 143.9, 144.5, 146.3, 149.6, 150.1, 155.4, 156.9, 157.2, 158.9, 164.1, 164.6, 170.6, 171.3, 172.1, 172.5, 175.1, 176.8, 204.7 ppm. HRMS (ESI TOF-MS) $C_{70}H_{83}N_8O_{18}S$ [M+H]$^+$: calc. 1355.5541, found: 1355.5562.

(S)-4,11-Diethyl-3,14-dioxo-4-(pent-4-ynoyloxy)-3,4,12,14-tetrahydro-1H-pyrano[3',4':6,7]indolizino[1,2-b]quinolin-9-yl[1,4'-bipiperidine]-1'-carboxylate (40)

The solution of irinotecan (400 mg, 0.64 mmol) in dry ACN (5 mL) was added pent-4-ynoic acid (94 mg, 0.96 mmol) and was cooled to 0° C. DCC (198 mg, 0.96 mmol) and DMAP (2 mg, 0.02 mmol) in dry ACN (0.5 mL) were added and then was stirred for another 4 h. After the precipitates were filtered, the filtrate was evaporated in vacuo. The residue in EtOAc was extracted with 1.0N HCl solution, saturated NaHCO$_3$ solution, and water. The organic layers were dried over MgSO$_4$ and concentrated in vacuo. The residue was purified by column chromatography (silica gel; DCM/MeOH=12/1) to give compound 40 (295 mg, 69%) as amorphous solids. mp: 149° C. $^1$H NMR (600 MHz, CDCl$_3$) δ 8.13 (d, J=9 Hz, 1H), 7.81 (d, J=3 Hz, 1H), 7.56 (dd, J=6.6, 2.4 Hz, 1H), 7.26 (s, 1H), 5.67 (d, J=17.4 Hz, 1H), 5.37 (d, J=17.4 Hz, 1H), 5.21 (d, J=4.2 Hz, 2H), 4.40 (dd, J=40.2, 12.6 Hz, 2H), 3.16-3.11 (m, 2H), 3.06 (t, J=12.6 Hz, 1H), 2.88 (t, J=12.6 Hz, 1H), 2.77-2.69 (m, 6H), 2.51-2.49 (m, 2H), 2.29-2.23 (m, 1H), 2.20 (t, J=2.4 Hz, 1H), 2.14-2.08 (m, 4H), 1.75-1.60 (m, 6H), 1.55-1.51 (m, 2H), 1.37 (t, J=7.5 Hz, 3H), 0.98 (t, J=7.5 Hz, 3H) ppm; $^{13}$C NMR (150 MHz, CDCl$_3$) δ 170.7, 167.4, 157.3, 153.0, 151.6, 150.3 147.1, 146.6, 145.9, 145.3, 131.5, 127.5, 127.1, 125.8, 119.7, 114.6, 96.4, 82.2, 76.3, 70.2, 67.0, 62.6, 50.2, 49.2, 44.1, 43.7, 33.1, 31.7, 27.7, 25.1, 23.9, 23.1, 14.2, 13.9, 7.5 ppm; HRMS (ESI) calcd. For C$_{38}$H$_{43}$N$_4$O$_7$ [M+H]$^+$: 667.3126, found 667.3134.

(S)-4-((6-(2,5-Dioxo-2,5-dihydro-1H-pyrrol-1-yl) Hexanoyl)oxy)-4,11-diethyl-3,14-dioxo-3,4,12,14-tetrahydro-1H-pyrano[3',4':6,7]indolizino[1,2-b] quinolin-9-yl[1,4'-bipiperidine]-1'-carboxylate (41)

The solution of irinotecan (100 mg, 0.16 mmol) in dry ACN (6 mL) was added 6-maleimidohexanoic acid (195 mg, 0.06 mmol) and was cooled to 0° C. DCC (40 mg, 0.19 mmol) and DMAP (2.5 mg, 0.02 mmol) in dry ACN (0.5 mL) was added to above flask and then the reaction was stirred for another 4 h. The precipitates formed in the reaction were filtered, and the filtrate was evaporated in vacuo. The residue in EtOAc was extracted with 1.0N HCl solution, saturated NaHCO$_3$ solution, and water. The organic layers were collected, dried over MgSO$_4$, and concentrated in vacuo. The residue was purified by column chromatography (silica gel; DCM/MeOH=12/1) to give compound 41 (52.5 mg, 42%) as amorphous solid, mp: 149° C. $^1$H NMR (600 MHz, CDCl$_3$) δ 8.26 (d, J=9 Hz, 1H), 7.89 (s, 1H), 7.66 (d, J=9 Hz, 1H), 7.34 (s, 1H, H-29), 6.70 (s, 1H, H-53), 5.75 (d, J=16.8 Hz, 1H), 5.48 (d, J=16.8 Hz, 1H), 5.46-5.31 (m, 2H, H-28), 4.50 (dd, J=42, 12 Hz, 2H), 3.60-3.47 (m, 2H), 3.24 (dd, J=7.2, 7.8 Hz, 2H), 3.15 (t, J=2.6 Hz, 1H), 2.99 (t, J=2.6 Hz, 1H), 2.85-2.73 (m, 5H), 2.61-2.52 (m, 3H), 2.39-2.33 (m, 1H), 2.26-2.21 (m, 1H), 2.15-2.10 (m, 1H), 1.86-1.81 (m, 5H), 1.77-1.72 (m, 3H), 1.68-1.63 (m, 2H), 1.63-1.60 (m, 2H), 1.47 (t, J=7.8 Hz, 3H), 1.43-1.40 (m, 2H), 1.03 (t, J=7.8 Hz, 3H) ppm; $^{13}$C NMR (150 MHz, CDCl$_3$) δ 172.3, 170.7, 167.5, 157.3, 153.0, 151.5, 150.3, 147.1, 146.8, 145.8, 145.3, 133.9, 131.6, 127.5, 127.1, 125.8, 120.2, 114.6, 95.8, 75.7, 67.1, 62.6, 50.2, 49.3, 44.2, 43.8, 37.5, 33.5, 31.8, 28.1, 27.8, 27.1, 25.9, 25.3, 24.1, 23.1, 14.0, 7.5 ppm; HRMS (ESI) calcd. For C$_{43}$H$_{50}$N$_5$O$_9$ [M+H]$^+$: 780.3603, found: 780.3636.

(4S)-4,11-Diethyl-4-((3-(1-(2-(2-(2-(3-hydroxy-4-(3-(4-hydroxyphenyl)propanoyl)-5-(((2S,3R,5S,6R)-3,4,5-trihydroxy-6-(hydroxymethyl)tetrahydro-2H-pyran-2-yl)oxy)phenoxy)ethoxy)ethoxy)ethyl)-1H-1,2,3-triazol-4-yl)propanoyl)oxy)-3,14-dioxo-3,4,12,14-tetrahydro-1H-pyrano[3',4':6,7]indolizino[1,2-b] quinolin-9-yl[1,4'-Bipiperidine]-1'-carboxylate (42)

To a solution of 20 (27.2 mg, 0.04 mmol) in ethanol/water (v/v=3/1, 1 mL) was added TBTA (6.2 mg, 0.01 mmol), sodium ascorbic acid (9.1 mg, 0.46 mmol), copper (II) sulfate pentahydrate (2 mg, 0.01 mmol), and 40 (30 mg, 0.04 mmol). The reaction mixture was stirred for 24 h and then concentrated in vacuo. The mixture in EtOAc was extracted with water. The organic layers were collected, concentrated in vacuo, and purified by column chromatography (silica gel; DCM/MeOH=10/1 to 3/1) to give 42 (38 mg, 67%) as foam. $^1$H NMR (400 MHz, CDCl$_3$/CD$_3$OD=10/1) δ 8.13 (d, J=9.2 Hz, 1H), 7.88 (s, 1H), 7.81 (s, 1H), 7.58 (d, J=9 Hz, 1H), 7.31 (s, 1H), 6.98 (d, J=8.3 Hz, 2H), 6.63 (d, J=10.8 Hz, 2H), 6.03 (s, 1H), 5.82 (d, J=2.1 Hz, 1H), 5.63 (d, J=16.8 Hz, 1H), 5.43 (d, J=16.8 Hz, 1H), 5.13 (dd, J=15.4, 18.5 Hz, 2H), 4.95 (d, J=7.3 Hz, 1H), 4.42-4.25 (m, 4H), 3.94-3.87 (m, 3H), 3.73-3.66 (m, 6H), 3.56-3.36 (m, 9H), 3.2-2.9 (m, 9H), 2.74-2.72 (m, 6H), 2.28-2.10 (m, 2H), 2.02-1.99 (m, 2H), 1.70-1.54 (m, 8H), 1.31 (t, J=7.3 Hz, 3H), 0.99 (t, J=7.4 Hz, 3H) ppm; $^{13}$C NMR (400 MHz, CDCl$_3$/CD$_3$OD=10/1) δ 205.2, 171.7, 167.8, 166.1, 164.4, 160.1, 157.4, 153.2, 151.0, 150.3, 146.68, 146.63, 145.7, 132.5, 131.3, 129.1, 127.6, 127.6, 127.1, 126.1, 123.3, 119.3, 115.1, 114.7, 100.4, 96.9 55.6, 94.0, 77.3, 76.3, 76.1, 73.0, 70.5, 69.9, 69.3, 69.1, 67.4, 66.8, 62.4, 61.7, 50.2, 50.1, 49.4, 45.4, 44.2, 43.8, 33.0, 31.5, 29.6, 29.1, 27.7, 27.0, 25.4, 24.1, 23.1, 20.4, 13.8, 7.5 ppm. HRMS (ESI) calcd. For C$_{65}$H$_{77}$N$_7$O$_{19}$+H [M+H]$^+$: 1260.5347, found: 1260.5372.

(S)-4-((3-(1-(2-(2-(2-(3,5-dihydroxy-4-(3-(4-hydroxyphenyl)propanoyl)phenoxy)ethoxy)ethoxy) ethyl)-1H-1,2,3-triazol-4-yl)propanoyl)oxy)-4,11-diethyl-3,14-dioxo-3,4,12,14-tetrahydro-1H-pyrano [3',4':6,7]indolizino[1,2-b]quinolin-9-yl[1,4'-bipiperidine]-1'-carboxylate (43)

To a solution of 21 (50 mg, 0.12 mmol) in EtOH/H$_2$O (v/v=3/1, 1 mL) was added TBTA (13 mg, 0.02 mmol) sodium ascorbic acid (24 mg, 0.12 mmol), copper (II) sulfate pentahydrate (3 mg, 0.01 mmol), and 40 (80 mg, 0.15 mmol). The reaction mixture was stirred for 12 h and then concentrated in vacuo. The mixture was redissolved in EtOAc and was extracted with water. The organic layers were concentrated in vacuo and purified by column chromatography (silica gel: DCM/MeOH=10/1 to 5/1) to give 43 (77 mg, 59%) as amorphous solids, mp: 158° C. $^1$H NMR (600 MHz, CDCl$_3$) δ 8.20 (d, J=9.6 Hz, 1H), 7.84 (s, 1H), 7.54 (d, J=9.6 Hz, 1H), 7.49 (s, 1H), 7.27 (s, 1H), 7.02 (d, J=7.8 Hz, 2H), 6.76 (d, J=7.8 Hz, 2H), 6.01-5.93 (m, 2H), 5.63 (d, J=16.8 Hz, 1H), 5.34 (d, J=16.8 Hz, 1H), 5.22 (d, J=3.6 Hz, 2H), 4.44-4.41 (m, 3H, H-9), 4.38-4.33 (m, 1H), 4.04 (m, 2H), 3.87-3.86 (m, 2H), 3.64 (t, J=5.4 Hz, 2H), 3.54 (m, 4H), 3.38-3.29 (m, 2H), 3.16-3.11 (m, 2H), 3.04 (t, J=6.6 Hz, 1H), 2.91-2.85 (m, 3H), 2.81 (t, J=6.4 Hz, 2H), 2.72 (br, 4H), 2.51-2.50 (m, 1H), 2.46-2.40 (m, 1H), 2.14-2.01 (m, 5H), 1.83-1.62 (m, 6H), 1.51-1.39 (m, 2H), 1.37 (t, J=7.2 Hz, 3H), 0.93 (t, J=7.2 Hz, 3H) ppm; $^{13}$C NMR (150 MHz, CDCl$_3$) δ 205.2, 171.6, 167.6, 164.7, 157.2, 154.7, 152.9, 151.0, 150.5, 146.6, 146.2, 146.1, 145.4, 133.4, 130.6, 129.3, 127.7, 127.3, 126.5, 123.2, 119.8, 115.2, 114.8, 105.3, 96.5, 94.5, 75.9, 71.1, 70.3, 69.2, 68.7, 66.9, 62.6, 50.7, 50.2, 49.3, 45.9, 44.1, 43.7, 32.7, 31.5, 29.9, 27.7, 26.9, 25.0, 23.9, 23.2, 20.3, 13.9, 7.5 ppm; HRMS (ESI) calcd. For C$_{59}$H$_{68}$N$_7$O$_{14}$ [M+H]$^+$: 1098.4819, found: 1098.482

Diethyl-4-((6-(3-((2-(2-(2-(3-hydroxy-4-(3-(4-hydroxyphenyl)propanoyl)-5-(((2S,3R,5S,6R)-3,4,5-trihydroxy-6-(hydroxymethyl)tetrahydro-2H-pyran-2-yl)oxy)phenoxy)ethoxy)ethoxy)ethyl)thio)-2,5-dioxopyrrolidin-1-yl)hexanoyl)oxy)-3,14-dioxo-3,4,12,14-tetrahydro-1H-pyrano[3',4':6,7]indolizino[1,2-b]quinolin-9-yl[1,4'-bipiperidine]-1'-carboxylate (44)

To a solution of 16 (33.7 mg, 0.05 mmol) in dry MeOH (2 mL) was added 41 (45 mg, 0.05 mmol). The reaction mixture was stirred for 10 min and then was concentrated in vacuo. The residue was purified by column chromatography (silica gel; DCM/MeOH=10/1 to 3/1) to give 44 (47.2 mg, 69%) as amorphous solids, mp: 146° C. $^1$H NMR (400 MHz, CDCl$_3$/CD$_3$OD=10/1) δ 8.05 (d, J=9.2 Hz, 1H), 7.72 (d, J=2.4 Hz, 1H), 7.46 (dd, J=6.7, 2.6 Hz, 1H), 7.14 (d, J=1 Hz, 1H), 6.92 (dd, J=6.4, 2 Hz, 2H), 6.58 (d, J=7.8 Hz, 2H), 6.04 (s, 1H), 5.94 (s, 1H), 5.53 (d, J=17 Hz, 1H), 5.27 (d, J=8.2 Hz, 1H), 4.87 (d, J=5.7 Hz, 1H), 4.34 (dd, J=30.7, 16.4 Hz, 2H), 3.97 (br, 2H), 3.70-3.69 (m, 3H), 3.64-3.59 (m, 3H), 3.55-3.53 (m, 5H), 3.35-3.31 (m, 6H), 3.29-3.27 (m, 3H), 3.23 (t, J=1.5 Hz, 2H), 3.05-2.94 (m, 6H), 2.81-2.70 (m, 6H), 2.39-2.30 (m, 3H), 2.14-1.98 (m, 4H), 1.89-1.72 (br, 4H), 1.61-1.49 (m, 2H), 1.54-1.40 (m, 6H), 1.26 (t, J=7.5 Hz, 3H), 1.24-1.15 (m, 2H), 0.85 (t, J=7.3 Hz, 3H) ppm; $^{13}$C NMR (100 MHz, CDCl$_3$/CD$_3$OD=10/1) δ 205.2, 177.1, 175.3, 172.6, 167.9, 164.6, 160.1, 157.5, 154.6, 153.1, 151.3, 146.8, 146.5, 146.4, 146.0, 132.6, 131.2, 129.4, 129.2, 127.6, 127.3, 125.9, 119.7, 115.1, 114.8, 106.3, 100.6, 95.8, 94.2, 76.4, 75.7, 73.1, 70.7, 70.6, 70.1, 69.6, 69.2, 67.6, 66.9, 63.1, 61.5, 50.0, 49.4, 45.5, 43.5, 43.1, 39.3 38.6, 36.1, 33.3, 31.5, 31.2, 29.2, 27.0, 25.8, 24.0, 23.7, 23.1, 22.8, 13.9, 7.5 ppm. HRMS (ESI) calcd. For $C_{70}H_{85}N_5O_{21}S+H$ [M+H]$^+$: 1364.5531, found: 1364.5597.

(4S)-4-((6-(3-((2-(2-(2-(3,5-Dihydroxy-4-(3-(4-hydroxyphenyl)propanoyl)phenoxy)ethoxy)ethoxy)ethyl)thio)-2,5-dioxopyrrolidin-1-yl)hexanoyl)oxy)-4,11-diethyl-3,14-dioxo-3,4,12,14-tetrahydro-1H-pyrano[3',4':6,7]indolizino[1,2-b]quinolin-9-yl[1,4'-bipiperidine]-1'-carboxylate (45)

To a solution of 17 (25.8 mg, 0.06 mmol) in dry MeOH (2 mL) was added 41 (47.8 mg, 0.06 mmol). The reaction mixture was stirred for 10 min and was concentrated in vacuo. The residue was purified by column chromatography (silica gel; DCM/MeOH=12/1 to 5/1) to give 45 (41.7 mg, 58%) as amorphous solids, mp: 135° C. $^1$H NMR (400 MHz, CDCl$_3$) δ 8.14 (d, J=9.2 Hz, 1H), 7.79 (s, 1H), 7.51 (d, J=9.2 Hz, 1H), 7.18 (d, J=2.6 Hz, 1H), 6.98 (d, J=8.1 Hz, 2H), 6.70 (dd, J=4, 4.3 Hz, 2H), 5.92 (s, 2H), 5.63 (d, J=17 Hz, 1H), 5.35 (d, J=17 Hz, 1H), 5.20 (s, 2H), 4.38 (dd, J=22.2, 13 Hz, 2H), 4.02 (m, 2H), 3.91-3.84 (m, 1H), 3.74-3.70 (m, 4H), 3.62-3.60 (m, 4H), 3.44-3.32 (m, 2H), 3.27-3.23 (m, 2H), 3.10-2.98 (m, 5H), 2.93-2.70 (m, 9H), 2.48-2.41 (dt, J=18.8, 4.2 Hz, 1H), 2.37-2.22 (m, 2H), 2.19-2.13 (m, 2H), 2.04-2.00 (m, 2H), 1.925-1.65 (m, 6H), 1.53-1.47 (m, 6H), 1.31 (t, J=7 Hz, 3H), 1.27-1.18 (m, 2H), 0.90 (td, J=7.4, 1.9 Hz, 3H) ppm; $^{13}$C NMR (100 MHz, CDCl$_3$) δ 205.3, 177.4, 177.3, 175.2, 172.6, 167.8, 164.8, 157.4, 154.7, 153.1, 151.2, 150.2, 146.7, 146.4, 146.1, 133.1, 131.1, 129.4, 127.6, 127.3, 126.1, 119.9, 115.4, 114.8, 105.1, 96.5, 94.3, 77.2, 75.7, 70.9, 70.8, 69.3, 67.4, 67.0, 62.8, 50.0, 49.4, 47.6, 47.4, 46.2, 40.9, 39.5, 38.8, 36.3, 33.3, 31.6, 31.4, 29.8, 27.0, 25.8, 24.3, 24.1, 23.4, 23.2, 14.0, 7.6 ppm; HRMS (ESI) calcd. For $C_{64}H_{76}N_5O_{16}S$ [M+H]$^+$: 1202.5002, found: 1202.5013.

Cell Culture and Cytotoxic Assay

Cancer cell lines were obtained from ATCC unless otherwise noted. HT-29 and HCT-116 cells were cultured in Dulbecco's Modified Eagle Medium (DMEM, Thermo Fisher Scientific) with 10% fetal bovine serum (FBS, Thermo Fisher Scientific) and 1% antibiotic-antimycotic (Thermo Fisher Scientific). Normal cell line-NHDF cell was obtained from PromoCell unless otherwise noted. NHDF cell was cultured in Dulbecco's Modified Eagle Medium (DMEM, Sigma-Aldrich, Product #6429) with 10% fetal bovine serum (FBS, Thermo Fisher Scientific) and 1% antibiotic-antimycotic (Thermo Fisher Scientific). The cells were incubated at 37° C. in a humidified incubator with 5% $CO_2$ and 95% air.

Cytotoxicity of the compounds against HT-29, HCT-116, and NHDF cells was determined by SRB assay. Briefly, CRC cells were seeded at a density of $5 \times 10^3$ cells/well in 96-well microtiter plates (100 μL/well), separated into two groups with or without GSH. After incubation for 24 hours, the culture medium was replaced by fresh medium (100 μL). For the non-GSH control group, a series of concentrations of compounds (100 μL, prepared in DMSO or DMA, and diluted by medium) were added to cells directly; for GSH groups, cells were transiently treated with 30 mM GSH (20 μL/well, diluted by medium) for 1 h, and then a series of concentrations of compounds (40 μL/well, prepared in DMSO or DMA, and diluted by medium) and 10 mM GSH (40 μL/well) were added making final GSH concentration to 5 mM, and incubated for 48 h or 72 h (the amounts of DMSO or DMA did not exceed 0.5%). After incubation, 10% cold trichloroacetic acid was gently added to each well and incubated at 4° C. for 1 h. The medium was removed, carefully washed with water, and dried at room temperature. Next, plates were stained with 100 μL of 0.057% SRB for 30 min, rinsed with 1% acetic acid to remove the unbound dye, and dried at room temperature. The bound protein stain was dissolved with 100 μL of 10 mM Tris base (pH 10.5) and shook for 10 min. The optical density (O.D.) was measured at 510 nm with Multi-Mode Microplate Reader (SpectraMax Paradigm, Beckman Coulter, U.S.). The fraction of cell survival was calculated as follows. Survival fraction=(OD treated−blank)/(OD control−blank). The IC$_{50}$ values (the concentrations that produce 50% inhibition of cell growth) were calculated using nonlinear regression curve-fitting models (GraphPad Prism 7, U.S.). Each experiment was repeated three times.

2-NBDG Uptake Assay

COS-7 cells were seeded in 96-well culture plates and grown in low-glucose Dulbecco's Modified Eagle's medium supplemented with 10% fetal bovine serum and 2 mM L-glutamine for 24 h. After washing with Krebs Ringer bicarbonate buffer (KRB) (10 mM HEPES, 129 mM NaCl, 4.7 mM KCl, 2 mM CaCl$_2$) and 1.2 mM MgSO$_4$, 1.2 mM KH$_2$PO$_4$, 5 mM NaHCO$_3$, pH 7.4), cells were incubated with the compounds to be tested in KRB containing 2-NBDG (200 μM) for 90 min at 37° C. in a 5% CO$_2$ atmosphere, and then washed twice with KRB and lysed with lysis buffer (1% Nonidet P-40, 1% sodium deoxycholate, 40 mM KCl, and 20 mM Tris, pH 7.4). Finally, the lysates were transferred to black 96-well plates and fluorescence intensity was detected with a Multi-Mode Microplate Reader (SpectraMax Paradigm, Beckman Coulter, USA) using an excitation wavelength of 475 nm and an emission wavelength of 550 nm.

Western Analysis of CRC and NHDF Cell Lines

HCT116, HT29 and NHDF cells were harvested, washed with PBS, and lysed in 0.3 mL of lysis buffer containing 50 mM Tris-HCl (pH 7.4), 150 mM NaCl, 1 mM EDTA, 1% Triton X-100, and protease inhibitor cocktail (Roche Diagnostics, Indianapolis, IN). Cell lysate containing 20 μg of protein was mixed with sample buffer and denatured at 37° C. for 30 min. The proteins were separated by electrophoresis in a 10% SDS-PAGE, transferred to PVDF membranes, blocked with 3% BSA in PBST, and the membrane was incubated with anti-GLUT-1 antibody (1:2000, Abcam) at 4° C. overnight. Membranes were washed with PBST and incubated with HRP-conjugated secondary antibodies including goat anti-rabbit (1:3000, Abcam). The antigens were revealed by Ultrascence western substrate (Bio-Helix, Taiwan), and image detection was performed with Chemi-Doc XRS system and Image Lab software (Bio-Rad Laboratories, Hercules, CA). GAPDH (1:2500, Abcam, mouse) was used as a loading control. Both HT-29 and HCT-116 showed to have significant expression levels of GLUT-1, where multiple bands reflected different glycosylated GLUT-1. A very low expression level of GLUT-1 was observed in the NHDF cell line.

Evaluation of Healthy Vs. AOM-DSS Induced Colon Cancer Mice's Cathepsin B Expression Level An orthotopic CRC mouse model was established by intraperitoneal (i.p.) injection of AOM (10 mg/kg body weight) to BALB/c mouse (6 weeks, male), and supplementation of its drinking water with 2% dextran sodium sulfate (DSS). After two months, the mouse was sacrificed by $CO_2$, and its colon with tumor area was collected and fixed with 4% paraformaldehyde before making paraffin sections. In addition, the healthy balb/c mouse (6 weeks, male) was also used for the comparison. The paraffin sections of mice's colon samples were prepared according to the routine procedures of the Laboratory Animal Center at National Taiwan University. First, paraffin sections were de-waxed in 100% xylene and then rehydrated in 100, 95, 70, 50 and 0% ethanol (in each ethanol dilution for 3 min). Heat-mediated antigen retrieval was achieved with sodium citrate buffer (pH 6.0). The blockage of endogenous peroxidase activity in the tissue was performed by incubation in the presence of 3% $H_2O_2$ in 100% methanol for 10 min at room temperature. After rinsed with PBS and washed with PB ST (PBS+0.5% Tween 20) twice, samples were blocking for 15 to 30 min. Sections were then incubated overnight at 4° C. with primary antibody (cathepsin B (DIC7Y) XP Rabbit mAb, 1:1000, CST 31718, Cell signaling). Afterwards, sections were incubated with the secondary horse-radish-peroxidase-conjugated antibodies (Anti-rabbit IgG (HRP), 1:2000, 7074S, Cell signaling) for 1 h at room temperature. Protein expression was detected using diaminobenzidine (DAB) (Cell signaling), and haematoxylin (Cell signaling) was used for counterstaining. All sections were analyzed by Upright Microscope (LEICA DM2500) and images were taken using a MicroVisioneer Manual Whole Slide Imaging Software.

In Vivo Study

Specific pathogen-free BALB/c mice (6 weeks of age, male) were purchased from the National Laboratory Animal Center. The animals were housed in clean plastic micro isolator cages (5 mice/cage), maintained on a standard laboratory pellet diet and water ad libitum. Animal rooms were kept at a constant temperature, humidity and 12 h dark/light cycle. All animal procedures were in accordance with recommendations of the Committee for the Laboratory Animal Care Committee in National Taiwan University College of Medicine [IACUC 20180076].

Azoxymethane (AOM)-induced murine CRC model was applied to model human CRC. BALB/c mice (6 weeks of age, male) were intraperitoneally (i.p.) injected once every two weeks with AOM (10 mg/kg body weight) or the PBS vehicle. Seven days after each AOM injection, 2% dextran sulfate sodium (DSS) was given in the drinking water for four days, followed by 3 days of regular water. This cycle was repeated three times. The mice were randomly divided into eight groups (n=5), on day 60 after the first AOM treatment. 5-FU (50 mg/kg body weight), compound 7 (50 mg/kg body weight each), and 5-FU+compound 17 (5-FU 10 mg/kg and compound 17 30 mg/kg) in 0.2 mL PBS were injected i.p. once every 3 days for 3 weeks. Irinotecan (20 mg/kg), compound 31 (20 mg/kg), and irinotecan+compound 17 (20 mg/kg of irinotecan and 14 mg/kg of compound 17) were injected i.p. q.o.d for two weeks. Irinotecan (20 mg/kg), compound 37 (40 or 20 mg/kg), compound 38 (40 or 20 mg/kg), SN-38+compound 16 (10 mg/kg of SN-38 and 15 mg/kg of compound 16), SN-38+compound 17 (12 mg/kg of SN-38 and 13 mg/kg of compound 17), compound 16 (15 mg/kg) and compound 17 (13 mg/kg) were injected once every two days for two weeks via i.v. Bodyweight was measured every 3 (5-FU series) or 2 (SN-38 series) days. The mice were sacrificed on day 86 (5-FU series) or 79 (SN-38 series) under anesthesia using Zoletil® 50. Tumor volumes and body weights were recorded at sacrifice. The tumors were counted under a dissecting microscope, and the area covered by tumors was measured by imaging software (AxioVision LE 4.8.2.0).

In the following PK experiments, BALB/c mice (six weeks of age, male) were randomly divided into two groups (n=3). The two groups of mice were treated with 5-FU solution (9.5 mg/kg) and compound 7 (50 mg/kg, equivalent as 5-FU) respectively by intraperitoneally and intravenously injection. Blood samples were collected via femoral vein by syringes at 0, 1, 3, 5, 10, 15, 30, 45 min, 1, 2, 4, and 24 h after drug administration. 50 μL blood samples were collected into 100 μL extraction solvent (EtOAc/MeOH=1:1) and vortex for 30 sec. The supernatants were separated from the mixture by centrifugation at 10,000 rpm for 10 min and frozen at −30° C. pending UPLC-MS/MS analysis. For bio-distribution experiments, the entire dissected organs were placed into round-bottom after weighting, two-milliliter microcentrifuge tubes with 1 mL of extraction solvent (EtOAc/MeOH=1:1) and 7 mm stainless steel beads, then homogenized for 30 min. All of the containers were maintained at 4° C. throughout the process. The supernatants were separated from the mixture by centrifugation at 10,000 rpm for 10 min and frozen at −30° C. The 200 μL solvent from crude organ suspensions was removed by the dryer and then dissolved in 50 μL extraction solvent. All samples were stored at −30° C. and analyzed within 24 h. All of the samples were filtered through 0.22 μm PTFE membranes into 12×32 mm vials for UPLC-MS/MS analyses using 5-FU-$^{15}N_2$ as a marker. Pharmacokinetic parameters were calculated using the WinNonlin Software (version 5.2, Pharsight, MO, USA.)

UPLC-MS/MS Analyses

Analyses were performed on an ACQUITY UPLC I-Class/Xevo TQ-XS IVD System (Waters, Milford, MA, USA) from College of Public Health, National Taiwan University. The reverse phase BEH C18 (100 mm×2.1 mm, 1.7 μm, Waters) and VanGuard BEH C18 (5 mm×2.1 mm, 1.7 μm, Waters) precolumns were used to separate the analytes. All data were acquired by MassLynx V4.2. The mobile phase consisted of a 10 mM aqueous solution of ammonium acetate (A) and acetonitrile (B), set as follows: 0.00 min 98% A→1.00 min 98% A→3.00 min 10% A→4.50 min 10% A→4.60 min 98% A→6.00 min 98% A; at a rate of 0.5 mL/min for 6.00 min with 4 μL per injection. The column oven was maintained at 60° C. Multiple reaction monitoring (MRM) method was applied in quantification. Mass spectrometer parameters were as follows: capillary voltage, 3.0 kV/3.0 kV, respectively, for positive/negative ion mode; ion source temperature, 120° C.; desolvation temperature, 450° C.; cone gas flow ($N_2$), 50 L/h; desolvation gas flow ($N_2$), 700 L/h; multiplier, 650 V; and collision gas pressure (Ar), $3-4\times10^{-3}$ mbar.

Plasma Stability and Drug Releasing Assay

To access human plasma stability, synthesized conjugates were prepared in 95% human plasma. After incubation for the indicated time at 37° C., proteins were denatured by the addition of ACN (the groups of 5-FU series prodrugs) or DMA and then acidified with 12.5 mM $NaH_2PO_{4(aq)}$ (pH 3.2) (compounds 30 and 31). The mixture was centrifuged at 13,000 rpm for 5 min. The supernatant was analyzed by HPLC, and samples were centrifuged to collect the clear supernatant and stored at −30° C. until analysis; for the releasing analysis, synthesized conjugates (5-FU series prodrugs) were dissolved in DMSO, and the analysis solutions were prepared by diluting 50 μL stock in 750 μL PBS (pH 7.4, containing 5 μM, 1 mM, or 5 mM GSH) to a final concentration 2.5 mM. For compounds 30 and 31, they were dissolved in DMA and added GSH (11.2 mM or 11.2 μM) solution which was prepared in sodium acetate buffer (10 mM, pH 5.0) in the ratio of 50/40 (v/v, drug in DMA/GSH solution) for final GSH of 5 mM or 5 μM in pH 7.0, respectively. After incubation for the indicated time, samples were centrifuged to collect the clear supernatant and stored at −30° C. until analysis. RP-HPLC injections were carried out at the specified conditions, and the area of peak was integrated for further calculation.

Statistical Analysis

All data were obtained at least in triplicate, and results were reported as mean±mean of standard deviation (S.E.M.). Comparisons among groups were analyzed via t test, one-way ANOVA and two-way ANOVA analysis, using SAS Version 9.2 (SAS Institute, Cary, NC). The statistical significance was determined: n.s., non-significant difference; **$P<0.0001$; *$P<0.001$; **$P<0.01$; or *$P<0.05$.

Plasma Stability and Releasing Profiles in Different GSH Concentrations

The in vitro human plasma stability and release profiles of compounds 5, 7, 9, 30 and 31 are depicted in FIGS. 2 a) to 3 d). The stability tests comprised incubation of compounds 5, 7, 9, 30 and 31 in human plasma at 37° C. at different time intervals. Samples were collected and analyzed by RP-HPLC (FIG. 2 a) for compound 7). The half-lives of compounds 5, 7, and 9 were 0.8 h, 13 h, and 3.6 h (FIG. 2 b)), and compounds 30 and 31 were 20 and 50 min, respectively (FIG. 3 a)). The reason for the inferior plasma stability of compounds 5 and 9 compared to 7 is unknown, but can be attributed to the high pKa of the linkers (the pKa of both succinimide and triazole are around 8.5-9.5) increasing the susceptibility of the ester portion of the linker to degrade. Therefore, a pH stability analysis of compound 9 was conducted, and it was found that compound 9 was stable at pH 4-5, but was prone to fully degrade when the pH was >7. In order to predict the fate of those conjugates in the body, we collected the metabolites of compound 7 from the plasma treating assay and identified two major metabolites M1, which arises from hydrolysis of the ester bond of compound 7, and M2, the disulfide exchange intermediate (FIG. 2 a)). Since the concentration of GSH is about 5-10 mM in the tumor cells and 1-10 μM in plasma, we then evaluated the release of 5-FU or SN-38 from compounds 5, 7, 9, 30, and 31 using GSH. The concentration of GSH used was set to 5 mM, mimicking the tumor micro-environment. Little 5-FU was released from compounds 5 and 9 after 48 h; however, the release of 5-FU from compound 7 was found to be dependent on the concentration of GSH used. The cleavage percentage of compound 7 after 4 hours of exposure to 5 mM GSH was up to 60%, but only ~10% in the presence of 1 mM GSH, indicating that compound 7 is cleaved much slower in 1 mM GSH than 5 mM of GSH (FIG. 2 d)). The half-lives of compound 7 at 5 mM and 1 mM of GSH were 4.0 h and 10.3 h, respectively. In the presence of 5 μM GSH, only 30% degradation of compound 7 was observed after 48 h (FIG. 2 d)). The stability and release profiles of three phlorizin-bearing derivatives 4, 6, and 8 were also evaluated, their results were all similar to their corresponding congeners 5, 7, and 9, respectively. Disulfide bonds in compounds 6-7 have relatively short half-lives (<5 h) in highly reductive environments while maintaining a degree of stability in circulation. The stability of prodrugs 30 and 31 in 0 μM, 5 μM, and 5 mM GSH are shown in FIG. 3 b). Prodrugs 31 was relatively stable in 0 and 5 μM GSH (10% degraded after 48 h), but degraded over 90% to SN-38 under 5 mM GSH condition after 48 h, indicating that the prodrug could be turned to SN-38 efficiently by the high concentration of GSH activation. Prodrug 30 has the same tendency as 31, but its release rate of SN-38 in 5 mM GSH was only about 60%. In order to figure out the reason for the difference release rate of SN-38 of prodrugs 30 and 31 in 5 mM GSH, and their metabolic products M3-M7 (FIGS. 3 c) and 3 d)), we analyzed the fractions of these metabolites by mass. The results showed that M3 and M4 should be the disulfide exchange products from the segment 16 and —S—$(CH_2)_2$-carbonate-SN-38 in prodrug 30, respectively; M5 was the compound 16; M6 should be the same product as M4, but from the prodrug 31; M7 might be the conjugation product of GSH with segment 17 in prodrug 31. From these comprehensive results, we can know that the concentration of GSH and its reactivity toward the segments of prodrugs causes the difference release rate of the parent-drug, thus prodrug 31 may have more therapeutic potential compared to 30.

GLUT-1 Inhibitory Activity

Figure 4:
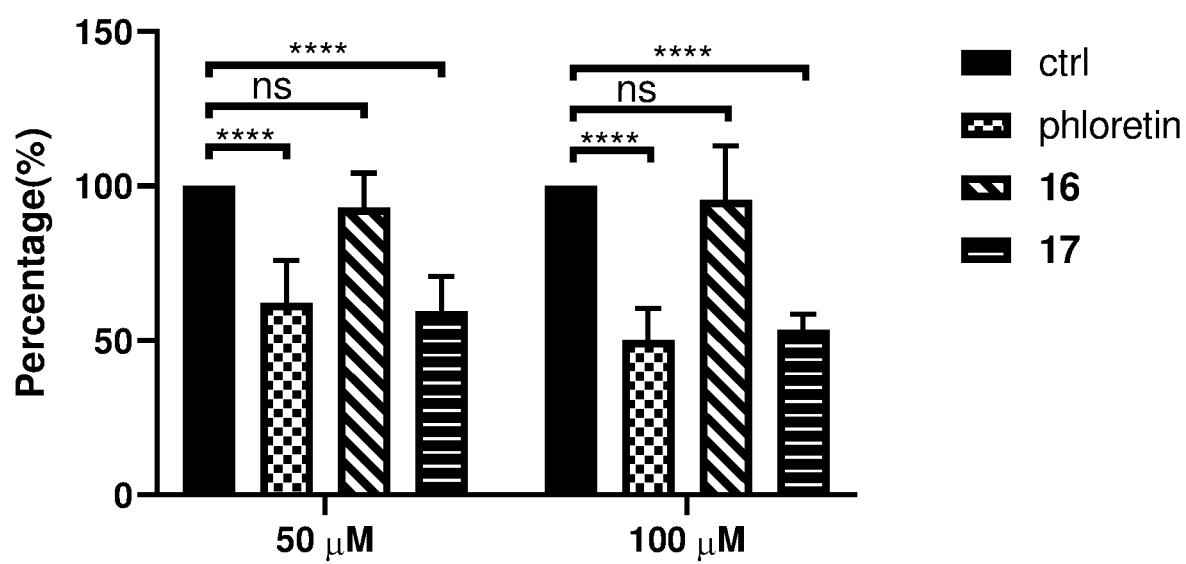
FIG. 4 shows inhibition of GLUT-1 activity of compounds 16 and 17 by the 2-NBDG uptake assay; data represent mean±S.E.M. (n=4, n.s., nonsignificant difference, ****P<0.0001 (two-way ANOVA)).

A previous crystallography study established that the benzene-1,3,5-triol ring of phloretin is stabilized in a pocket of GLUT-1 by forming three H-bonds, but the extent to which this would be perturbed by a substituent at the 3-position (such as compound 17) was unknown. We examined the inhibitory activity of compounds 16-17 towards GLUT-1 using COS-7 cells that overexpress GLUT-1 in a 2-NBDG (2-N-(7-nitrobenz-2-oxa-1,3-diazol-4-yl)amino)-2-deoxy-D-glucose) uptake assay. Since phlorizin could not inhibit GLUT-1, it was not surprising that compound 16 (a phlorizin derivative) was not able to inhibit GLUT-1 at either 50 μM and 100 μM (FIG. 4). On the contrary, compound 17 had similar inhibition activity to phloretin, despite bearing substitution at 3-OH.

Cytotoxicity to Human CRC Cells

Compounds 4-9, 16-17, 30-31, phlorizin, phloretin, 5-FU, SN-38 and irinotecan were evaluated for their cytotoxicity against the CRC cell lines HCT-116 and HT-29 (both of which overexpress GLUT-1) using the sulforhodamine B (SRB) assay (Table 1 to 3). 5-FU exhibited an $IC_{50}$ of approximately 15 μM (entry 1, Table 1). To mimic the tumor micro-environment, 10 mM GSH was first attempted to add to the medium, however, we found that 10 mM GSH interfered CRC cell growth. Thus, 5 mM GSH was added to the culture media of CRC cell lines. Compound 16 did not exhibit any inhibitory activity. Compound 17 exhibited some inhibitory activity, with an $IC_{50}$ of 15 to 30 μM. Compounds 4-5 were poorly cytotoxic, with or without the addition of GSH. The cytotoxicity of the disulfide containing compounds 6-7 was sensitive to GSH, for example, the $IC_{50}$ of compound 6 to HCT-116 cells was 23.8 μM with GSH and 54.9 μM without GSH. These cytotoxicites of compounds 6-7 in these cancer cells might be due to the sub μM level of intracellular GSH which gradually cleaved the disulfide bonds of compounds 6-7 to release 5-FU. The $IC_{50}$ of 7 in the presence of GSH was 10.5 μM for HCT-116 and 3.8 μM for HT-29, which were close to the $IC_{50}$ values of 5-FU in both cell lines (13.9 μM and 5.2 μM, respectively). Compounds 8-9 were poorly cytotoxic. The cytotoxicities of compounds 16 and 17 were also assayed in combination of 5-FU: 5-FU combined with compound 17 was more effective at inhibiting cell viability than the other compounds when given alone, reflecting a synergistic inhibitory effect. Additionally, the cytotoxicities of 5-FU and 7 in the low expression GLUT-1 normal cell line NHDF (western blot analysis of GLUT-1) were also examined; it was found that both 5-FU and 7 had no obvious inhibition effect ($IC_{50}$ of 70.4±7.2 μM and 90.0±2.6 μM, respectively), suggesting that the compound 7 was less toxic in normal cells. SN-38 and irinotecan showed $IC_{50}$ of approximately 2-430 nM and 0.3-8.5 μM in CRC cells (entries 3 to 4, Table 2 and Table 3), respectively. The combination of SN-38 with compounds 16 or 17 exhibited a synergistic effect in HT-29 cell line. However, to our surprise, compounds 30 and 31 had less or similar cytotoxicity when compared to both SN-38 and SN-38 combined with compounds 16 or 17. In general, HT-29 cell became more sensitive to compounds and HCT-116 cells were shown to be similar as in the condition of w/o GSH. Since both compounds 30 and 31 had not greatly improved cytotoxicity in high concentration of GSH, and had $IC_{50}$ of nano level in the condition of w/o GSH, the adverse effects in vivo may be concerned. Another type of compounds, 37 and 38, which have cathepsin B sensitive and ether linkage, were also evaluated for their cytotoxicity and found to have approximately 3-7 μM level in HCT-116 cell line, and less sensitive to HT-29 cells (entries 7 to 8, Table 3). Here, to investigate the proof of concept of the conjugation of glucose inhibitor with anti-cancer drugs, compounds 7 and 31 were selected for further evaluation of therapeutic efficacy in animal study.

TABLE 1

Cytotoxicity of compounds 4-9, 16-17, 5-FU, and 5-FU combined with 16 or 17 in HCT-116 and HT-29 cell lines[a].

| | HCT-116 (μM) | | HT-29 (μM) | |
|---|---|---|---|---|
| Compounds | w/o GSH | 5 mM GSH | w/o GSH | 5 mM GSH |
| 5-FU | 14.9 ± 2.24 | 13.9 ± 0.60 | 14.9 ± 1.86 | 5.20 ± 0.12 |
| 16 | >100 | >100 | >100 | >100 |
| 17 | 15.5 ± 0.72 | 15.9 ± 0.89 | 29.1 ± 6.14 | 24.2 ± 0.40 |
| 4 | 97.4 ± 20.3 | >100 | >100 | 93.6 ± 9.4 |
| 5 | 75.0 ± 13.7 | 82.8 ± 4.18 | 43.7 ± 5.0 | 86.9 ± 2.9 |
| 6 | 54.9 ± 3.36 | 23.8 ± 1.15 | 59.8 ± 7.93 | 8.00 ± 0.52 |
| 7 | 21.2 ± 1.69 | 10.5 ± 1.15 | 19.6 ± 3.86 | 3.80 ± 0.65 |
| 8 | >100 | ND[b] | >100 | ND[b] |
| 9 | >100 | ND[b] | 85 ± 9.1 | ND[b] |
| 5-FU + 16 | 21.9 ± 2.98 | 13.6 ± 0.73 | 21.0 ± 9.38 | 8.58 ± 0.09 |
| 5-FU + 17 | 10.4 ± 1.25 | 8.73 ± 0.64 | 10.3 ± 4.33 | 3.03 ± 0.03 |

[a]Cell lines were incubated with compounds for 48 h. $IC_{50}$ values were determined by SRB assay.
[b]ND = not determined.

TABLE 2

Cytotoxicity of compounds 30-31, phlorizin, phloretin, SN-38, irinotecan, and SN-38 combined with 16 or 17 (prepared in DMA) in HCT-116 and HT-29 cell lines[a].

| | HCT-116[b] | | HT-29[c] | |
|---|---|---|---|---|
| Compounds | w/o GSH | 5 mM GSH | w/o GSH | 5 mM GSH |
| Phlorizin (2) (μM) | >100 | >100 | >100 | >100 |
| Phloretin (3) (μM) | >100 | 77.57 ± 3.42 | >100 | >100 |
| SN-38 (28) (nM) | 2.37 ± 0.04 | 2.88 ± 0.08 | 13.38 ± 0.4 | 11.28 ± 0.73 |
| Irinotecan (39) (μM) | 0.36 ± 0.01 | 0.32 ± 0.02 | 5.61 ± 0.11 | 6.44 ± 0.3 |
| 16 (μM) | >100 | >100 | >100 | >100 |
| 17 (μM) | 15.5 ± 0.72 | 15.9 ± 0.89 | 29.1 ± 6.14 | 24.2 ± 0.40 |
| 30 (nM) | 2.44 ± 0.17 | 2.57 ± 0.13 | 39.64 ± 3.45 | 30.11 ± 2.6 |
| 31 (nM) | 2.87 ± 0.19 | 2.59 ± 0.12 | 16.32 ± 1.31 | 11.43 ± 1.03 |
| SN-38 + 16 (nM) | 3.91 ± 0.9 | 2.14 ± 0.04 | 6.15 ± 0.13 | 3.8 ± 0.81 |
| SN-38 + 17 (nM) | 2.44 ± 0.18 | 2.02 ± 0.09 | 8.73 ± 1.17 | 6.02 ± 0.05 |

[a]$IC_{50}$ values were determined by SRB assay.
[b]Cell lines were incubated with compounds for 72 h.
[c]Cell lines were incubated with compounds for 48 h.

TABLE 3

Cytotoxicity of compounds 16-17, 37-38, phlorizin, phloretin, SN-38, irinotecan, and SN-38 combined with 16 or 17 (prepared in DMSO) in HCT-116 and HT-29 cell lines[a, b].

| Compounds | HCT-116 | HT-29 |
|---|---|---|
| Phlorizin (2) (μM) | >100 | >100 |
| Phloretin (3) (μM) | >100 | >100 |
| SN-38 (28) (nM) | 54.93 ± 3.86 | 430 ± 0.01 |
| Irinotecan (39) (μM) | 3.69 ± 0.24 | 8.51 ± 1.86 |

TABLE 3-continued

Cytotoxicity of compounds 16-17, 37-38, phlorizin, phloretin, SN-38, irinotecan, and SN-38 combined with 16 or 17 (prepared in DMSO) in HCT-116 and HT-29 cell lines[a, b].

| Compounds | HCT-116 | HT-29 |
|---|---|---|
| 16 (μM) | >100 | >100 |
| 17 (μM) | 15.5 ± 0.72 | 29.1 ± 6.14 |
| 37 (μM) | 3.25 ± 0.42 | >100 |
| 38 (μM) | 7.43 ± 0.78 | >100 |
| SN-38 + 16 (nM) | 45.44 ± 7.4 | 330 ± 0.03 |
| SN-38 + 17 (nM) | 56.46 ± 2.63 | 360 ± 0.02 |

[a]$IC_{50}$ values were determined by SRB assay.
[b]Cell lines were incubated with compounds for 48 h.

Figure 5A:
FIGS. 5A to 5D show immunohistochemical staining of cathepsin B in paraffin-embedded colon sections of FIG. 5A: healthy mouse, scale bar=200 µm×400 magnification.
Figure 5B:
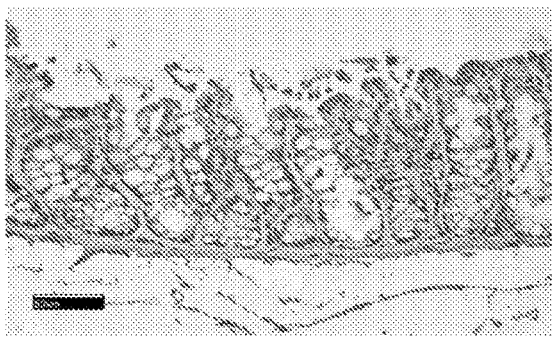
Figure 5C:
Figure 5D:
Figure 6A:
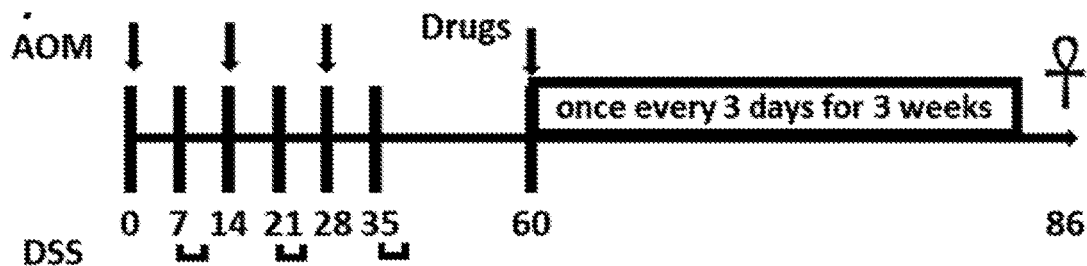
FIGS. 6A to 6D show
Figure 6B:
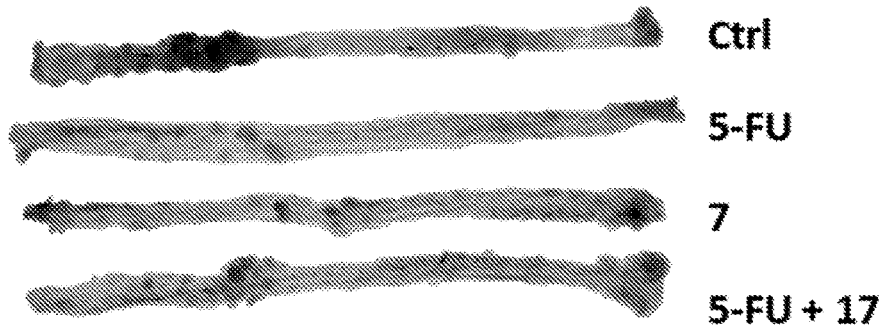
Figure 6C:
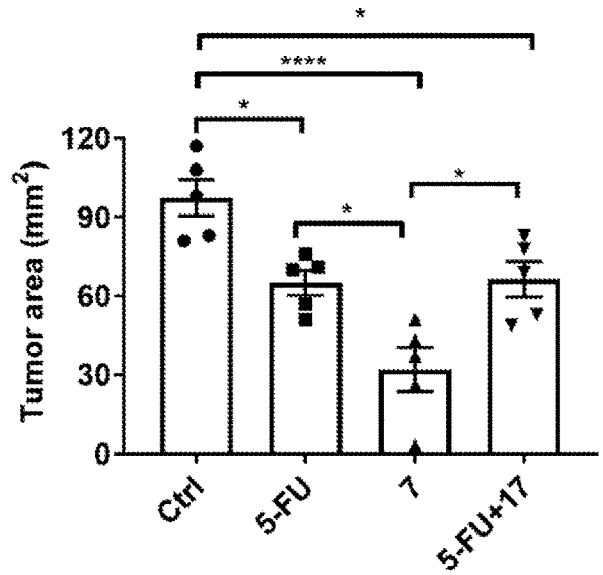
Figure 6D:
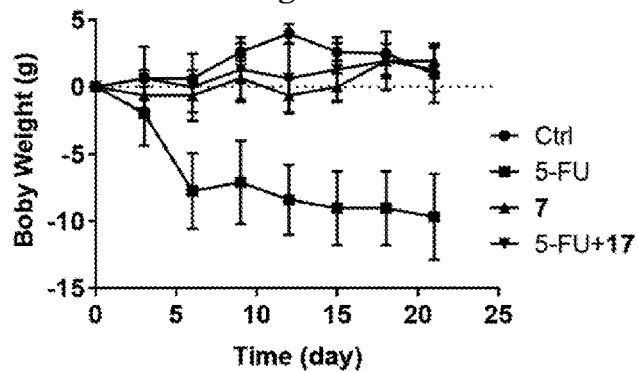
Figure 7A:
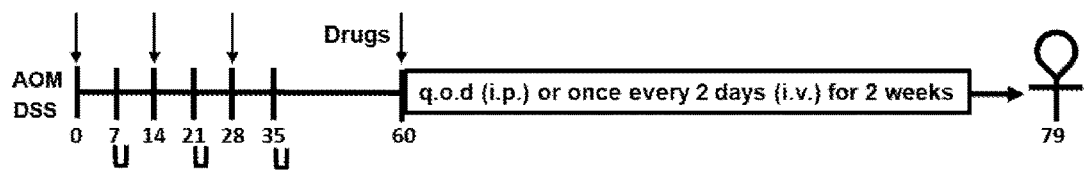
FIGS. 7A to 7F show
Figure 7B:
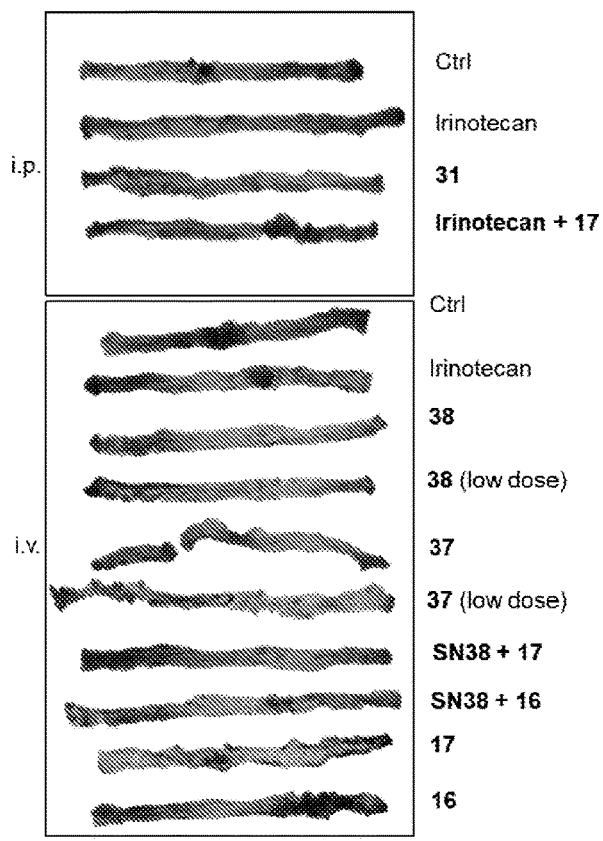
Figure 7C:
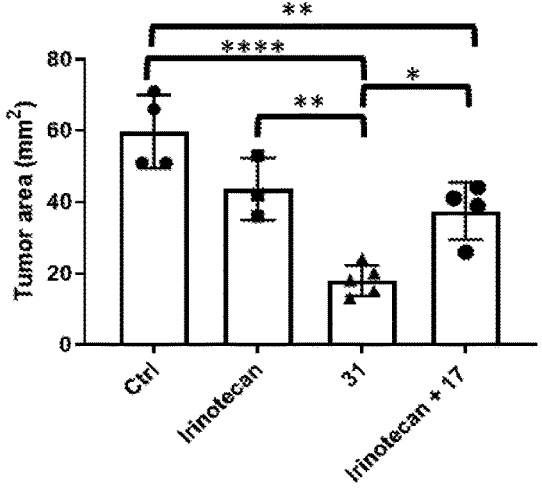
Figure 7D:
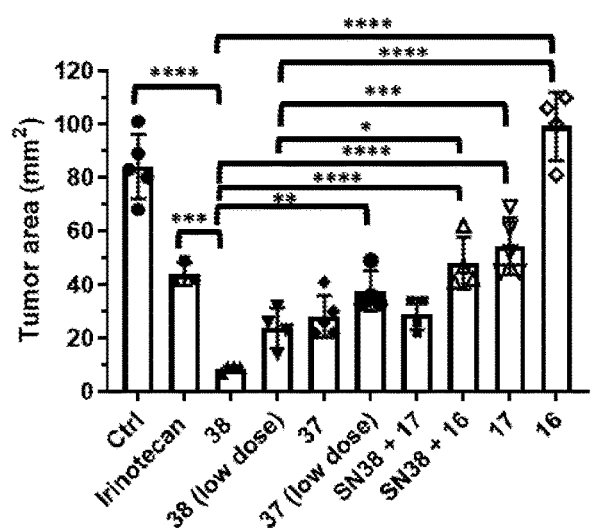
Figure 7E:
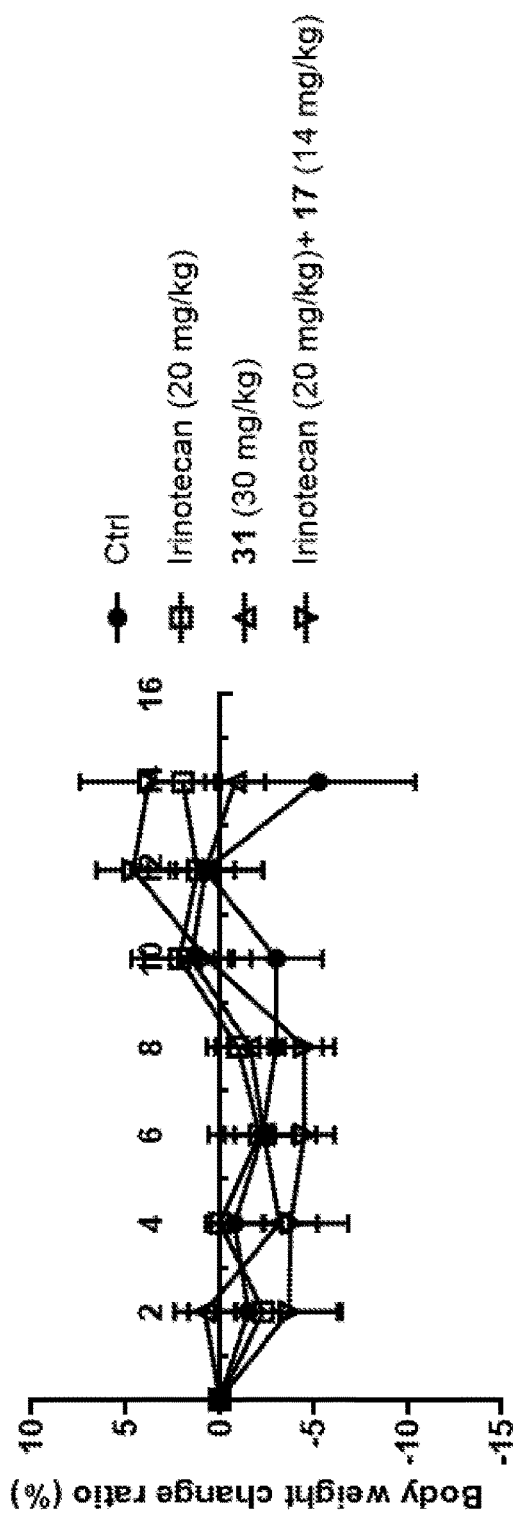
Figure 7F:
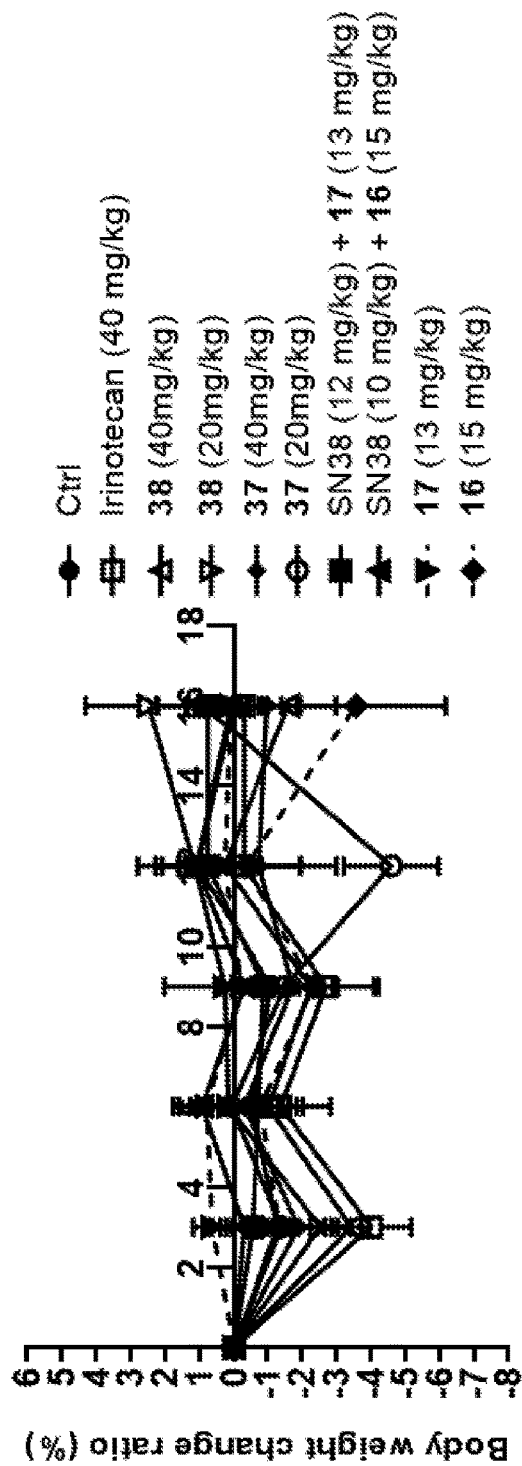

Evaluation of Healthy Vs. AOM-DSS Induced Colon Cancer Mice's Cathepsin B Expression Level Before assessing the therapeutic efficacy of drugs in colon cancer mice, we first evaluated whether AOM-DSS induced colon cancer model of balb/c mouse was a suitable model for cathepsin B overexpression related disease. In addition, the healthy balb/c mouse (6 weeks, male) was also used for the comparison. The results of the immunohistochemistry showed that the orthotopic CRC mice model indeed had a higher expression level of cathepsin B compared to the normal group (FIGS. 5a)-d)), supporting a reasonable platform for evaluating the therapeutic efficacy of cathepsin B sensitive prodrugs.

Evaluation of the In Vivo Activity of the Synthetic Compounds in an Orthotopic CRC Mice Model Compounds 7 and 31 was selected for in vivo evaluation based on their release profiles and the results of the cytotoxicity experiments. An orthotopic CRC mice model was established by intraperitoneal (i.p.) injection of AOM (10 mg/kg body weight) to BALB/c mice (6 weeks, male), and supplementation of their drinking water with 2% dextran sodium sulfate (DSS) (FIGS. 6 a) and 7 a)). After two months, solutions of 5-FU (50 mg/kg), compound 7 (50 mg/kg), and 5-FU+compound 17 (10 mg/kg of 5-FU and 30 mg/kg of compound 17, dosing is based on compound 7) in 0.2 mL of PBS were injected i.p. once every three days for three weeks; irinotecan (20 mg/kg), compound 31 (20 mg/kg), and irinotecan+compound 17 (20 mg/kg of irinotecan and 14 mg/kg of compound 17, dosing is based on compound 31 in 5% DMA+2% Tween 80+93% PBS were injected via i.p. route once every two days for two weeks; irinotecan (40 mg/kg), compound 37 (20 or 40 mg/kg), compound 38 (20 or 40 mg/kg), SN-38+compound 16 (10 mg/kg of SN-38 and 15 mg/kg of compound 16), SN-38+compound 17 (12 mg/kg of SN-38 and 13 mg/kg of compound 17), compound 16 (15 mg/kg), and compound 17 (13 mg/kg) in 10% DMSO+20% cremophor+10% $Na_2CO_3$ (5% in dd $H_2O$)+60% D5W were injected once every two days for two weeks via i.v. injection. Based on calculations of tumor area, compound 7 showed better tumor suppression than 5-FU at a dose of 50 mg/kg (0.07 mmol/kg 5-FU), when only 19% of 5-FU given (FIGS. 6 b) and 6 c)); compound 31 (20 mg/kg, 0.022 mmol/kg SN-38) showed better anti-tumor efficacy than irinotecan (20 mg/kg, 0.034 mmol/kg SN-38), when 65% of SN-38 given (FIGS. 7 b) and 7 c)); compound 38 (40 mg/kg, 0.03 mmol/kg) also displayed better anti-tumor efficacy than irinotecan (40 mg/kg, 0.068 mmol/kg), when only 44% SN-38 given (FIG. 7 d)). Since GLUT-1/3/4 is generally overexpressed in CRC patients, and phlorizin is known to inhibit GLUT3/4 inhibition, compounds 7, 31 and 38 might display targeting effect toward GLUT-1/3/4, leading to significant tumor inhibition. In addition, SGLT targeted compound 37 also ameliorated the tumor area of the mice in the dose of 40 mg/kg (0.03 mmol/kg) compared with irinotecan (40 mg/kg, 0.068 mmol/kg). Mice treated with free 5-FU were noted to lose about 10% of their body weight rapidly after injection (FIG. 6 d)), presumably a reflection of the systemic toxicity of 5-FU; there was no significant change in the body weight of the mice who received compounds 7, 31 or 38 (FIGS. 6 d) and 7 e)-f)). The combination of 5-FU (with 19% of free 5-FU dose) or irinotecan (with 65% of free SN-38 dose) and compound 17 also reduced tumor area in the mice model, exhibiting a synergic effect which was also observed in the cell assay.

Evaluation of Pharmacokinetic and Biodistribution Profiles

Plasma concentration and organ distribution of compound 7 were evaluated in BALB/c mice (n=3) with single dose injection of compounds. To analyze 5-FU releasing profile of compound 7, blood samples were collected at 1 min, 3 min, 5 min, 10 min, 15 min, 30 min, 45 min, 1 h, 2 h, 4 h, and 8 h after intravenous injection (i.v.) (50 mg/kg), and the concentration of compound 7 was determined with UPLC-MS/MS. The concentration of compound 7 dropped rapidly in 10 min (FIG. 8 a)), presumably related to expression of carboxylesterase, dihydropyrimidine dehydrogenase (DPD) and the high tissue penetration of 7 in mouse blood. The 5-FU released from compound 7 was detected within 2 h and persisted in blood for longer than compound 7 (FIG. 8 a)). Compound 7 exhibited an unusual plasma pharmacokinetic (PK) profile in that its concentration was undetectable (lower detection limit=0.003 μg/mL) after 30 min but detectable again after 45 min and 4 h, suggesting it to be rapidly absorbed by mouse cells and tissues and reach an equilibrium during elimination. To investigate distribution-related antitumor efficacy of compound 7, blood samples were collected after intraperitoneal injection (i.p.) (50 mg/kg) of compound 7 and 5-FU in BALB/c mice (n=3). The concentration of compound 7 was below the detection limit after 5 min, due to lipophilicity-directed high tissue penetration. The T. of 5-FU from compound 7 was delayed from 10 min to 45 min compared to 5-FU group, and the concentration of 5-FU in both groups were undetectable after 2 h, indicating the antitumor efficacy might be related to high tissue penetration (FIG. 8 b)). Consequently, the distributions of compound 7 (50 mg/kg, 5-FU equivalent dose) and 5-FU (9.5 mg/kg) in the organs of BALB/c mice were evaluated at 1 hour post i.p. injection; compound 7 was found to be distributed in the stomach, colon, heart, and liver (FIG. 8 c)). Since the amounts of compound 7 in each organ were low, further analysis of the 5-FU released from compound 7 was performed, showing that 5-FU was detected mainly in colon, with small amounts in the kidney and stomach, while free 5-FU was distributed in stomach, spleen, and kidney (FIG. 8 c)), similar to the previous report. These results indicate that our conjugation of compound 7 is an appropriate strategy to effect the delivery of 5-FU into the colon. This delivery is posited to be mediated by GLUT-1, which is mostly expressed in the colon. As the phloretin moiety binds to the glucose transporter, the whole conjugate might be uptaken by the cells. Since intracellular GSH concentration of cancer cells can be 10-fold more than the normal cells, 5-FU is released from the conjugate by cleavage of the disulfide bond of 7 by GSH. The high tissue penetration of 7 led to the delayed release of 5-FU, prolonging exposure to 5-FU and enhanced its tumor eradicating effects. Organ distribution analysis revealed the colon-targeting effect of 5-FU, leading to promising antitumor efficacy with low toxicity.

The foregoing description of the exemplary embodiments of the invention has been presented only for the purposes of illustration and description and is not intended to be exhaustive or to limit the invention to the precise forms disclosed. Many modifications and variations are possible in light of the above teaching.

What is claimed is:

1. A conjugate represented by Formula III or a pharmaceutically acceptable salt thereof,

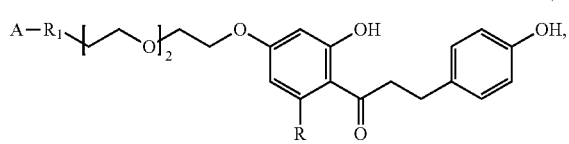

wherein:
R is OH or

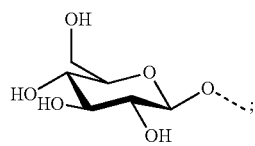

wherein
A is 5-fluorouracil (5-FU), SN-38, or irinotecan; and
wherein
$R_1$ is —S—S—$(CH_2)_n$—OC(O)—$(CH_2)_m$—, —S—S—$(CH_2)_n$—C(O)O—$(CH_2)_m$— or

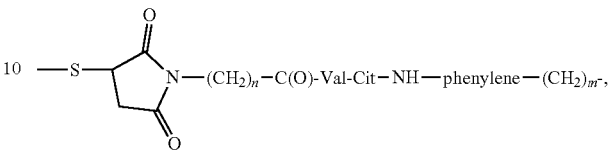

n is an integer of 2 to 9, and
m is 0 or 1;
wherein A is connected to $(CH_2)_m$— in $R_1$.

2. The conjugate of claim 1 or a pharmaceutically acceptable salt thereof, wherein when $R_1$ is —S—S—$(CH_2)_n$—OC(O)—$(CH_2)_m$—, n is 2, and m is 0.

3. The conjugate of claim 1 or a pharmaceutically acceptable salt thereof, wherein when $R_1$ is

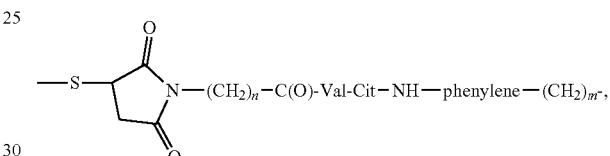

n is 4, and m is 1.

4. The conjugate of claim 1 or a pharmaceutically acceptable salt thereof, wherein when $R_1$ is —S—S—$(CH_2)_n$—C(O)O—$(CH_2)_m$—, n is 2, and m is 0.

5. A conjugate or a pharmaceutically acceptable salt thereof, which is selected from the group consisting of:

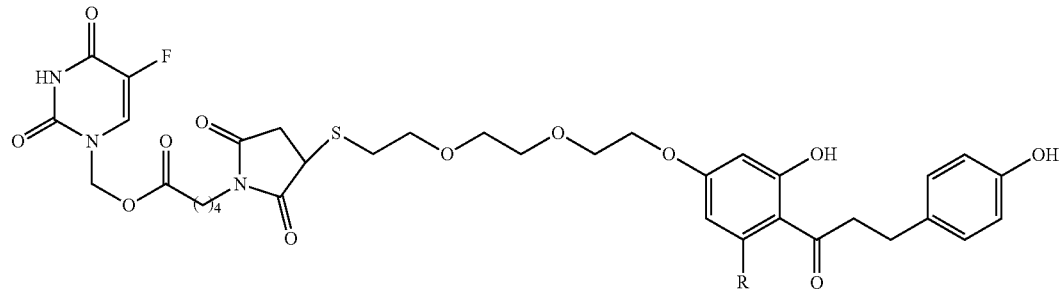

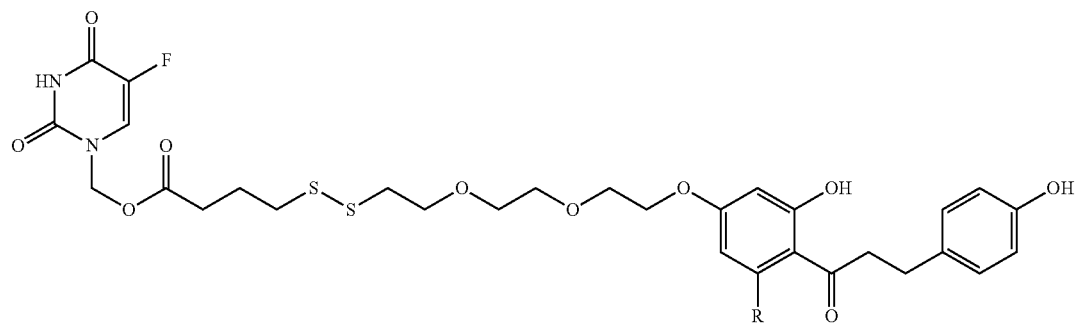

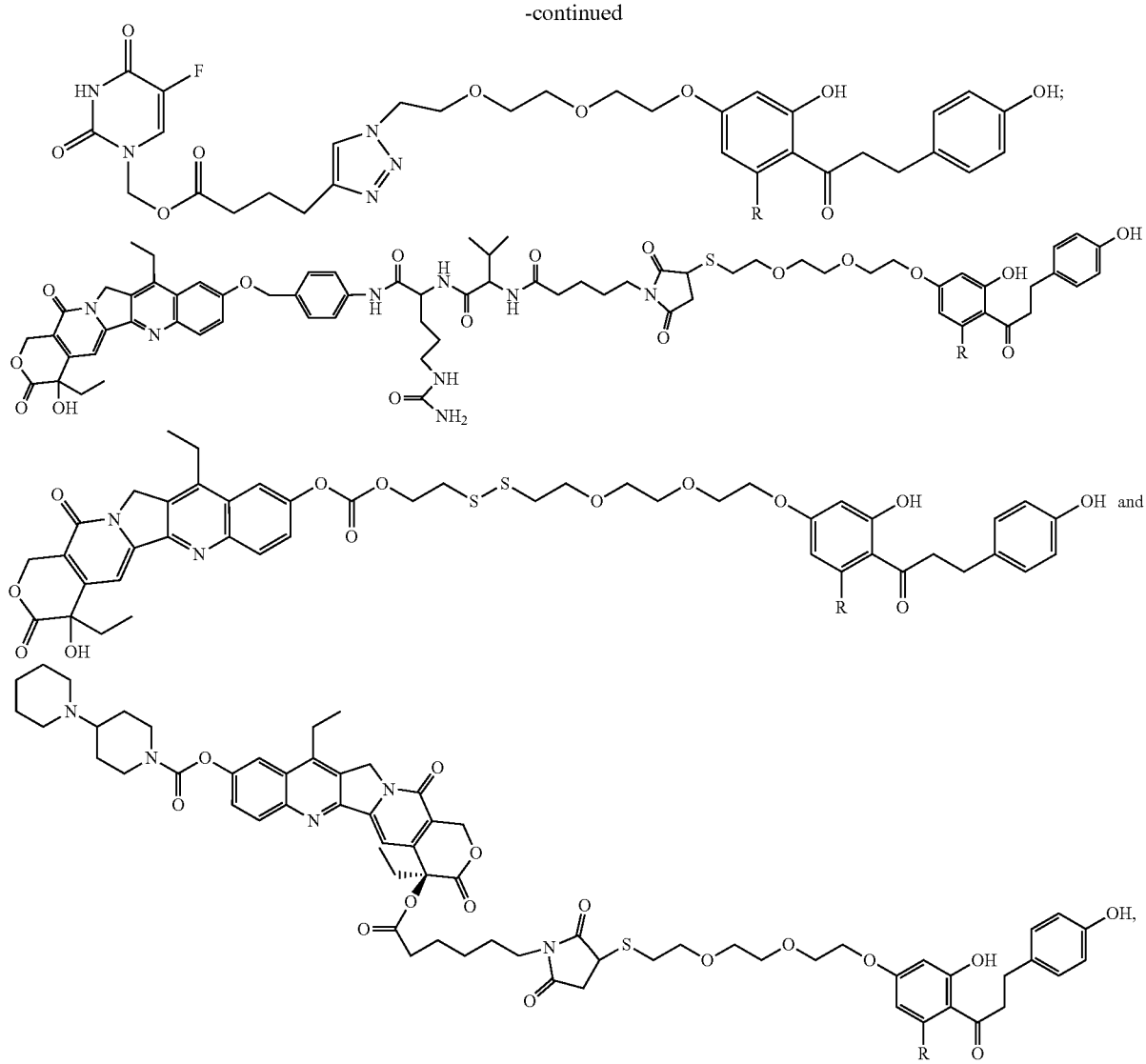
wherein R is OH or
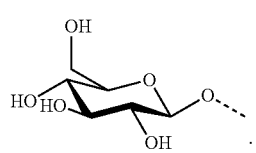
6. A pharmaceutical composition comprising the conjugate of claim 1.
7. The pharmaceutical composition of claim 6, which further comprises a therapeutic agent.
8. The conjugate of claim 1 or a pharmaceutically acceptable salt thereof, which is selected from the group consisting of:
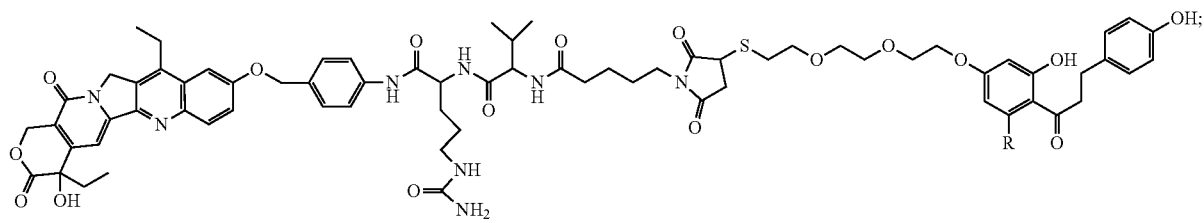

-continued
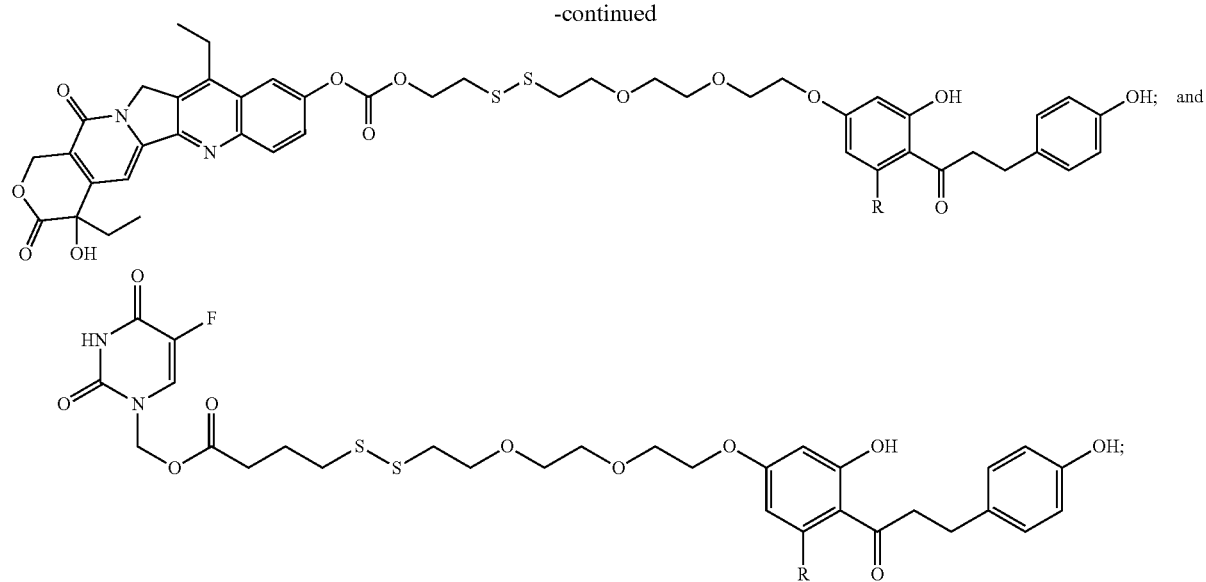
wherein R is OH or
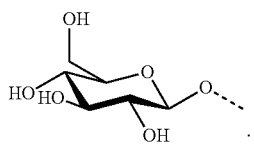
9. A pharmaceutical composition comprising the conjugate of claim 5.
10. The pharmaceutical composition of claim 9, further comprising a therapeutic agent.
* * * * *